(12) United States Patent
Vossoughi et al.

(10) Patent No.: US 11,341,476 B2
(45) Date of Patent: May 24, 2022

(54) DYNAMIC VEHICLE PARKING MANAGEMENT PLATFORM

(71) Applicant: Citifyd, Inc., Portland, OR (US)

(72) Inventors: Sohrab Vossoughi, Portland, OR (US); Joel Morrissette, Beaverton, OR (US)

(73) Assignee: CITIFYD, INC., Portland, OR (US)

( * ) Notice: Subject to any disclaimer, the term of this patent is extended or adjusted under 35 U.S.C. 154(b) by 852 days.

(21) Appl. No.: 15/310,035

(22) PCT Filed: May 11, 2015

(86) PCT No.: PCT/US2015/030232
§ 371 (c)(1),
(2) Date: Nov. 9, 2016

(87) PCT Pub. No.: WO2015/172161
PCT Pub. Date: Nov. 12, 2015

(65) Prior Publication Data
US 2017/0249625 A1     Aug. 31, 2017

Related U.S. Application Data

(60) Provisional application No. 61/991,284, filed on May 9, 2014.

(51) Int. Cl.
*G07B 15/02*     (2011.01)
*G06Q 30/02*     (2012.01)
(Continued)

(52) U.S. Cl.
CPC ....... *G06Q 20/3223* (2013.01); *G06Q 20/045* (2013.01); *G06Q 30/0266* (2013.01); *G06Q 30/0284* (2013.01); *G07B 15/02* (2013.01)

(58) Field of Classification Search
CPC ............. G06Q 20/3223; G06Q 20/045; G06Q 30/0266; G06Q 30/0284; G07B 15/02
See application file for complete search history.

(56) References Cited

U.S. PATENT DOCUMENTS 6,246,337 B1 *   6/2001   Rosenberg ........... G06Q 20/127
                                                       340/932.2
9,080,878 B2 *   7/2015   Skinder ................. G01C 21/16
(Continued)

FOREIGN PATENT DOCUMENTS

AU      2003264606 A1     7/2004
WO     2006039946 A1     4/2006

OTHER PUBLICATIONS

Hupe, Karen et al., Parking Today, "Personal In-Car Parking Meters", Apr. 2004, retrieved from https://www.parkingtoday.com/articledetails.php?id=47&t=personal-in-car-parking-meters (Year: 2004).*

*Primary Examiner* — Shannon S Campbell
*Assistant Examiner* — Bryan J Kirk
(74) *Attorney, Agent, or Firm* — Stoel Rives LLP

(57) ABSTRACT

A dynamic parking management platform (10) includes a mobile communication device (20), a parking server (12), and an electronic ticket device (30) that cooperate to enable a vehicle driver to effect electronically a secure parking fee payment transaction. The electronic ticket device emits a beacon signal to enable transmission of vehicle parking time and other information to a wireless communication device (40) carried by a parking service provider officer or attendant walking past a parked vehicle and not having to view a display surface on the electronic ticket device. A lock and key capability enables secure parking fee payments and prevents unauthorized parking fee transactions. The parking management platform configured to induce vehicle drivers to purchase a product or service by parking discount inducement or advertisement information from merchants whose stores are located nearby the vehicle parking area.

19 Claims, 41 Drawing Sheets

(51) Int. Cl.
*G06Q 20/04* (2012.01)
*G06Q 20/32* (2012.01)

(56) References Cited

U.S. PATENT DOCUMENTS

| | | | |
|---|---|---|---|
| 2003/0158891 A1* | 8/2003 | Lei | G06Q 20/327 |
| | | | 709/203 |
| 2004/0266456 A1 | 12/2004 | Bostrom et al. | |
| 2005/0226201 A1 | 10/2005 | Mcmillin | |
| 2010/0268618 A1* | 10/2010 | McQuilken | G06Q 20/32 |
| | | | 705/26.1 |
| 2011/0062230 A1 | 3/2011 | Ward, II et al. | |
| 2011/0145844 A1* | 6/2011 | Shafi | G06F 9/547 |
| | | | 719/330 |
| 2011/0191253 A1* | 8/2011 | Pilskalns | G06Q 20/3829 |
| | | | 705/71 |
| 2012/0062395 A1 | 3/2012 | Sonnabend et al. | |
| 2012/0188100 A1 | 7/2012 | Min et al. | |
| 2012/0245966 A1 | 9/2012 | Volz | |
| 2012/0317297 A1* | 12/2012 | Bailey | H04W 12/0431 |
| | | | 709/229 |
| 2012/0323643 A1 | 12/2012 | Volz | |
| 2013/0124270 A1* | 5/2013 | Tziperman | G07B 15/02 |
| | | | 705/13 |
| 2013/0159070 A1 | 6/2013 | Salamone | |
| 2014/0046874 A1 | 2/2014 | Li et al. | |
| 2014/0213176 A1* | 7/2014 | Mendelson | G08G 1/14 |
| | | | 455/39 |
| 2014/0240089 A1* | 8/2014 | Chang | G07C 9/00111 |
| | | | 340/5.61 |
| 2014/0320263 A1* | 10/2014 | Fan | E05F 15/77 |
| | | | 340/5.71 |
| 2014/0379442 A1* | 12/2014 | Dutta | G07F 17/246 |
| | | | 705/13 |
| 2015/0106172 A1* | 4/2015 | Salama | G07F 17/246 |
| | | | 705/13 |
| 2015/0116103 A1* | 4/2015 | Yang | G08B 21/24 |
| | | | 340/438 |
| 2015/0134454 A1* | 5/2015 | Sandbrook | G06Q 30/0261 |
| | | | 705/14.58 |
| 2015/0179070 A1* | 6/2015 | Sandbrook | G08G 1/149 |
| | | | 340/932.2 |

* cited by examiner

Scenario 1
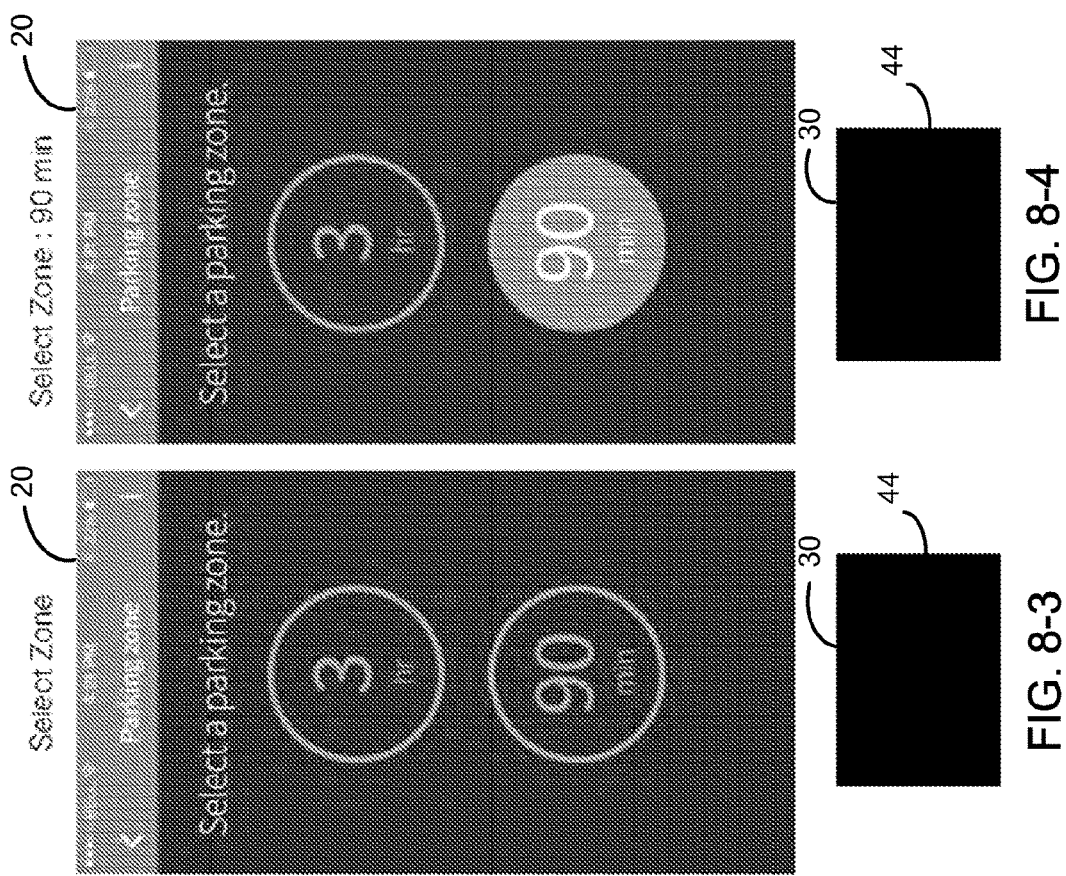
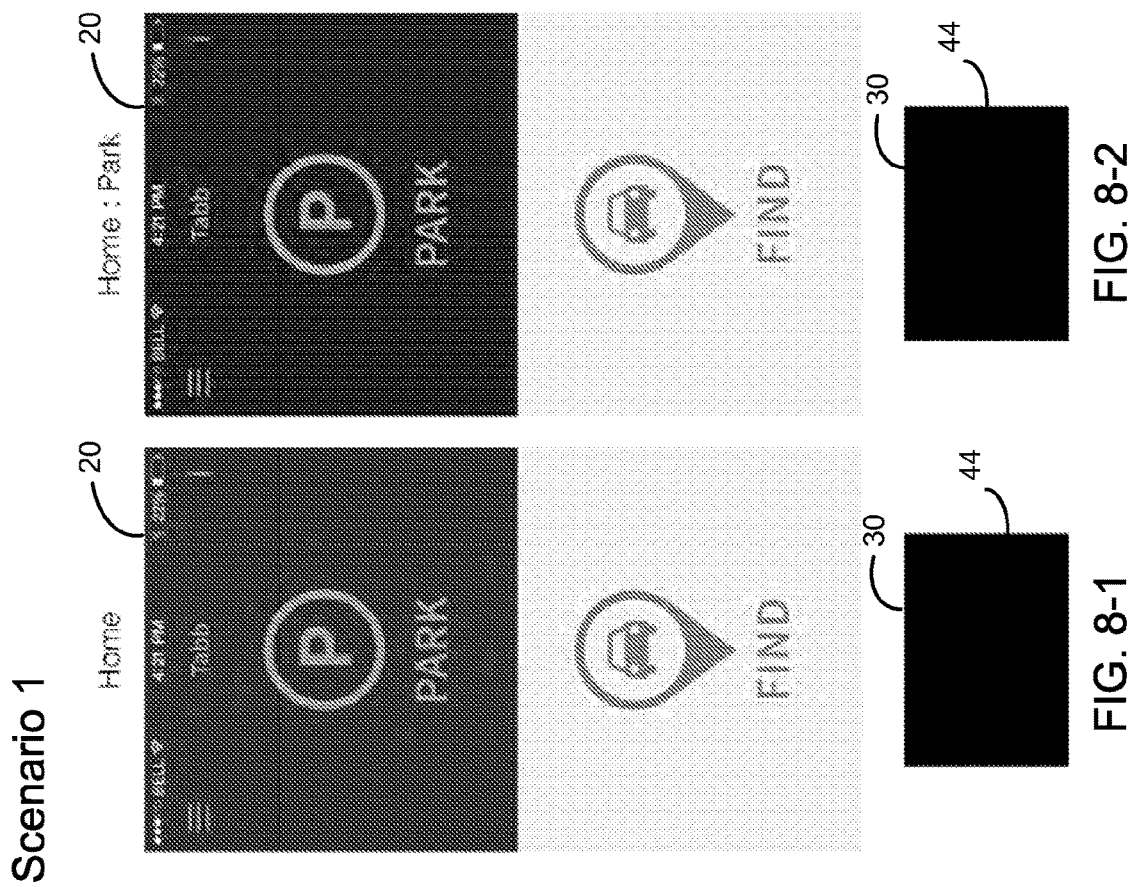
FIG. 8-1  FIG. 8-2  FIG. 8-3  FIG. 8-4

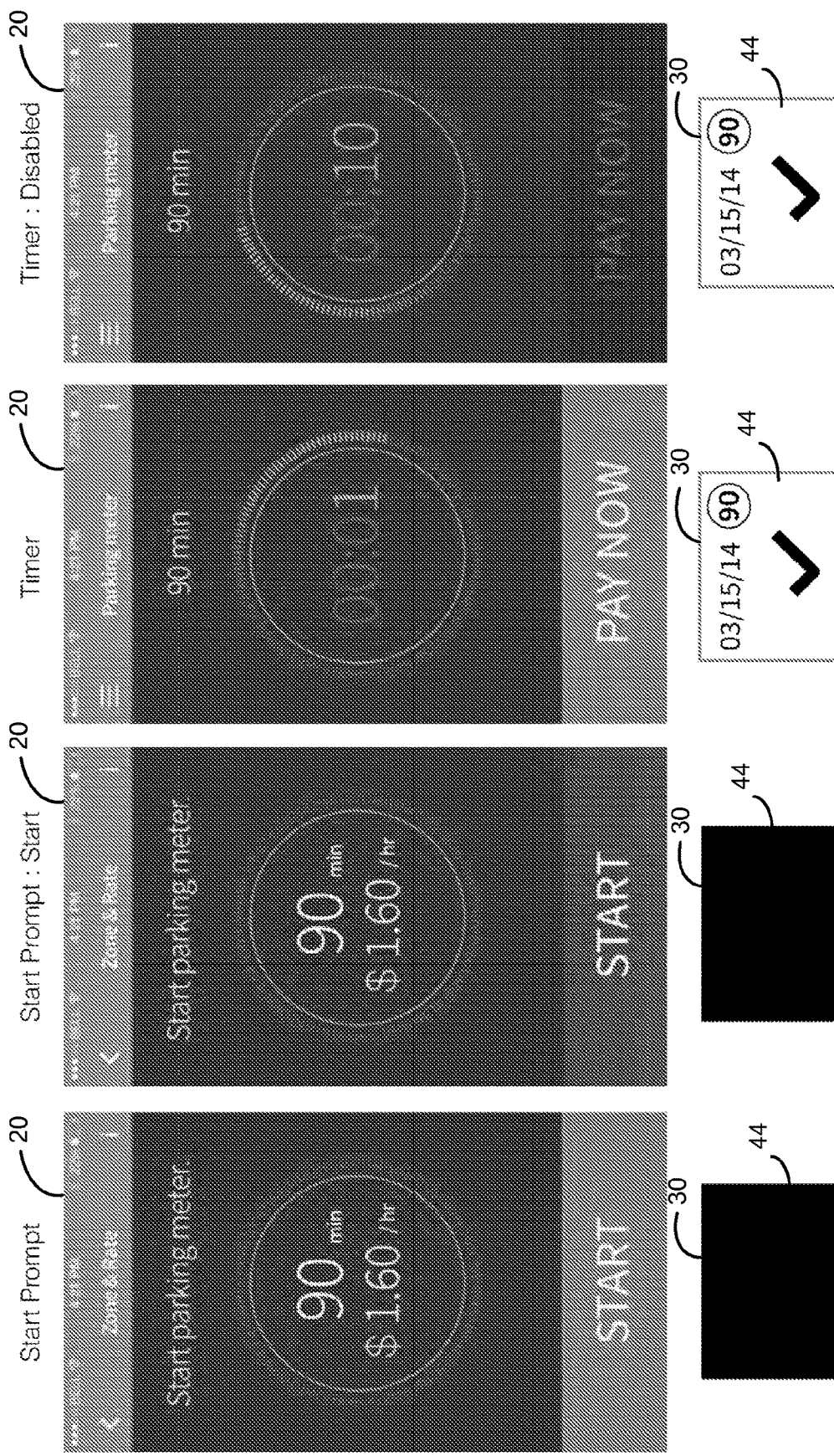

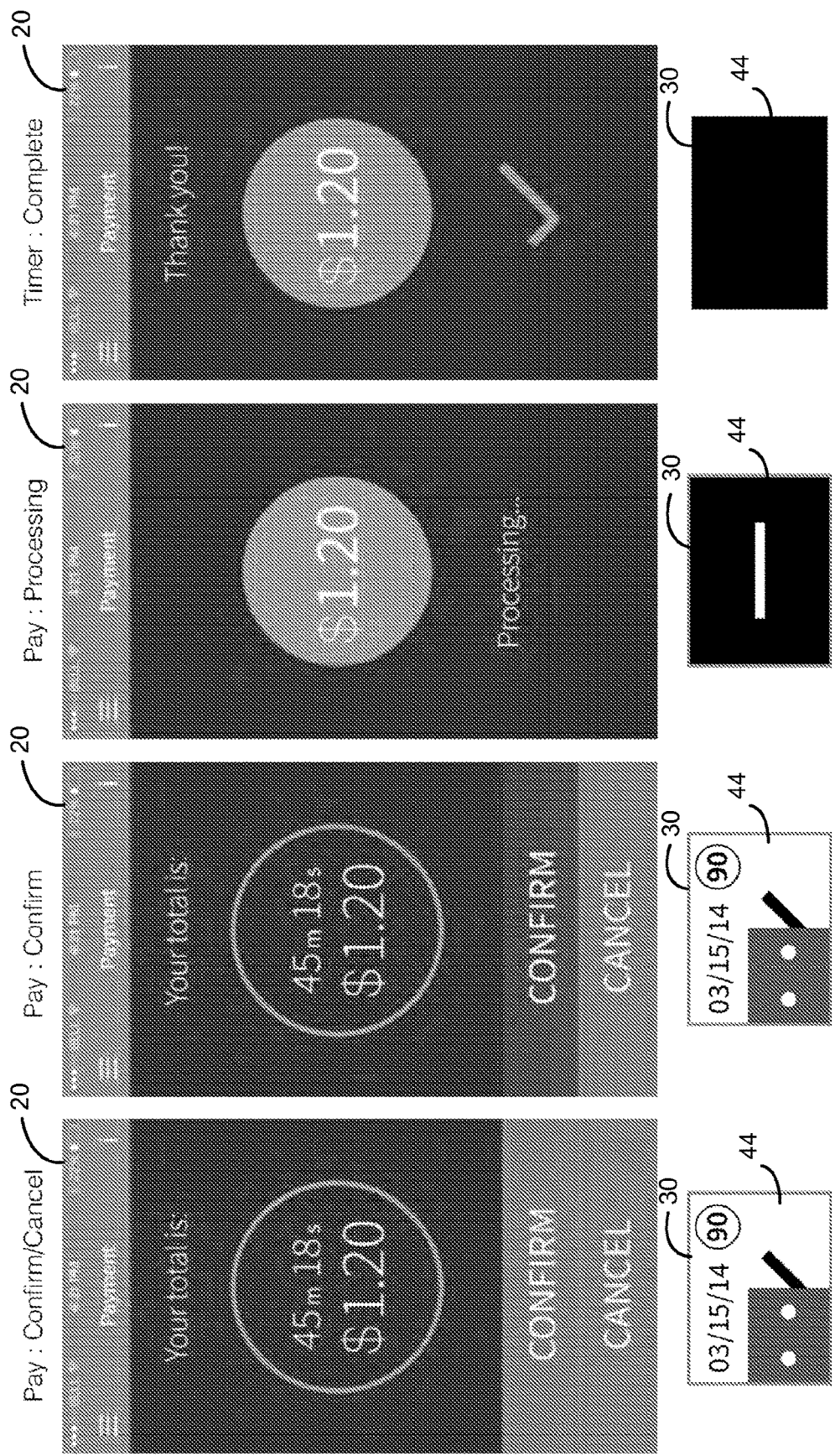

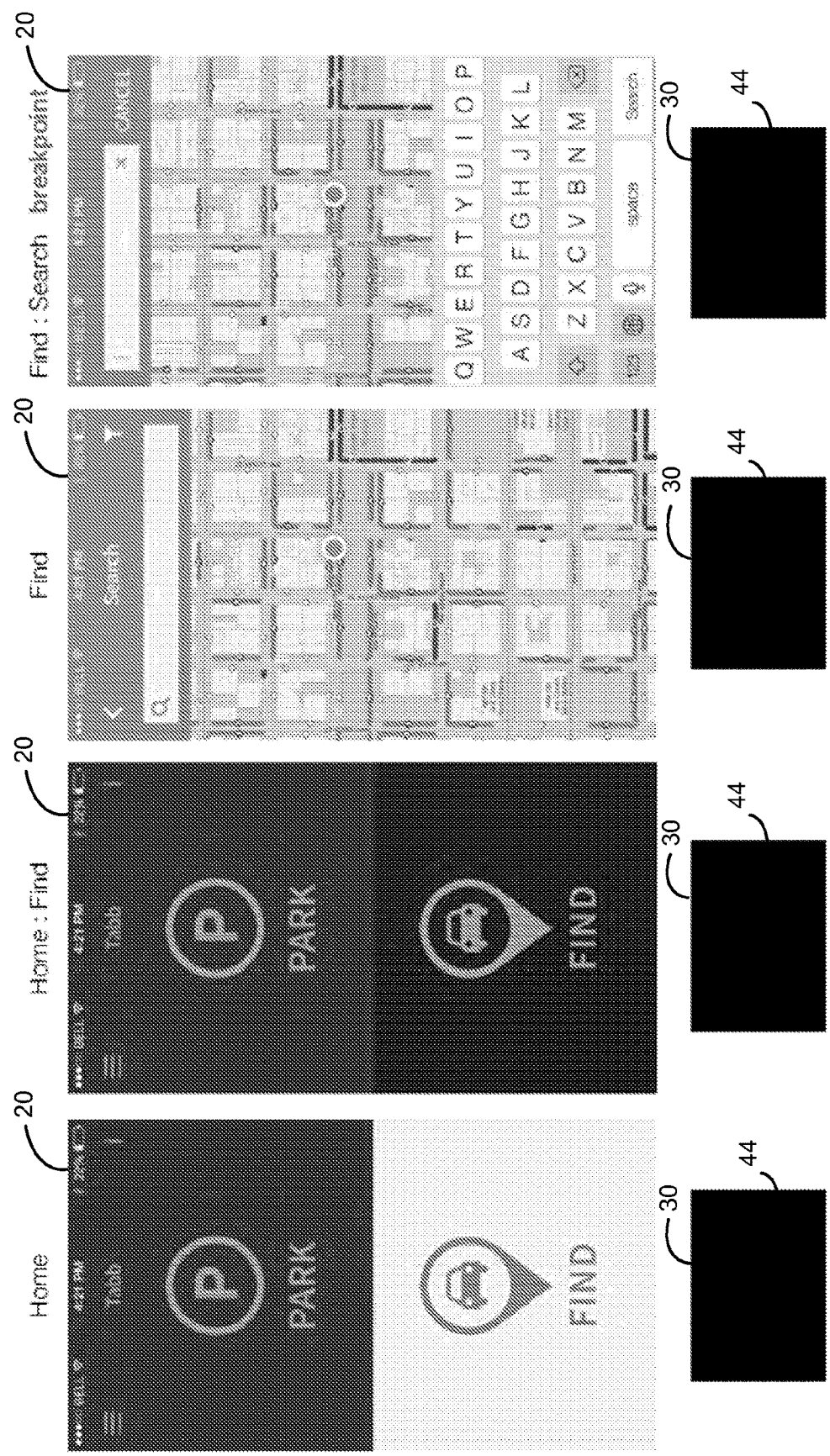

Scenario 2

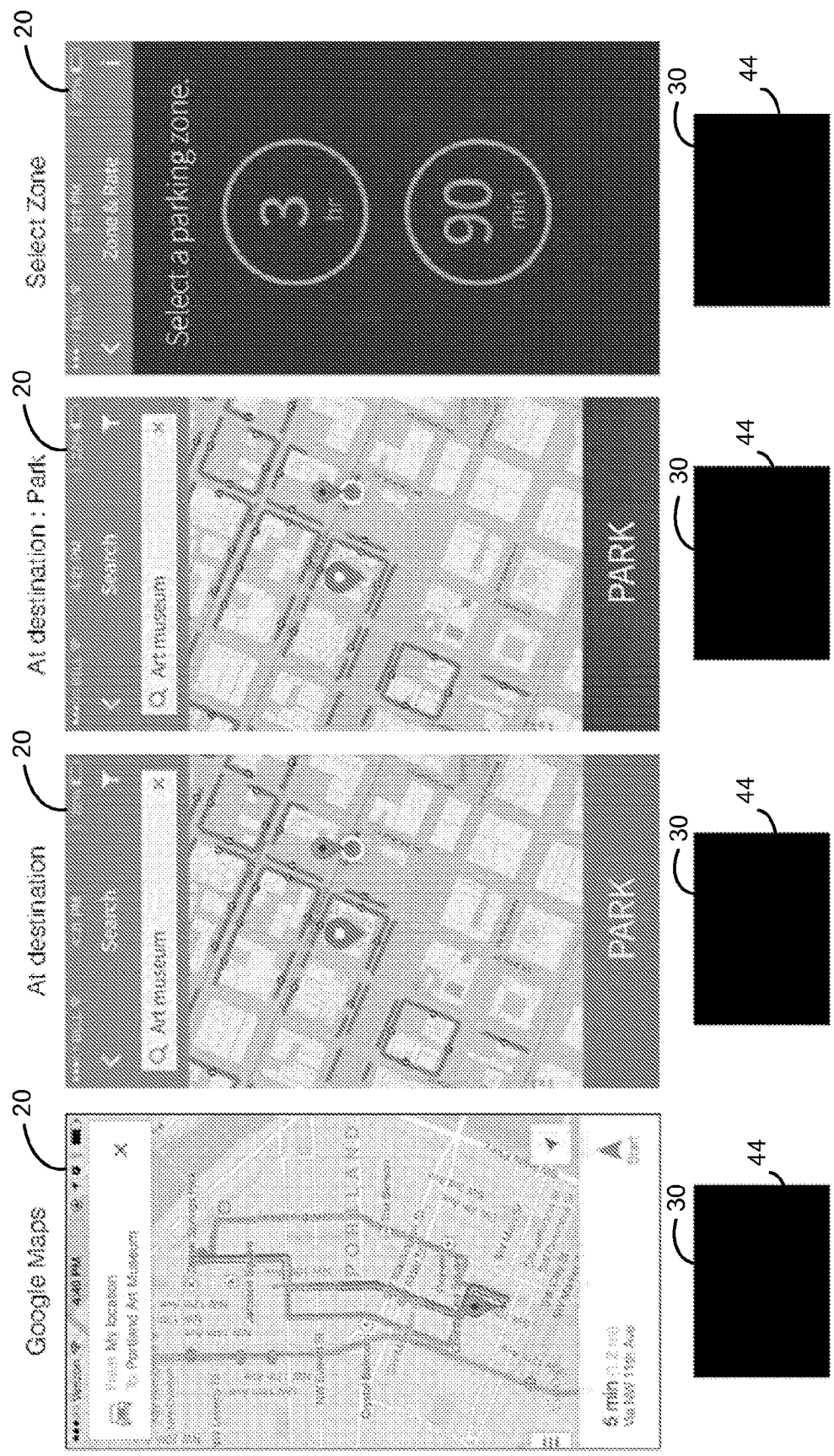

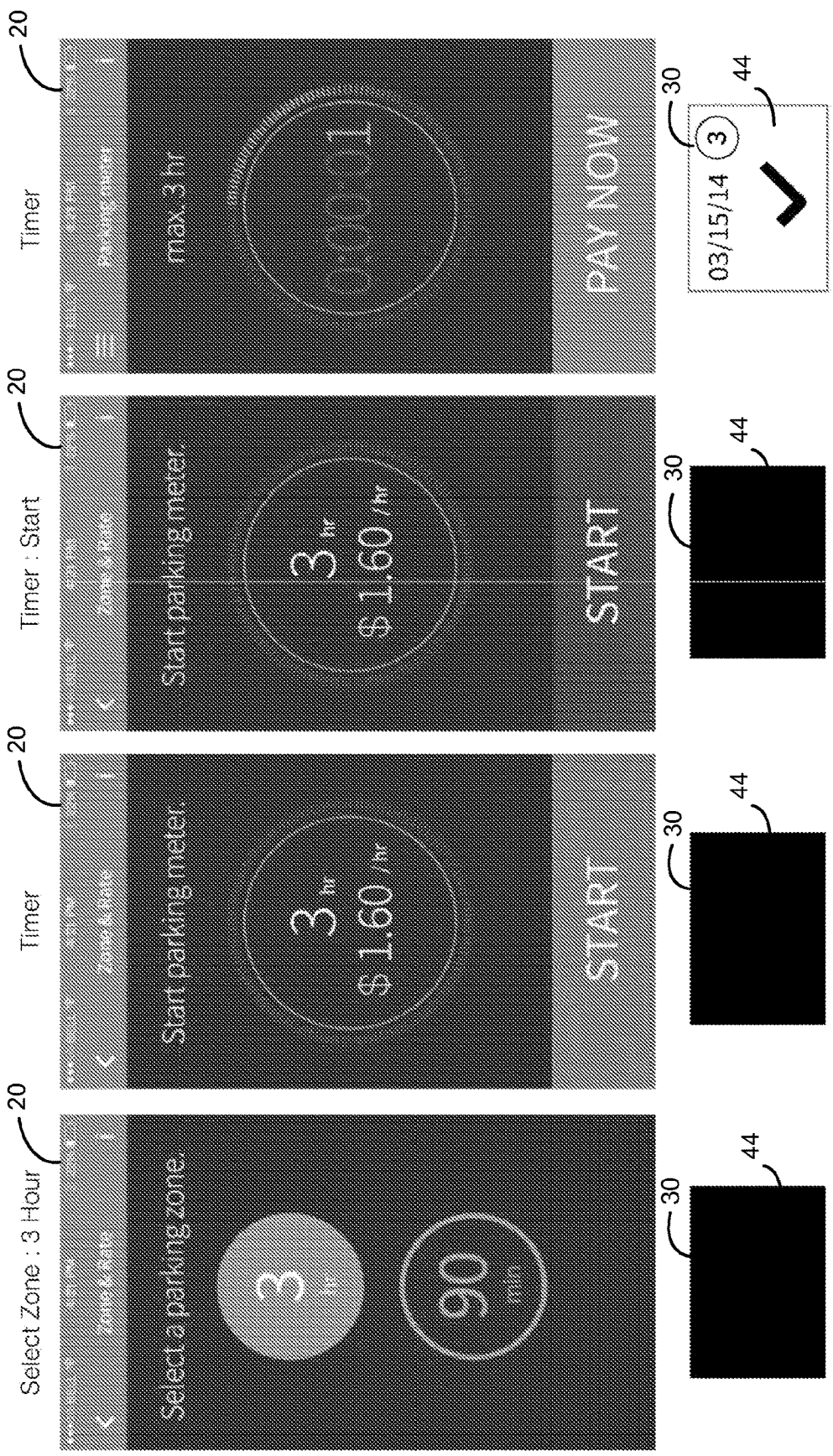

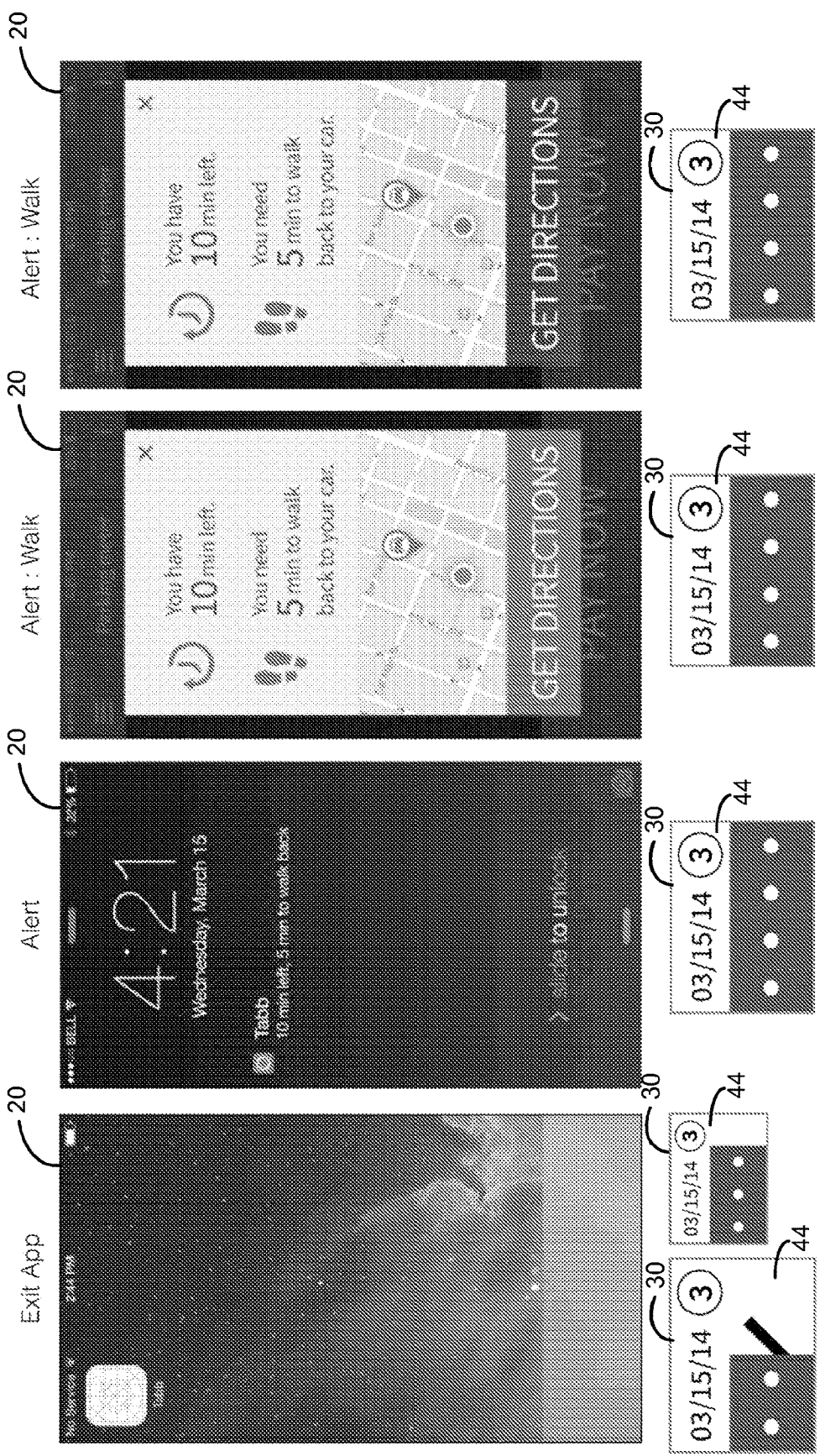

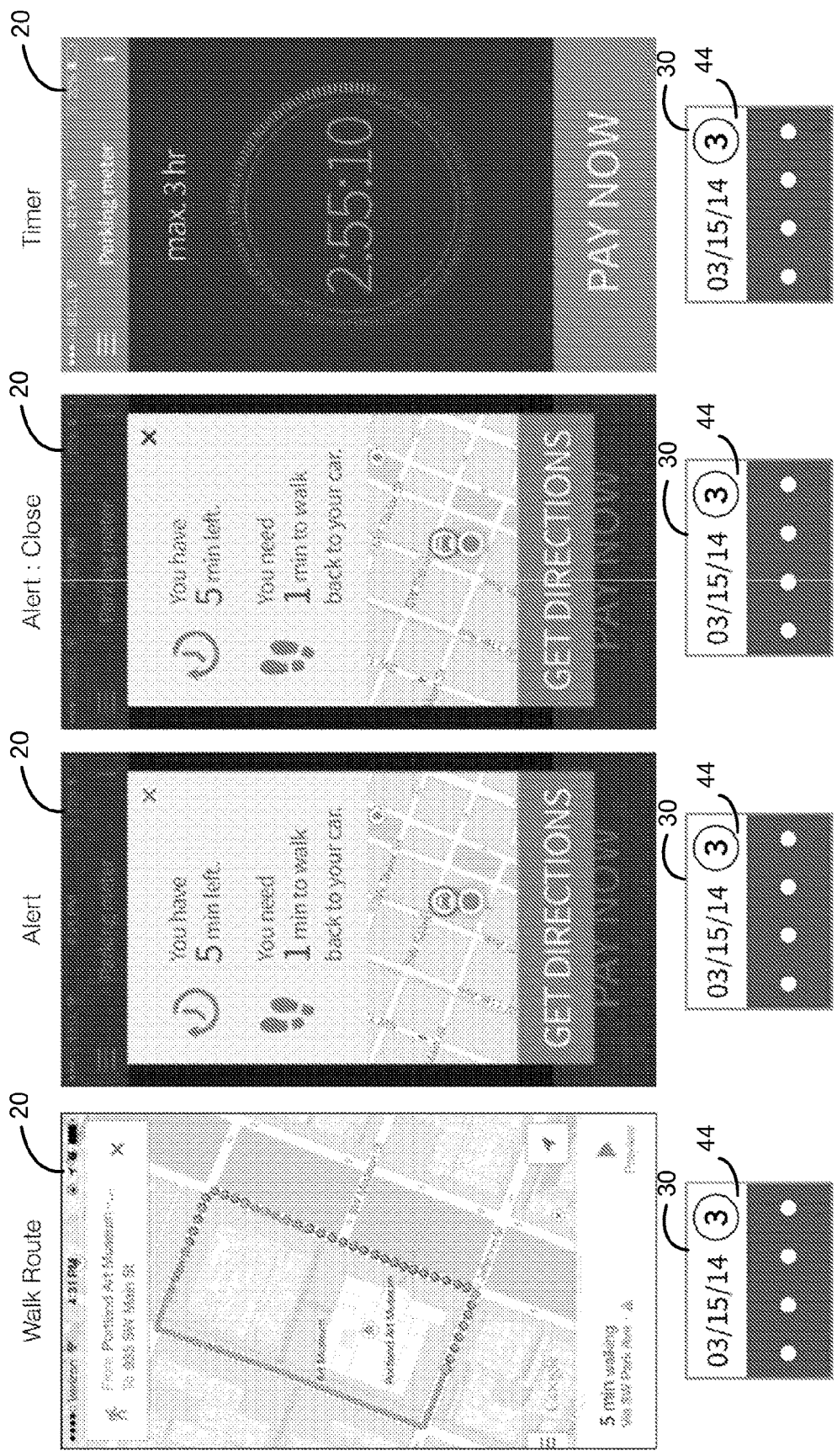

Scenario 2
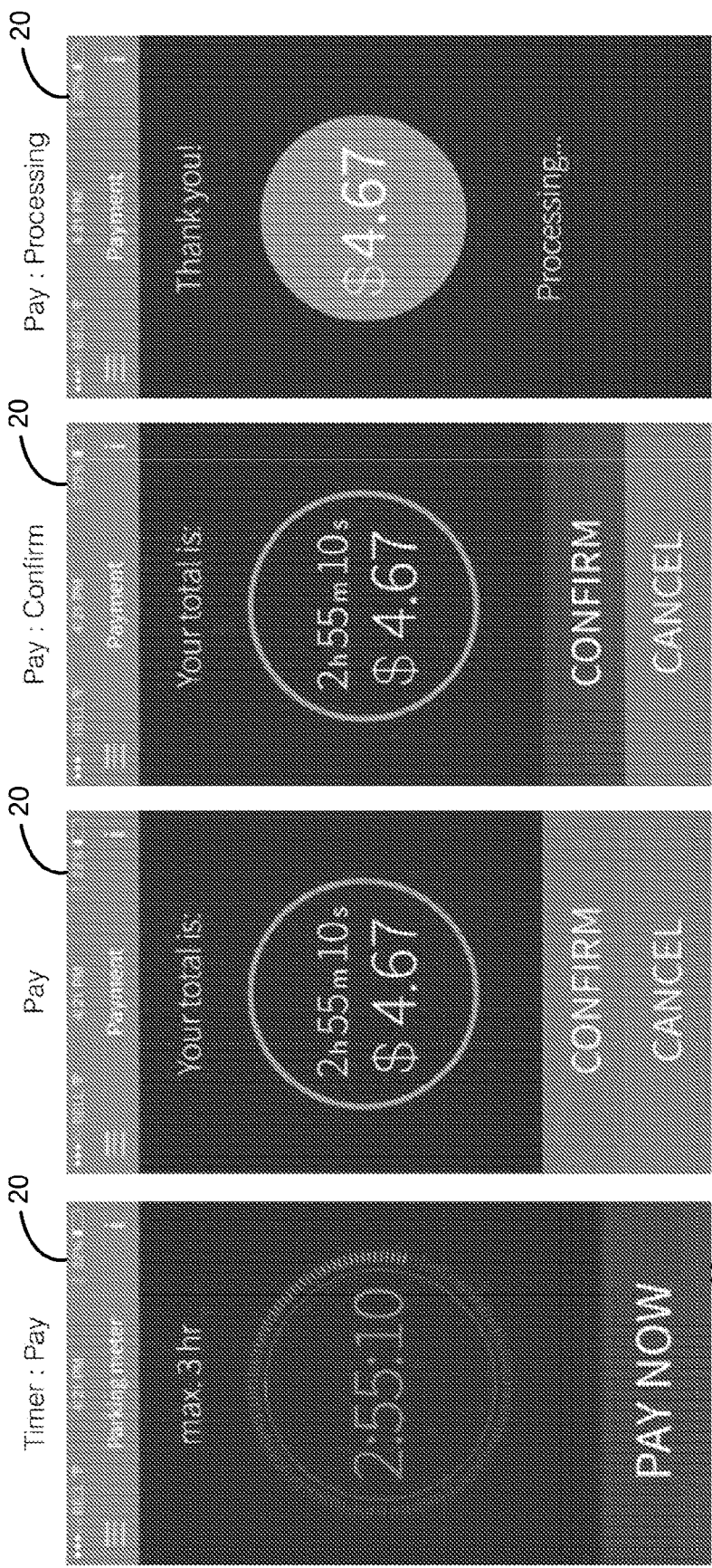
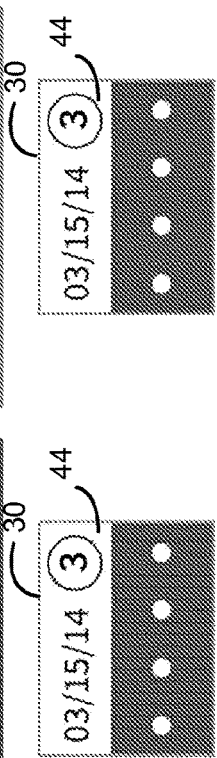
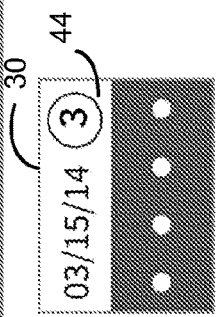
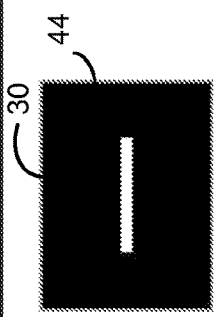
FIG. 9-29
FIG. 9-30
FIG. 9-31
FIG. 9-32

Scenario 2
Timer : Complete
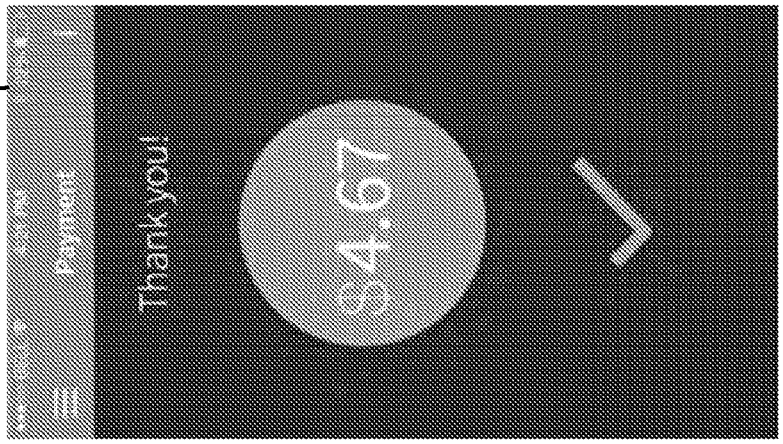
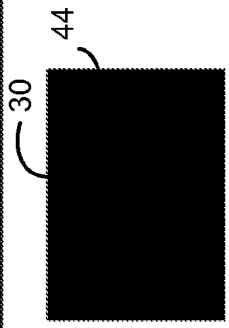
FIG. 9-33

DYNAMIC VEHICLE PARKING MANAGEMENT PLATFORM

COPYRIGHT NOTICE

© 2015 Citifyd, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to vehicle parking payment processing and, in particular, to a dynamic vehicle parking management platform that is based on existing infrastructure and vehicle driver behavior to simplify parking fee payment transactions. The disclosed parking management platform implements wireless communication technologies to free vehicle drivers from inconveniences of manual parking fee payment while creating business and marketing opportunities for local merchants to develop as customers vehicle drivers parking their vehicles in areas nearby the merchants' stores.

BACKGROUND INFORMATION

Millions of drivers park their vehicles daily on city streets, in parking lots, or in garage facilities. Municipalities for many years have been collecting and typically still collect parking fees from vehicle drivers making payments through use of mechanical or electronic parking meters. Municipalities use parking fee revenues to enforce integrated on-street parking policy, usually related to traffic and mobility management policies. Since its first deployment in 1936, the mechanical parking meter has undergone many innovations and improvements. All such devices are, however, costly for municipalities to install and operate and are either difficult or inconvenient for the vehicle drivers to use. Private providers of surface parking lot and parking garage facilities are staffed by either an on-site attendant to process parking permit tickets and collect parking fees or roving parking control attendants to ensure parking fee payment compliance. The manual collection of parking permit tickets and fee payments is labor intensive and costly to private parking providers.

What is needed is a dynamic parking management platform that implements a parking fee payment and collection system that simplifies the process of fee-based parking by vehicle drivers and the duties of parking control personnel, as well as reduces the cost of operation and management of (1) metered and non-metered on-street parking to municipalities and (2) parking lots and garage facilities to private providers.

SUMMARY OF THE DISCLOSURE

The disclosed dynamic parking management platform is implemented in hardware and software and is based on the existing infrastructure and behavior of the users (vehicle drivers) and parking service providers (municipalities and their parking enforcement officers; private providers and their parking facility attendants; private individuals). (The terms "user" and "vehicle driver" are used interchangeably throughout the descriptions presented herein.) The disclosed system enables dynamic pricing of parking fees and dynamic setting of parking time limits, and thereby implementation of different revenue models, and paperless issuance of different types of parking permits by the municipalities or private providers.

Main components of the parking management platform include a mobile communication device (e.g., smartphone) App of a parking service provider (e.g., municipality or private parking provider), a parking (i.e., backend) server on which the parking service provider stores parking account and transaction information, and an auxiliary electronic ticket or "E-Ticket" device. The user creates an account that resides on the parking server by downloading the App to the user's mobile communication device and carrying out the account formation process. Thereafter, the user receives, in the mail from, or at a conveniently located authorized source, an E-Ticket device in the form of a credit card size display or radio signal beacon-emitting capable device. The user performing procedural steps presented by the interface of the App operating on the user's mobile communication device can set up a parking payment account with the parking service provider, provide credit (or debit) card information, and check at any time a statement of parking activities. Setting up a parking payment account is a one-time operation, which takes place during an initial use of the App. The parking server credits the accounts of all parking service providers who have subscribed to parking server operator services. The vehicle driver uses the App to communicate with and actuate the E-Ticket device and the parking account established with and residing on the parking server to effect a parking fee payment transaction between the vehicle driver's credit card and the parking account.

In all cases of parking provider services, the App informs the vehicle driver about locations of different time-limited parking zones; locations of parking garages, parking lots, street parking areas, and privately owned parking areas (e.g., a homeowner's driveway); different garage facility, parking lot, and street parking rates before parking; and the amount of time remaining before expiration of parking time allowed under a time limit. The App also informs the vehicle driver about the location of the vehicle after parking; the amount of elapsed parking time; and, with a predetermined amount of parking time remaining (e.g., 10 minutes), the amount of walking time needed to return to the parked vehicle. The App can cause the E-Ticket device or the mobile communication device itself to emit a beacon that causes a parking garage barrier gate to open at the start of a parking session. The App also uses encryption technology to transfer data, activate and deactivate the E-Ticket device, and communicate to the parking server the amount of time the vehicle occupied the parking space.

The parking management platform implements a lock and key feature that affords a highly secure parking transaction. Secure parking transactions are achieved by the use of two separate devices, the E-Ticket device and the mobile communication device, operating in proximity to each other. When they are in proximity to each other, these two devices communicate over a short-range wireless communication link and exchange identification information to achieve secure device pairing that enables connection to the parking servers. Forming a connection with the parking servers enables a vehicle driver to carry out a parking related transaction. No parking related transaction can be performed when the E-Ticket and mobile communication devices are separated from each other by a distance that is outside the connectivity range of the short-range wireless communication link. A lost or stolen E-Ticket device or mobile communication device cannot, therefore, itself be used to perform a parking related transaction because no connection to the parking servers can be achieved.

The parking management platform makes possible a service that frees a vehicle driver from all hassles and inconveniences of paying for on-street, surface lot, or garage facility parking. The parking fee payment service enabled by this parking management platform is implemented without (1) changes to the street parking infrastructure of and management process practiced by a municipality or (2) disruptive changes to private parking lot or garage facility operations. The disclosed parking management platform is configured such that municipalities could eventually eliminate most, if not all, of their parking meter machines. Additional aspects and advantages will be apparent from the following detailed description of preferred embodiments, which proceeds with reference to the accompanying drawings.

BRIEF DESCRIPTION OF THE DRAWINGS

FIGS. 3-1-3-8 illustrate the communication signal connections among the components of the system of FIG. 1 as a vehicle driver performs the various parking transaction account-related acts.

FIG. 6, which includes a set of two drawing sheets (FIGS. 6-1 and 6-2), is a flow diagram showing the functions performed by an App operating on a mobile communication device and performed by the E-Ticket device in carrying out the vehicle parking transaction process described with reference to FIGS. 3-1-3 8.

FIGS. 7-1-7-6 represent a set of six screenshots of information appearing on a display surface of the E-Ticket device during different points in time a vehicle remains parked in a parking area.

FIGS. 8-1-8-16 represent, for a first vehicle parking scenario, a set of 16 stacked pairs of screenshots, each pair showing the display of the mobile communication device (upper screenshot) and the display surface of the E-Ticket device (lower screenshot) during different points in time a vehicle driver locates, parks at, and pays for a parking area.

FIGS. 9-1-9-33 represent, for a second vehicle parking scenario, a set of 33 stacked pairs of screenshots on the displays described for FIGS. 8-1-8-16.

FIG. 10 is a simplified diagram of the floor plan layout of a store operated at a known location by a merchant who has arranged to participate in an advertising program offered by a parking service provider or its agent.

FIG. 11, which includes a set of five drawing sheets (FIGS. 11-1, 11-2, 11-3, 11-4, and 11-5), is a flow diagram of screenshots showing information displayed on the mobile communication device for different interactions with the system of FIG. 1.

FIG. 12, which includes a set of two drawing sheets (FIGS. 12-1 and 12-2), is a flow diagram showing the offers, redemption, and credit interaction associated with local rewards made available by businesses and merchants located nearby the vehicle driver's parking space, as indicated by Screen U and link 30 in FIG. 11-5.

FIG. 13 is a flow diagram showing an opportunity for a vehicle driver to contribute money to a charity or nonprofit organization and pay the amount of money contributed, as indicated by Screen W and link 29 in FIG. 11-5.

FIG. 14, which includes a set of two drawing sheets (FIGS. 14-1 and 14-2), is a flow diagram of screenshots showing the operation of the system of FIG. 1 in the map/direction selection process that routes the vehicle driver to a parking space.

FIG. 15 is a block diagram of a vehicle detection system for installation at a vehicle entrance/exit point of an open surface parking lot.

DETAILED DESCRIPTION OF PREFERRED EMBODIMENTS

Figure 1:
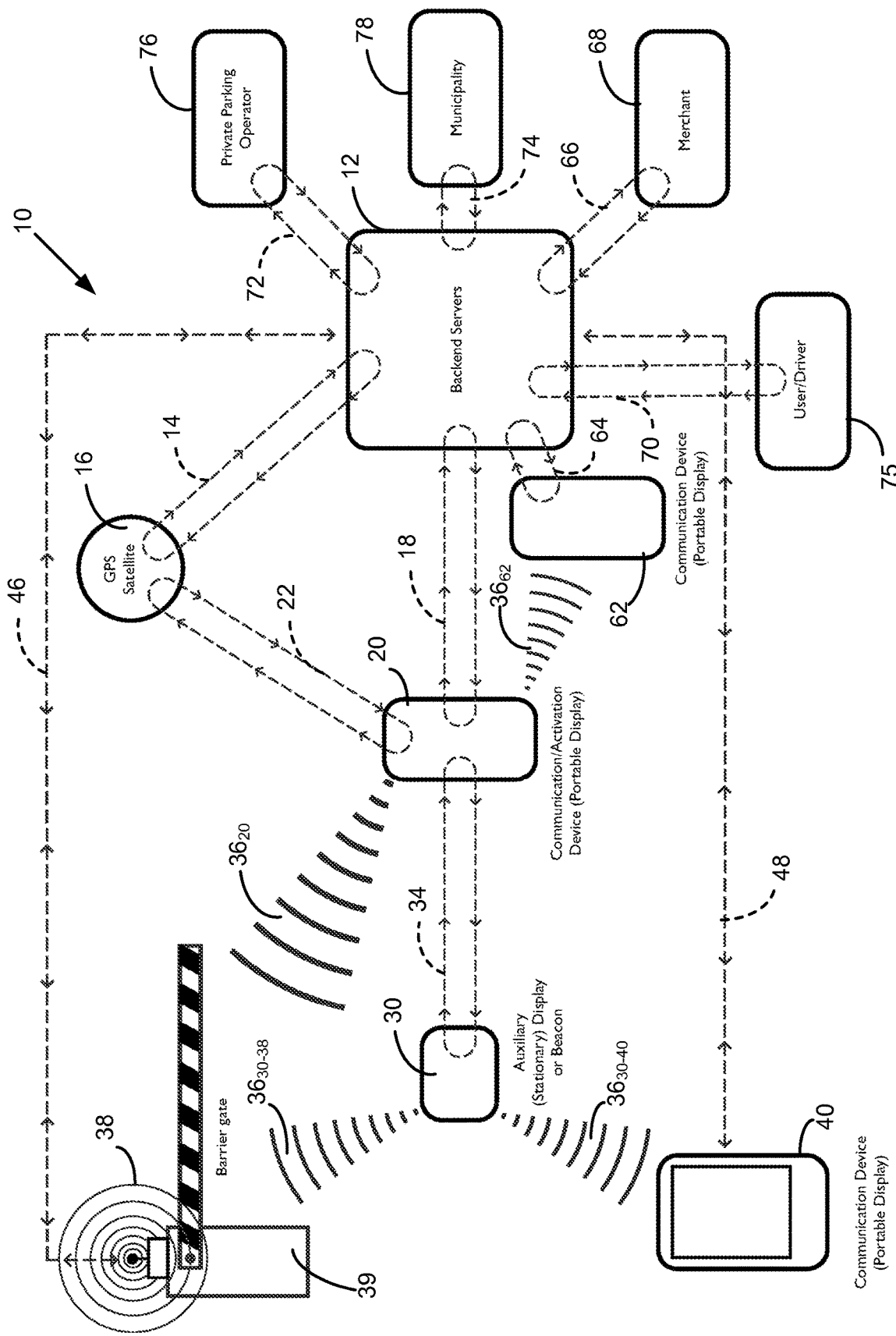
FIG. 1 is a system block diagram showing the main components of a parking fee payment and collection management system representing a preferred embodiment of the disclosed parking management platform.

FIG. 1 is a system block diagram showing the main components of a parking fee payment and collection management system 10, as a preferred embodiment of the disclosed parking management platform. With reference to FIG. 1, system 10 includes one or more backend or parking servers 12 on which a parking service provider stores parking account information and transaction information. A preferred parking service provider is a municipality or a private parking provider that uses parking servers 12 to process transactions associated with established vehicle driver parking fee payment accounts. (A parking service provider could, of course, enter into a contractual arrangement with a separate entity to process transactions associated with the parking fee payment accounts.) Parking servers 12 are implemented with a communication signal interface to establish a wireless radio signal communication link 14 with a navigation system 16, such as the global positioning system (GPS) space-based satellite network, and a wireless communication link 18 through cellular communication network protocols with a wireless-connection enabled mobile communication device 20, such as a smartphone carried by a vehicle driver. Mobile communication device 20 is implemented with a communication signal interface to establish communication link 18 and establish a wireless radio signal communication link 22 with GPS navigation system 16. Communication links 14 and 22 established with GPS navigation system 16 are used to determine, and provide to parking servers 12, information about the location and movement of the vehicle driver carrying mobile communication device 20.

Figure 2:
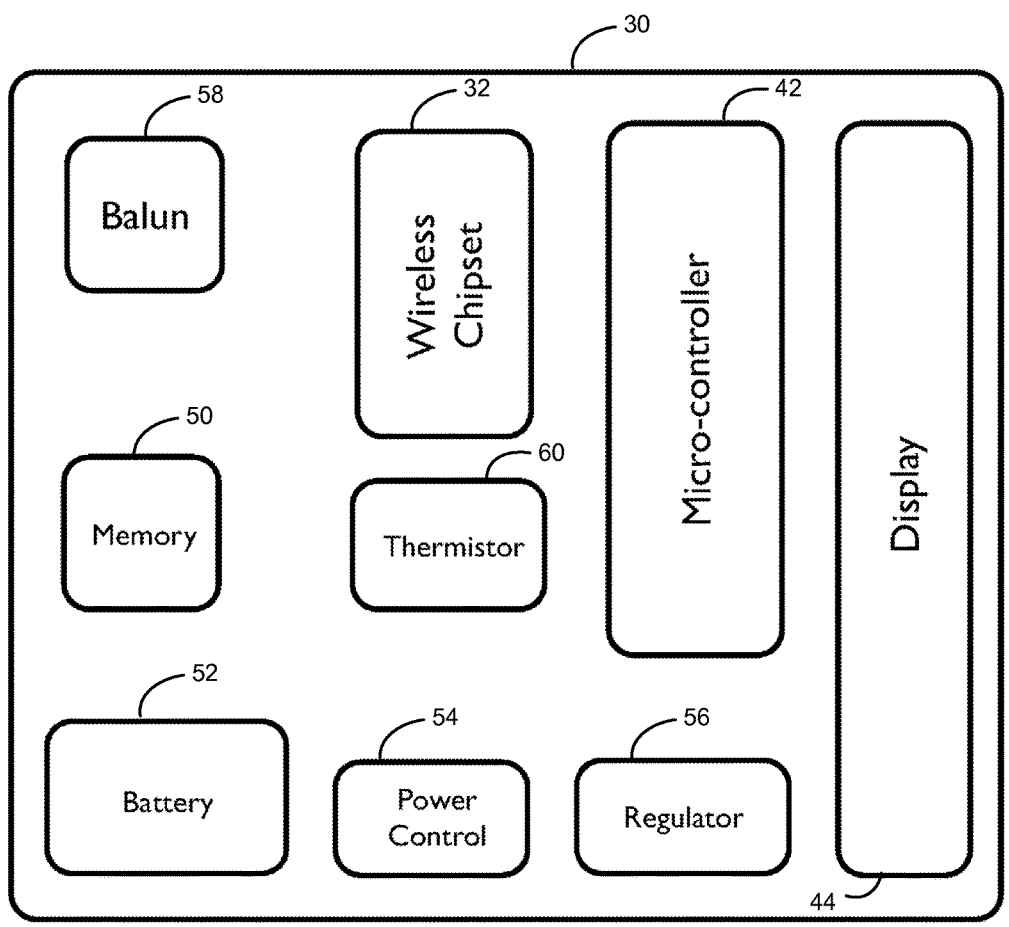
FIG. 2 is a block diagram of an auxiliary E-Ticket device shown in the system of FIG. 1.

System 10 also includes an auxiliary E-Ticket device 30, a block diagram of which is shown in greater detail in FIG. 2. With reference to FIGS. 1 and 2, E-Ticket device 30 is implemented with a wireless connection protocol device or communication signal interface 32 that produces a short-range wireless radio signal (e.g., Bluetooth®, ZigBee®, or Near Field Communication (NFC) wireless communication technologies). The radio signal produced by communication signal interface 32 is used to establish one or both of (1) a wireless communication link 34 between E-Ticket device 30 and mobile communication device 20 and (2) a wireless communication link $36_{30-38}$ by emission of a beacon signal to a parking lot or garage barrier gate transceiver 38 mounted on a barrier gate bollard 39 or a wireless communication link $36_{30-40}$ by emission of a beacon signal to a portable display-equipped communication device 40 carried by a parking patrol officer or parking service attendant. (A parking service attendant would include a private property owner managing a private parking service for use of, for example, the driveway of the property owner's home.) E-Ticket device 30, which has a thin profile and is about the size of a credit card, is a display device that includes a microcontroller 42 performing, among other operations, clock and timer functions.

A communication link $36_{30\text{-}38}$ between E-Ticket device 30 and barrier gate transceiver 38 may also be established by emission of a beacon signal from transceiver 38. This beacon signal is preferably implemented in the ZigBee® communication protocol because it exhibits higher security and lower power consumption as compared with other currently available wireless personal area networks.

For implementations in which a beacon signal is not in use, E-Ticket device 30, by way of communication link 34, receives from mobile communication device 20 a start timer command to track vehicle parking time, information about maximum allocated parking time, and current parking time information for presentation on a display surface 44. When in use in a parked vehicle, E-Ticket device 30 remains stationary after its placement inside the parked vehicle and at a location (e.g., rests on the vehicle dashboard or against the vehicle window) in plain view of a parking patrol officer or parking service attendant tasked with reading parking time information presented on display surface 44. An option would be to integrate the functionality of E-Ticket device 30 by installing it into a vehicle dashboard instrument console, at a location where display surface 44 would be visible from outside the vehicle. Parking time information includes parking time remaining before expiration of the vehicle parking time allowed under the time limit specified for the parking area or any grace period provided after expiration of the vehicle parking time.

For implementations in which a beacon signal is in use, either E-Ticket 30 emits beacon signal for reception by barrier gate transceiver 38 or barrier gate transceiver 38 emits a beacon signal for reception by E-Ticket 30 to initiate the process of opening a parking entrance gate as a vehicle enters a gated parking lot or garage. The App operating on mobile communication device 20 could also cause emission of a beacon signal for acquisition by barrier gate transceiver 38 or enable reception of a beacon signal emitted by barrier gate transceiver 38 to establish a communication link $36_{20}$ to initiate the process of opening the parking entrance gate. Mobile communication device 20 cannot, however, establish communication link $36_{20}$ in the absence of connectivity with E-Ticket device 30. Unless they are in proximity to each other within the connectivity range of the wireless connection, E-Ticket device 30 and mobile communication device 20 cannot achieve a device pairing connection and, therefore, cannot produce signals that cooperate to initiate a parking transaction. This ensures, for example, that the barrier gate cannot be opened as a person carrying mobile communication device 20, and while leaving a parking lot or garage and leaving behind E-ticket device 30 in the parked vehicle, walks by barrier gate transceiver 38.

Each of the beacon signals emitted, or produced in response to beacon signals emitted by barrier gate transceiver 38, by E-Ticket 30 to establish communication link $36_{30\text{-}38}$ and mobile communication device 20 to establish communication link $36_{20}$ carries an identification number associated with the vehicle driver's parking account. The identification number is transmitted by way of wireless communication link 46 to parking servers 12 to verify the parking account, obtain all pertinent information, open the account, and start a timer to count the amount of parking time used. E-Ticket device 30 also counts the amount of elapsed parking time and presents it for observation on display surface 44. Parking servers 12 transmit through communication link 46 a gate opening signal to barrier gate transceiver 38, upon verification of the parking account, and parking fee information to mobile communication device 20.

E-Ticket 30 emits a beacon signal that is transmitted over communication link $36_{30\text{-}40}$ for reception also by communication device 40 to display to a parking patrol officer or parking service attendant the vehicle driver's account identification number and to transmit the vehicle driver's account identification number by a wireless radio communication link 48 to parking servers 12. Each of wireless communication links 46 and 48 communicates preferably, but not necessarily, through Internet Protocol (IP) technology. The beacon signal emission capability enables a parking patrol officer parking service attendant to obtain information about the vehicle parking time without having to view display surface 44 on E-Ticket 30. Using beacon signal emissions can eliminate a need for and cost of display surface 44 on E-Ticket 30. E-Ticket device 30 constructed without display surface 44 would be preferably equipped with light-emitting diodes (LEDs) functioning as indicators of operational status, parking time expiration, grace period operation, or other such status conditions.

The vehicle driver returning to the parking area uses the App operating on mobile communication device 20 to send to E-ticket device 30 a stop timer command and to signal parking servers 12 to stop the timer and obtain the total parking time. Parking servers 12 thereafter conclude the transaction by closing the parking account and applying the parking fee charge to the vehicle driver's credit card on file.

Microcontroller 42 coordinates the communication of information delivered to and received from mobile communication device 20, manages storage of information in memory sites 50, and processes information for display on display surface 44. E-Ticket device 30 has its own electrical power supply, including a battery 52, power control circuitry 54, and a voltage regulator 56. Communication signal interface 32 is preferably a ZigBee® wireless chipset, and a balun 58 provides an impedance match for the antenna in the module containing wireless chipset 32. A thermistor 60 monitors the ambient temperature of E-Ticket device 30 and enables microcontroller 42 to deactivate E-Ticket device 30 when it is exposed to extreme temperatures.

FIG. 1 also shows components of system 10 that implement authorization and redemption processes carried out when the vehicle driver interacts with a parking attendant or a merchant. Mobile communication device 20 transmits a short-range wireless radio signal carrying an authorization or a redemption code for receipt by an attendant/merchant communication device 62. The signal carrying the authorization or redemption code establishes a wireless communication link $36_{62}$, with attendant/merchant communication device 62 when it is located in proximity to mobile communication device 20. In response to the signal, attendant/merchant communication device 62 produces a radio signal that establishes a wireless communication link 64 with parking servers 12 to obtain information indicating whether to authorize entry into a parking facility or to authorize a transaction and an associated redemption code.

The following describes in detail the operation of system 10 when a vehicle driver undertakes to establish a parking transaction account on system 10, use system 10 to locate and pay for use of a parking area, and check parking activity on the parking transaction account record. FIGS. 3-1-3-8 illustrate the communication signal connections among the components of system 10 as the vehicle driver performs the various parking transaction account-related acts stated above.

Figures 1, 3:
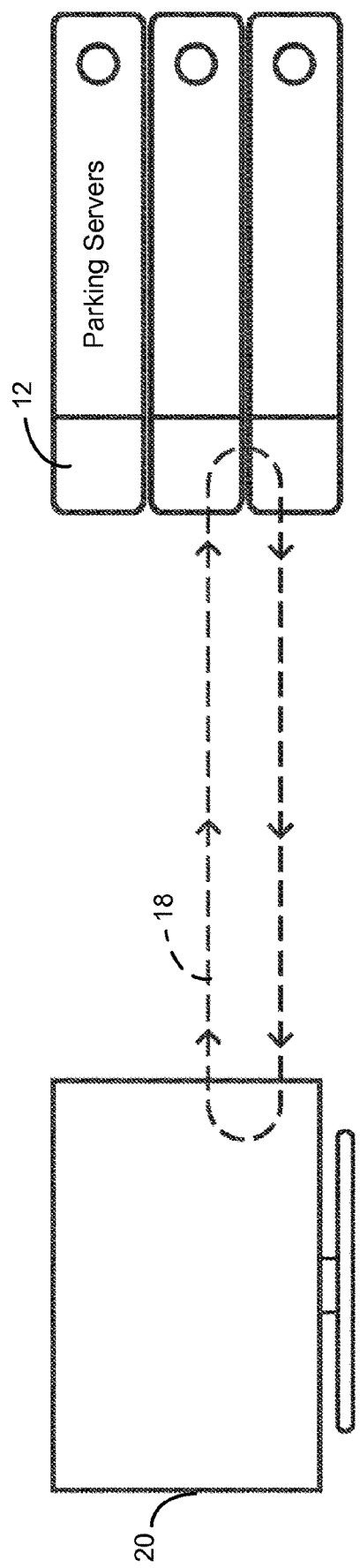
Figures 2, 3:
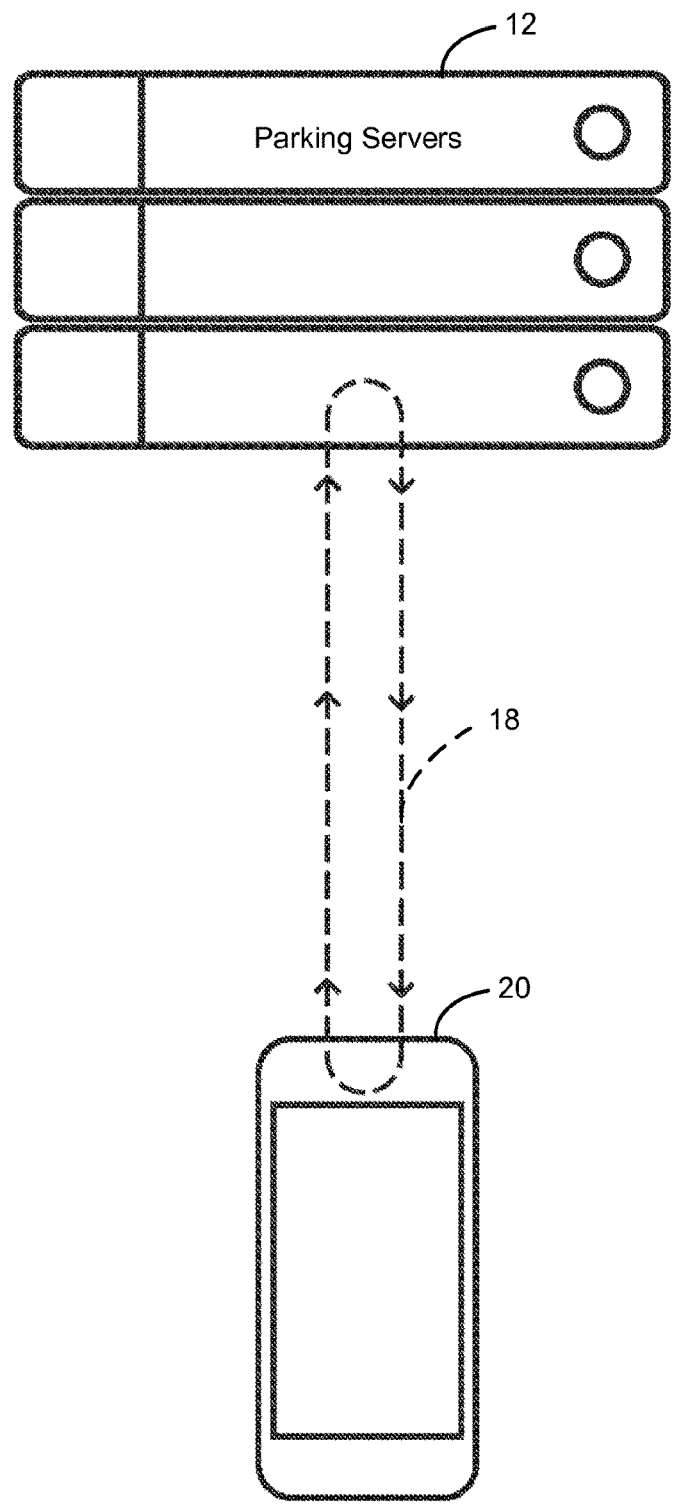
Figure 3:
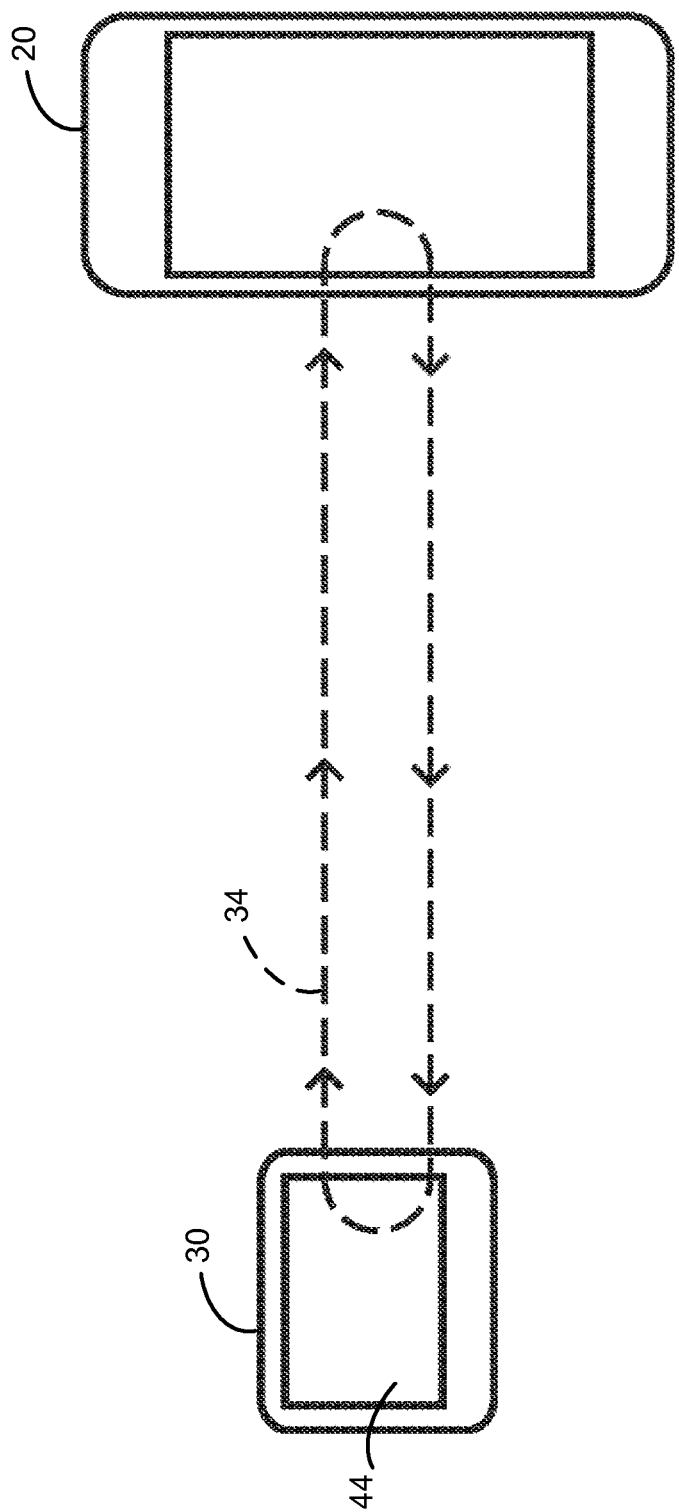

With reference to FIG. 3-1, using mobile communication device 20 communicating through a wireless communication link 18, a vehicle driver sets up on parking servers 12 a parking payment account for the parking service provider. The parking payment account includes password, mobile telephone, and credit card numbers, as well as other account set-up information such as the vehicle license plate identification information. The vehicle driver can customize the user interface (e.g., font size), time intervals for alerts, and other user-preferred feature settings. A unique, coded mobile communication device App is generated and assigned to the parking transaction account, which is set up to recognize the vehicle driver's mobile telephone number. (The vehicle driver could alternatively use a personal computer communicating through a wireless Internet Protocol connection to set up the parking payment account. This less desirable approach would entail construction of a website interface at extra cost.)

With reference to FIG. 3-2, the vehicle driver downloads the App to mobile communication device 20. The App recognizes the mobile telephone number and is then uploaded to mobile communication device 20.

With reference to FIG. 3-3, using the downloaded App operating on mobile communication device 20, the vehicle driver enters the serial number of E-Ticket device 30. The vehicle driver synchronizes the App with E-Ticket device 30 through Bluetooth® or NFC communication link 34. A lock and key combination is created between the App, which is dedicated to the vehicle driver's specified mobile cellular) telephone number, and E-Ticket device 30. The completion of this procedure establishes the parking payment account. The lock and key combination established between E-Ticket device 30 and mobile communication device 20 with use of the specified cellular telephone number implements a secure device pairing that prevents unauthorized parking charges against the vehicle driver's parking account. E-Ticket device 30 itself is incapable of communicating with parking servers 12; therefore, theft or loss of E-Ticket device 30 cannot compromise the vehicle driver's parking account. Mobile communication device 20 carried by any individual located outside the connectivity distance range of communication link 34 cannot interact with E-Ticket device 30 and cannot initiate account activity with parking servers 12. A lost mobile communication device 20 cannot, therefore, be used to activate an account or accumulate parking charges on the vehicle driver's parking account.

Figures 3, 4:
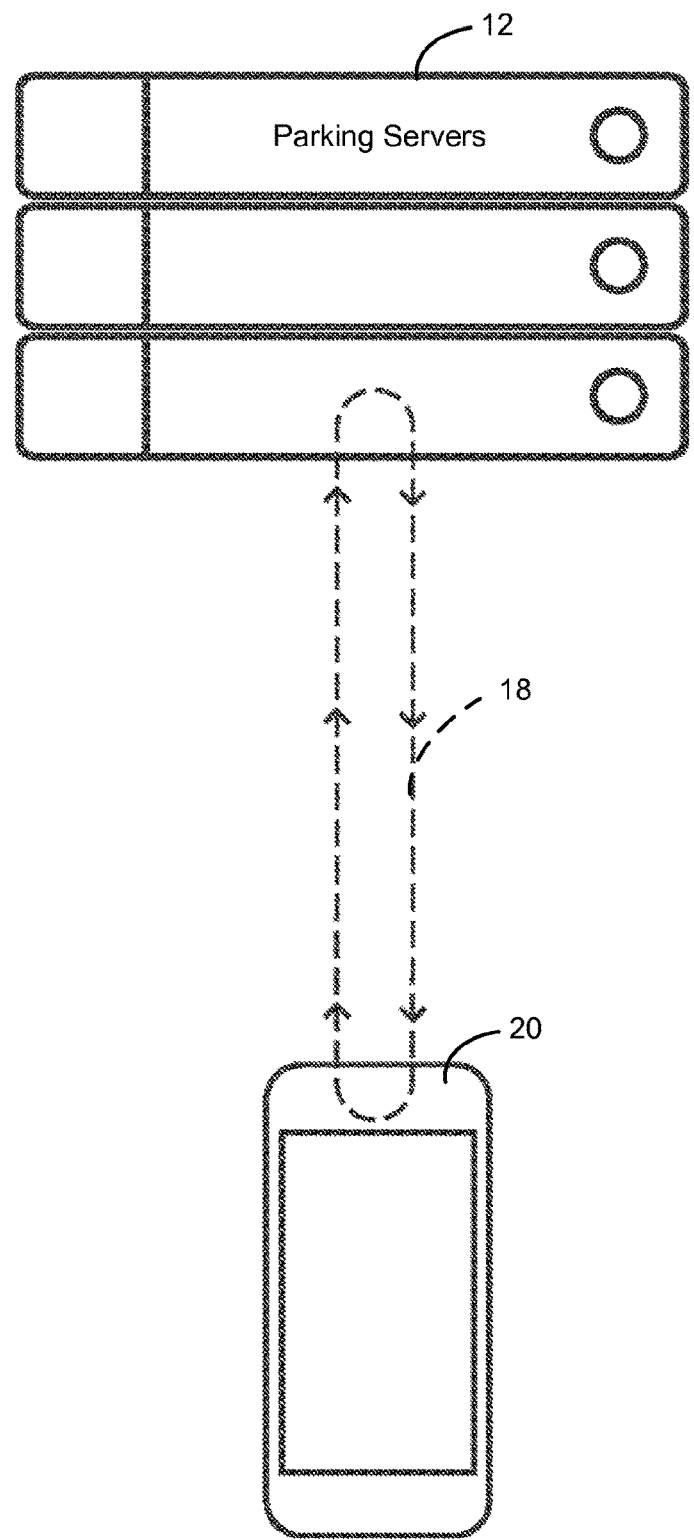

With reference to FIG. 3-4, the driver parking the vehicle launches the App stored on mobile communication device 20 and identifies the destination location.

Figures 3, 4, 5:
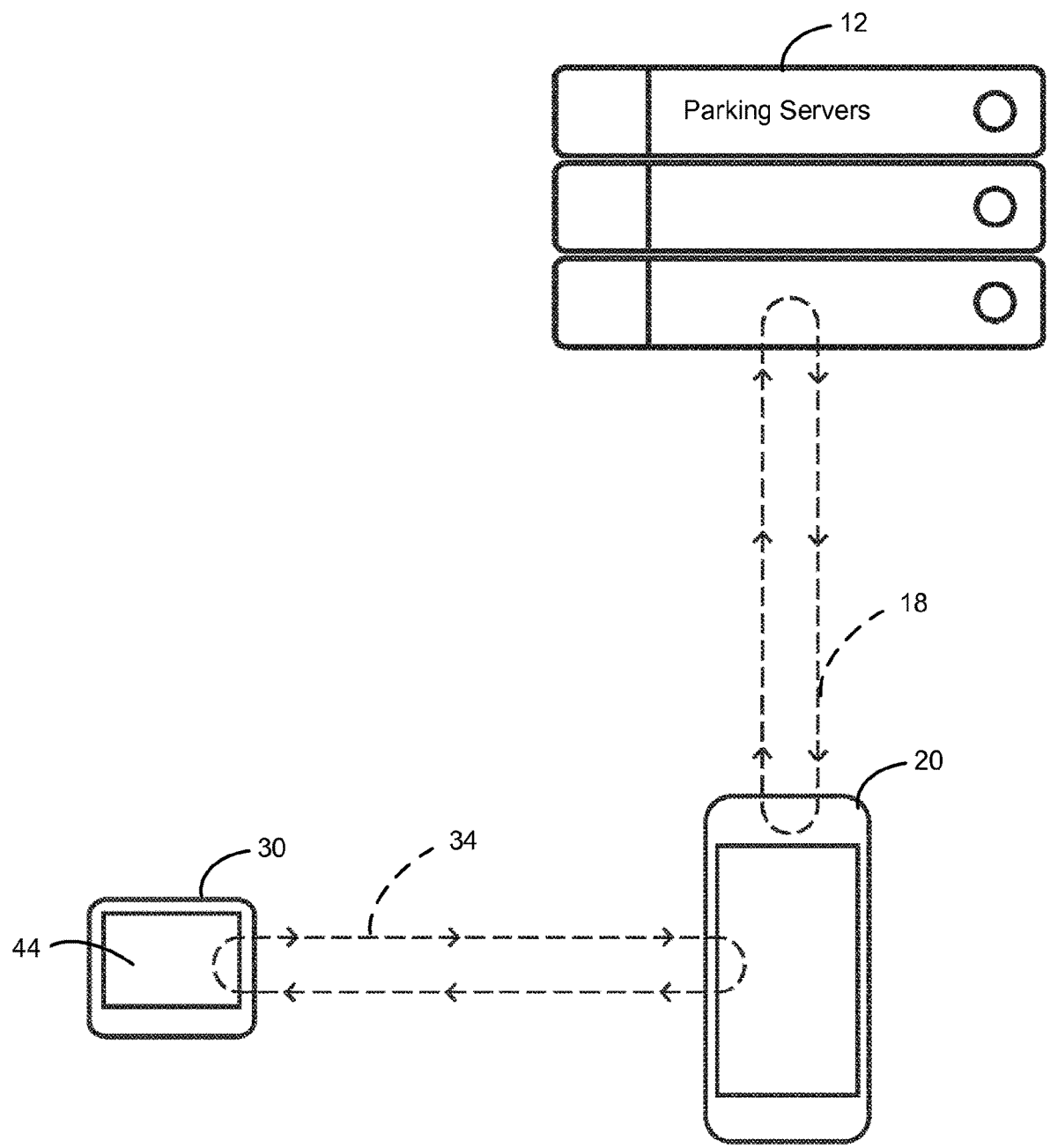

With reference to FIG. 3-5, using the App, the vehicle driver filters one or both of the parking time charge rate and the length of parking time needed. The App shows the parking time charge rates and the locations where the vehicle driver can find parking areas allowing the desired length of parking time around the driver's destination. The vehicle driver finds a suitable parking area and visually checks or uses the GPS capability of the App to recognize the parking time limitation specified for the parking area. Operating with Google Maps for Mobile location service and responding to radio signals propagating through communication link 22, the App recognizes the location of mobile communication device 20 to 3 m-8 m accuracy. The recognized location of mobile communication device 20 carried by the vehicle driver indicates the location of the vehicle and enables provision of the parking zone information, including parking time charge rate and time limit. The App requests and the vehicle driver confirms the parking location, parking time charge rate, and parking time limit, the last two of which are posted on street signs located in the vicinity of the parking area. Once confirmation takes place on the mobile communication device App, the App, using Bluetooth® or NEC communication link 34, activates and downloads all pertinent information to E-Ticket device 30 and starts its timer and clock functions implemented by microcontroller 42. The driver leaves the vehicle, and parking servers 12 keep track of the time accumulated within the parking time limit. All parking time calculations and transactions take place in parking servers 12; therefore, parking time information is not lost in the event of operational failure of mobile communication device 20 or E-Ticket device 30.

A weak cellular telephone signal or other cause of temporary interruption of connectivity between mobile communication device 20 and parking servers 12 over wireless communication link 18 can result in a delay in parking transaction processing by parking servers 12. A vehicle driver timely making payment for parking could become a victim of the resulting delay in payment processing by parking servers 12 and be vulnerable to receiving an overdue parking time citation. An improperly issued parking citation can result from a parking patrol officer's using portable communication device 40 to perform over communication link 48 a search of parking servers 12 for parking transaction information. The result received from parking servers 12 would reflect not up-to-date and therefore inaccurate parking payment information caused by the payment processing delay. An improperly issued citation for an overdue parking time violation can, however, be reconciled because the vehicle driver's use of the App in the process of paying a parking charge is recorded in memory stores of mobile communication device 20. The App operates to maintain pendency of the vehicle driver's attempted payment transaction until connectivity to parking servers 12 is established and the parking payment process is completed. Parking servers 12 receive from mobile communication device 20 timestamp information demonstrating the vehicle driver's attempt at timely payment for parking. This timestamp information can be used to reconcile the delay and dismiss the parking violation.

With reference to FIG. 3-6, the App's timer operating on mobile communication device 20 keeps track of the elapsed vehicle parking time and alerts the vehicle driver as to the time remaining for the parking area before expiration of the parking time limit. The App also activates E-Ticket device 30 to display the necessary information for a parking patrol officer to see. At the same time, the App opens the vehicle driver's parking transaction account, activates parking servers 12, and communicates to the parking servers the parking time charge rate, parking time zone limit, and the parking start time. The E-Ticket device 30 can either, in a dynamic mode, count the minutes or, in a static mode, show the expiration time so that a parking patrol officer or parking service attendant can recognize whether the vehicle has been parked for a time longer than the specified time limit. Display surface 44 of E-Ticket device 30 can reverse black and white background luminosity, change color, or display a special image after occurrence of the parking expiration time for easy recognition by the parking patrol officer or parking service attendant. As stated above, to reduce the cost of E-Ticket device 30, LEDs may be substituted for display surface 44 to indicate parking time or other information.

The operational procedures implemented in system 10 and the operation of E-Ticket device 30 afford flexibility that allows a municipality to offer a grace period (e.g., 10-15 minutes) after the expiration time for the vehicle driver to return to the vehicle before a parking violation is recorded. The municipality can charge a larger fee for this grace period, thereby generating more revenue for the municipality yet reducing the violation fine the vehicle driver would have incurred.

Recognizing the locations of the vehicle and mobile communication device 20, system 10 can calculate a return time the vehicle driver would need to walk back to the vehicle. System 10 can add to the remaining parking time the calculated return time as reminder time to allow the vehicle driver to return to the vehicle before the parking time has expired.

The App can also drop a pin and recognize the location of mobile communication device 20 to identify the vehicle location by GPS and assist the vehicle driver to find the vehicle as the driver attempts to return to the vehicle.

Upon activation, the App will also provide the vehicle driver with information about activities and business promotions within a short distance from (e.g., 1.5-mile radius) of the parking area. As shown in FIG. 1, parking server 12 is implemented with a wireless communication link 66 with a merchant communication device 68 to enable, with no requirement for parking account validation, delivery of local merchant activity and business promotion information to mobile communication device 20.

With reference to FIG. 3-7, upon return to the vehicle, the vehicle driver uses the App through communication link 18 to stop the timer operating at parking servers 12 and through Bluetooth® or NFC communication link 34 to stop the timer and turn off the dock at E-Ticket device 30. Once the timer is stopped, parking servers 12 calculate the parking charges and record the total parking time and the calculated parking charges so that the municipality receives compensation for the parking fees incurred. In the alternative, as the vehicle driver returns to the car, through recognition of the proximity to E-Ticket device 30 using Bluetooth® communication and Geofencing capabilities of mobile communication device 20, as the vehicle moves several feet, the App automatically turns off E-Ticket device 30 and sends an end of parking signal through communication link 18 to parking servers 12. The end of parking signal received by parking servers 12 activates them to complete the parking payment transaction by recording the total parking time. Upon completion of the transaction, all information (e.g., parking location, date, and charges) is aggregated and recorded on the vehicle driver's account residing on parking servers 12. As a security measure, parking servers 12 send the recorded parking time and fee through communication link 18 to mobile communication device 20.

System 10 is also capable of an automatic start of a parking transaction based on separation distance of mobile communication device 20 and E-Ticket device 30 when connectivity between them is lost and navigation system 16 detects movement of mobile communication device 20 only. This is accomplished after initiation of a parking transaction, and when the pairing connectivity is lost and navigation system 16 detects movement of mobile communication device 20. Parking server 12 provides to mobile communication device 20 the start timer command and thereby starts a parking transaction.

With reference to FIG. 3-8, the vehicle driver using mobile communication device 20 can access the parking payment account at any time to view all parking charges and information.

FIG. 1 shows parking servers 12 established with communication links 70, 72, and 74 through wireless Internet Protocol networks with parking customer accounts of a user/vehicle driver 75, a private parking provider 76, and a municipality 78, respectively. Communication links 70, 72, and 74 enable user/vehicle driver 75, private parking provider 76, and municipality 78 to access parking activity and payment information relating to their respective parking customer accounts.

Figure 4A:
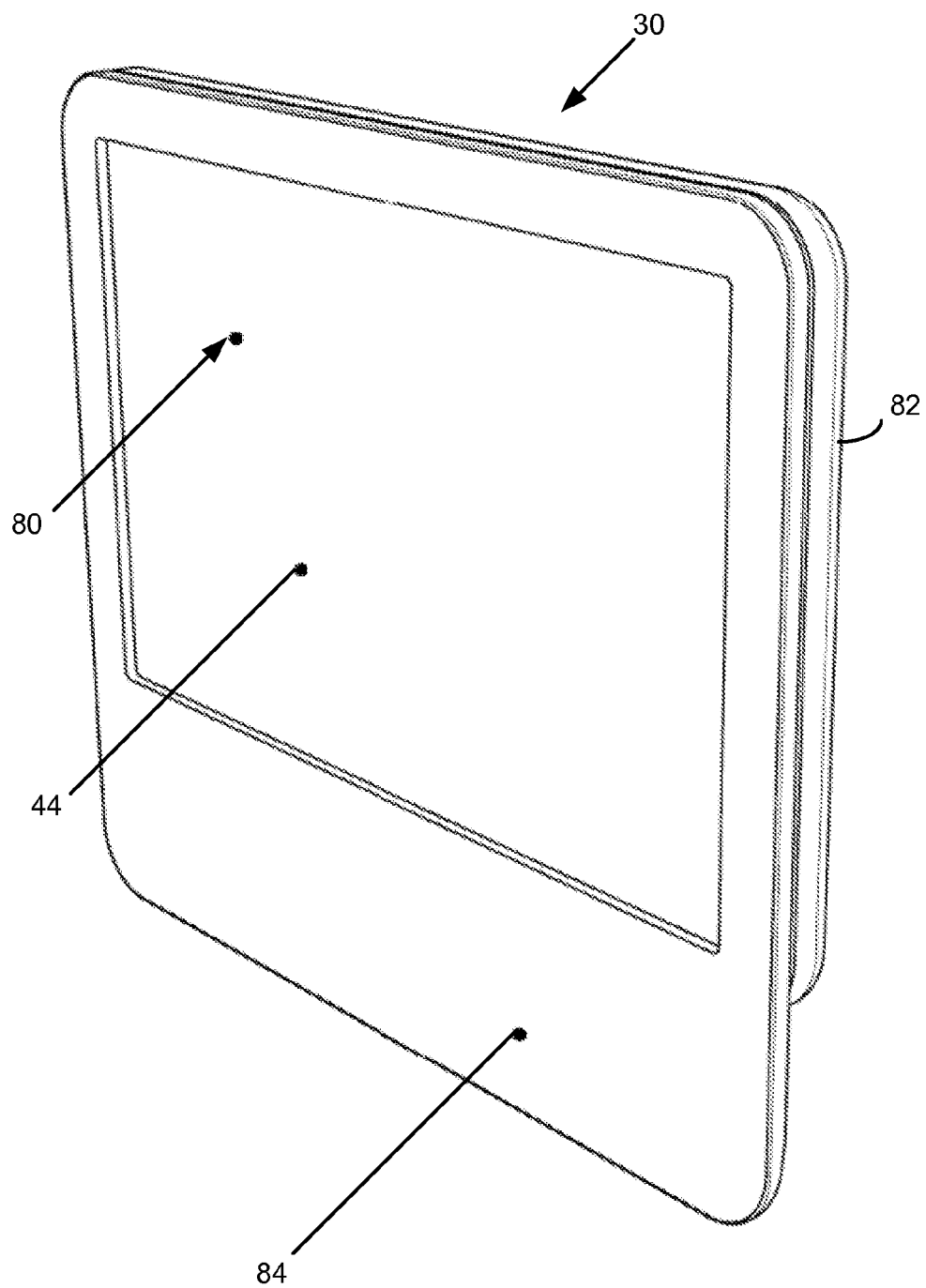
FIGS. 4A and 4B are respective front and rear perspective views of the E Ticket device shown in FIG. 2.
Figure 4B:
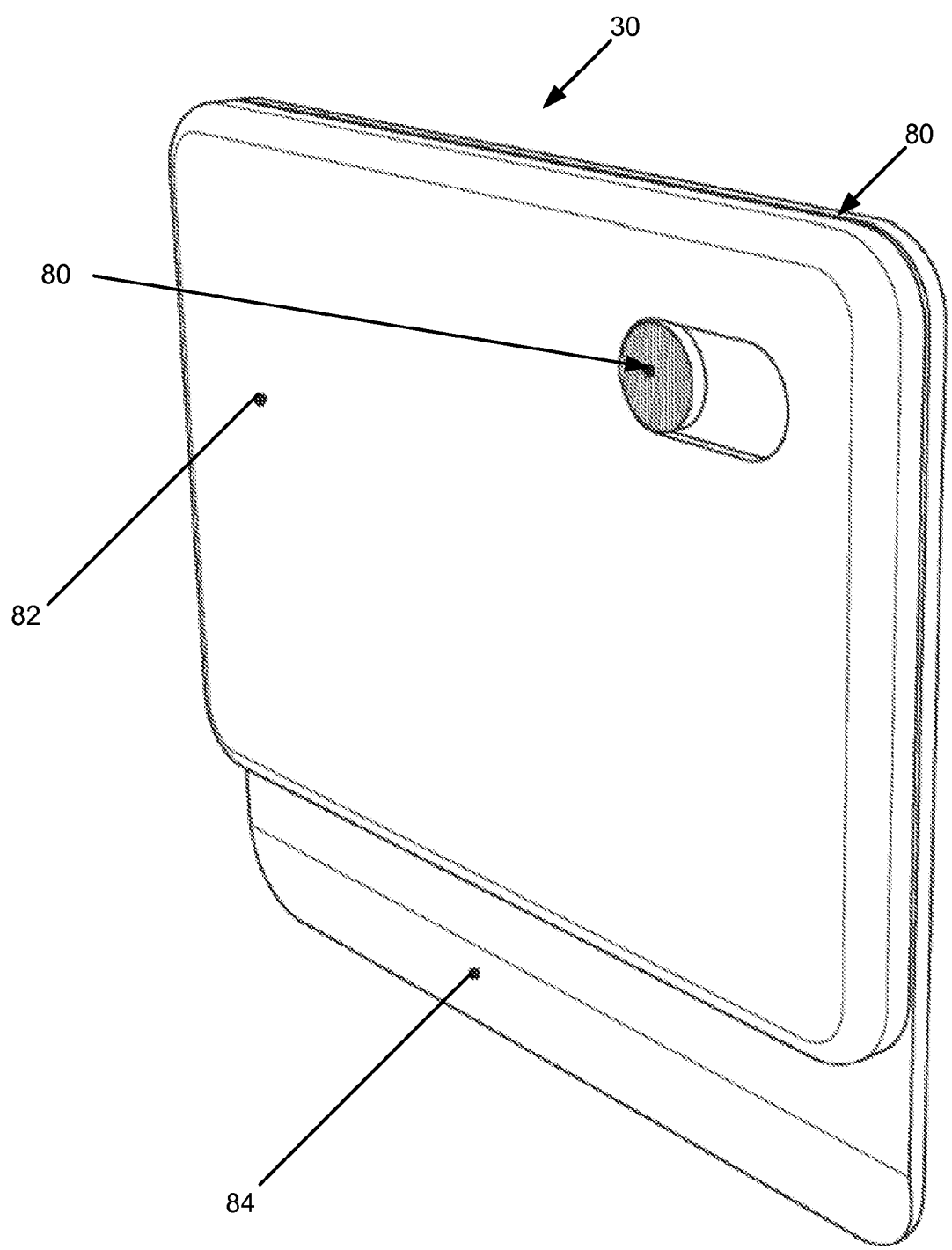
Figure 5C:
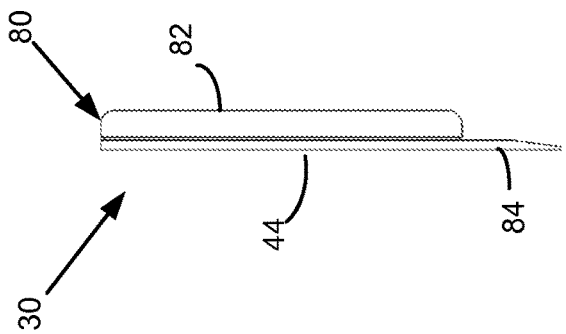
FIGS. 5A, 5B, and 5C are, respectively, front, rear, and side elevation views of the E-Ticket device of FIGS. 4A and 4B.
Figure 5A:
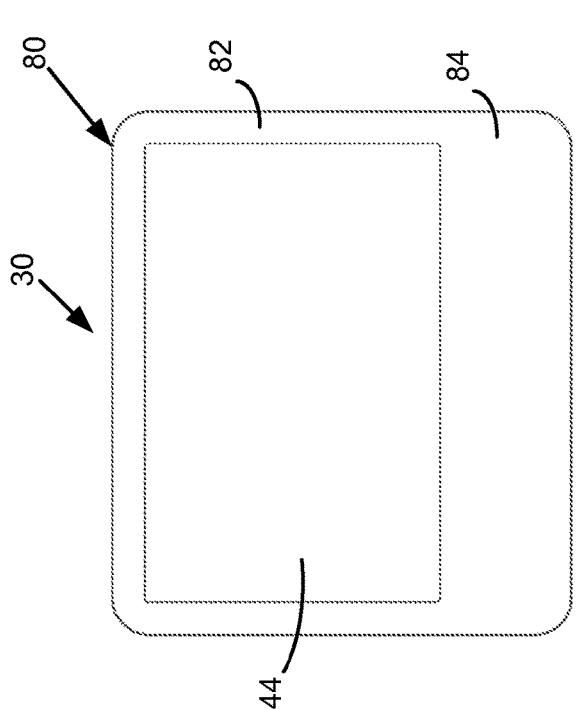
Figure 5B:
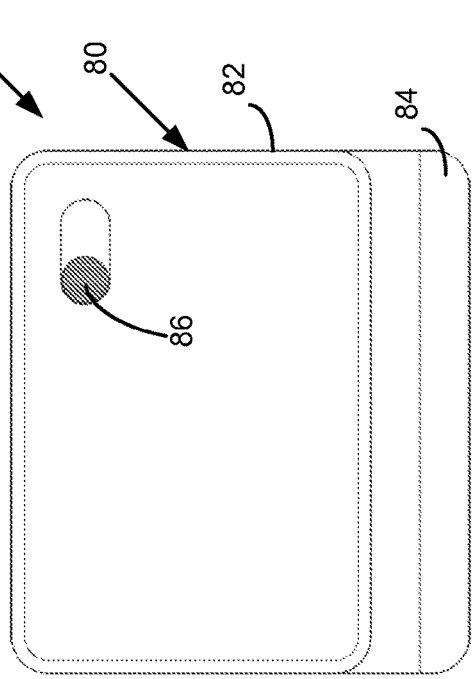
Figures 1, 6:
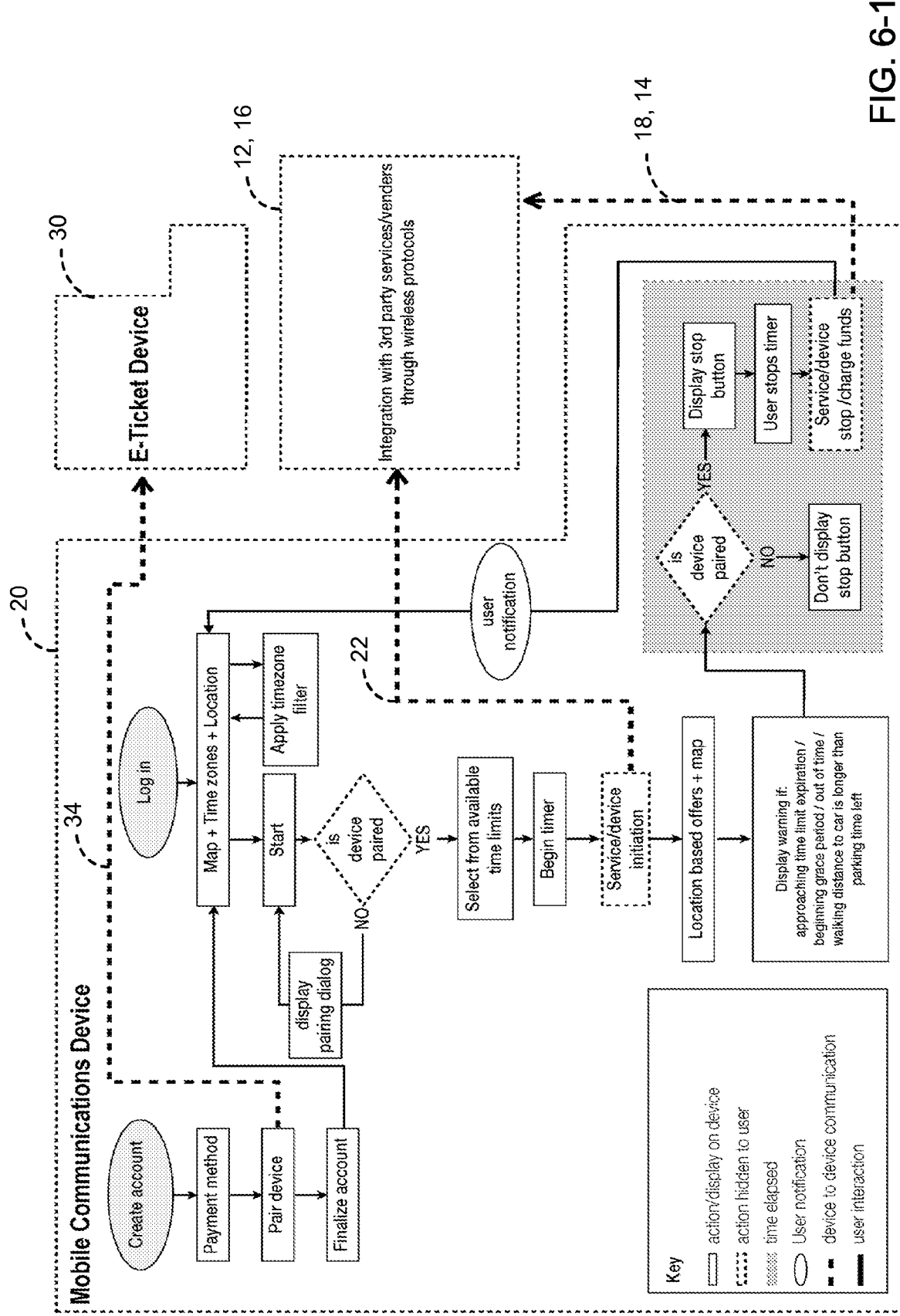
Figures 2, 6:
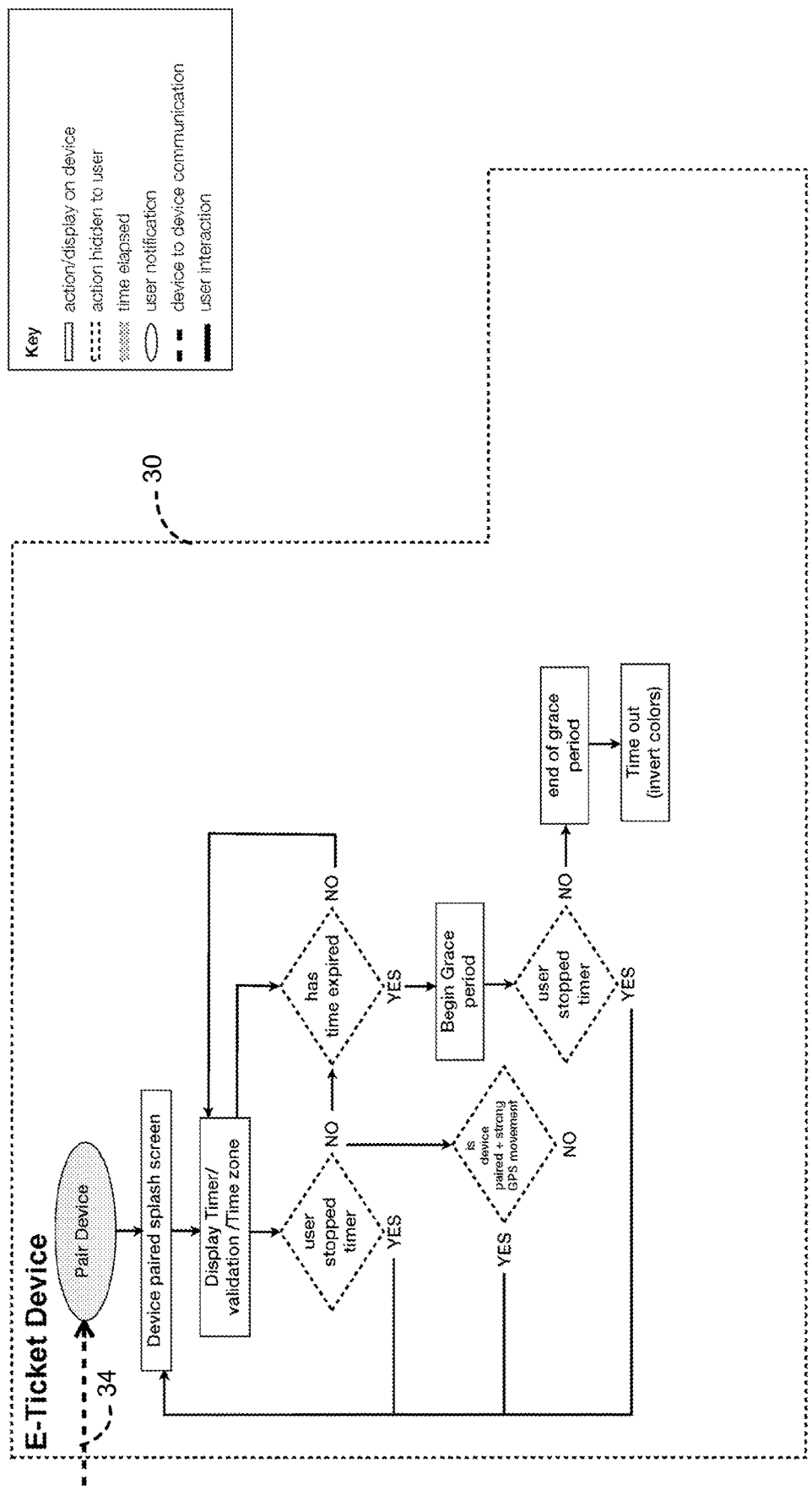
Figures 1, 7:
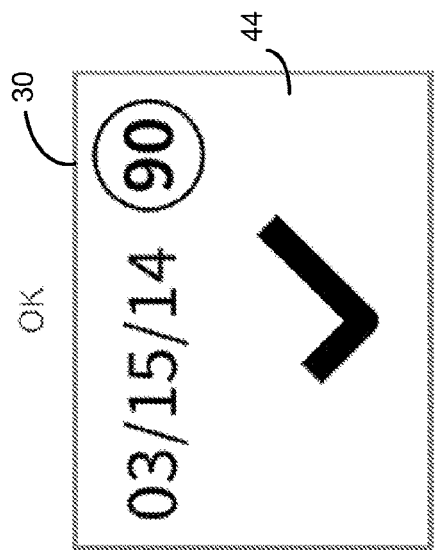
Figures 2, 7:
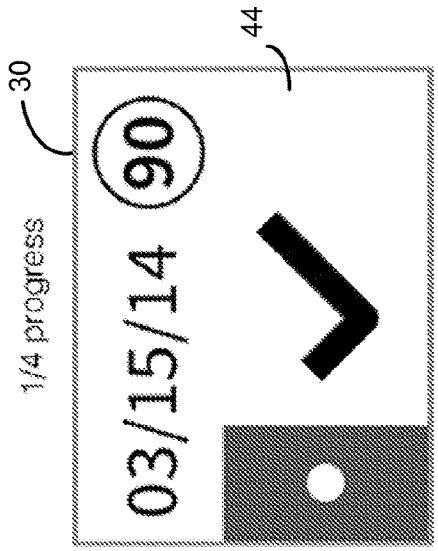
Figures 3, 7:
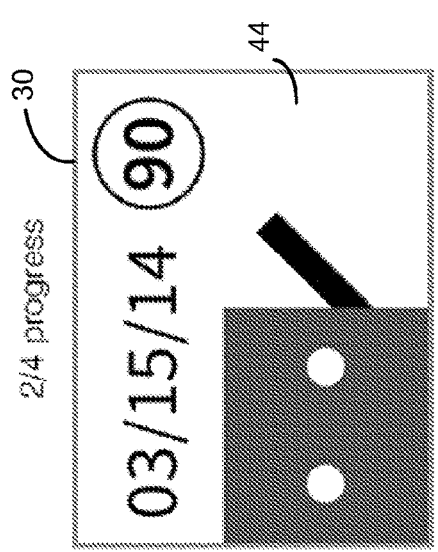
Figures 4, 7:
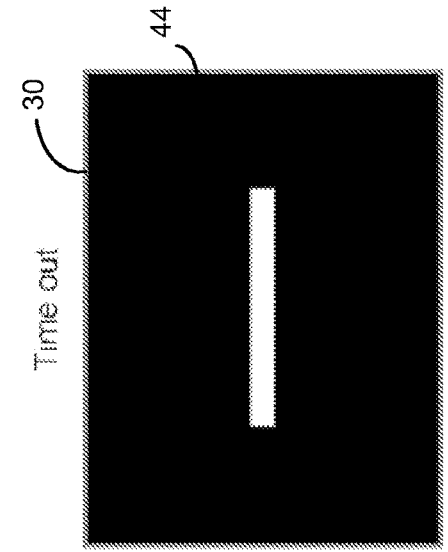
Figures 5, 7:
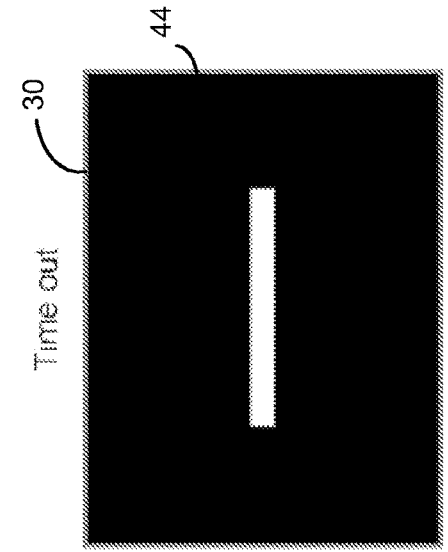
Figures 6, 7:
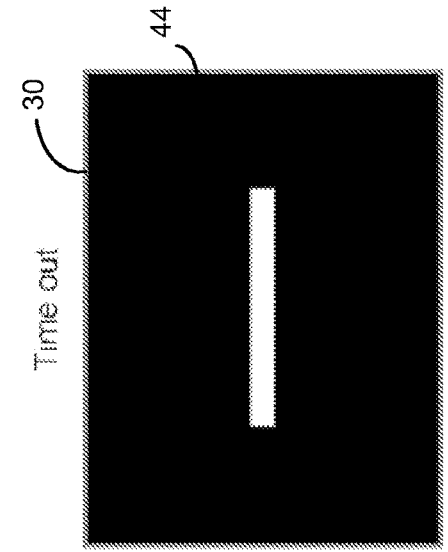

FIGS. 4A and 4B are respective front and rear perspective views of E-Ticket device 30. FIGS. 5A, 5B, and 5C are, respectively, front, rear, and side elevation views of E-Ticket device 30. With reference to FIGS. 4A, 43, 5A, 53, and 5C, E-Ticket device 30 includes a housing 80 that has a low profile display portion 82 from which extends a front bezel 84. Display portion 82 has on its front side the display surface 44 and contains in its interior a circuit board and the electrical power supply including battery 52. Microcontroller 42 and the other electronic components are mounted on the circuit board. Extended front bezel 84 is in the form of a thin blade that is configured for insertion into the narrow gap between the vehicle door window and its inside weather strip. Front bezel 84 allows the vehicle driver to insert E-Ticket device 30 with its display surface 44 resting against the inside surface of the door window and visible to a parking patrol officer or parking service attendant observing display surface 44 from outside the parked vehicle.

Display portion 82 has on its rear side a large slidable ON/OFF switch mechanism 86 that provides secure activation of E-Ticket device 30 by the vehicle driver.

To save power and thereby extend battery life, microcontroller 42 of E-Ticket device 30 at specified time intervals (e.g., one-minute intervals) momentarily turns on to advance its timer. Display surface 44 presents all information preferably on a bright white background for viewing at a glance, even in bright sunlight conditions.

Figures 3, 4, 5, 6:
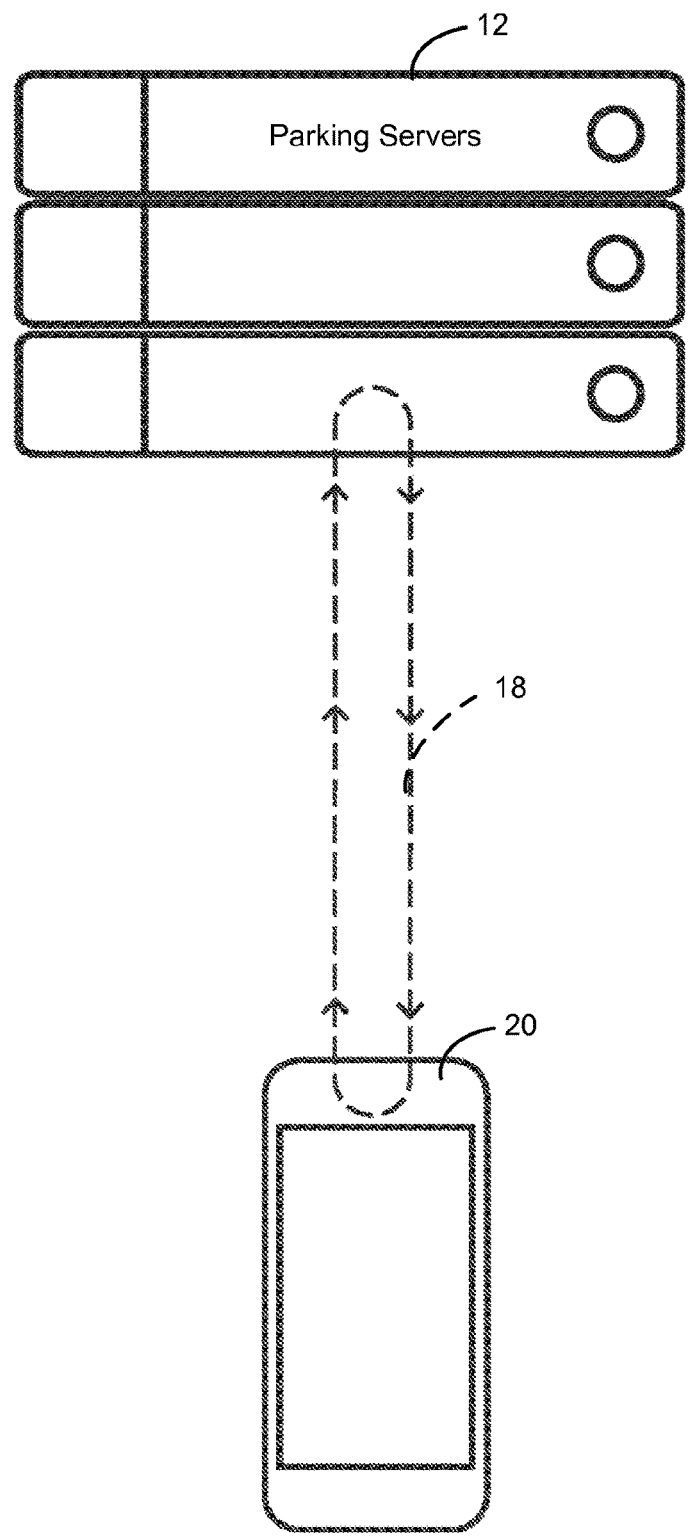

FIG. 6, which includes a set of two drawing sheets (FIGS. 6-1 and 6-2), is a flow diagram showing the functions performed by the App operating on mobile communication device 20 and performed by E-Ticket device 30 in carrying out the vehicle parking transaction process described above with reference to FIGS. 3-1-3-8. FIGS. 6-1 and 6-2 include a key in which the different functions performed are indicated by action or display on mobile communication device 20 or display surface 44 of E-Ticket device 30, action hidden from the vehicle driver, parking time elapsed, user notification, device-to-device communication, and vehicle driver interaction.

The following describes, with reference to sequences of screenshots showing information displayed on mobile communication device 20 and display surface 44 of E-Ticket device 30, two scenarios of vehicle parking and parking fee payment processing by system 10.

Figures 3, 4, 5, 6, 7:
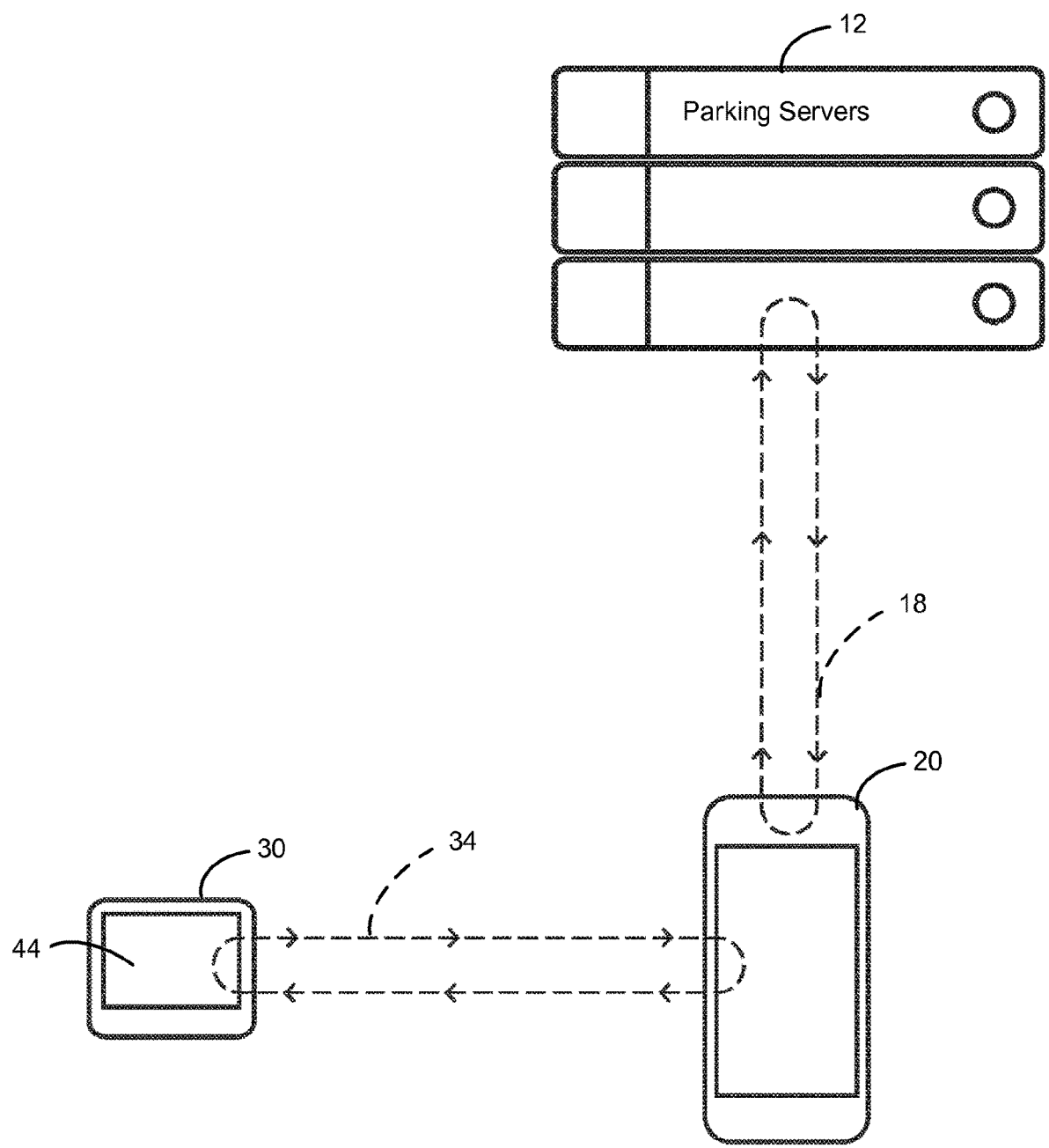

FIGS. 7-1-7-6 represent a set of 6 screenshots of information appearing on display surface 44 of E-Ticket device 30 during different points in time a vehicle remains parked in a parking area. These screenshots show what a parking patrol officer or parking service attendant would observe.

FIG. 7-1 shows that the vehicle driver initiated successfully (indicated by a checkmark) with parking servers 12 a vehicle parking transaction on Mar. 15, 2014, at a parking area in a 90-minute parking limit zone. FIGS. 7-2, 7-3, 7-4, and 7-5 indicate, in one-quarter parking time-limit increments, the progression of accumulated vehicle parking time in the 90-minute parking zone. Each 22.5-minute parking increment is represented by a dark rectangle with a white center dot. As vehicle parking time accumulates, the number of dark rectangles with a white center dot appearing on display surface 44 of E-Ticket device 30 increases to progressively obscure the checkmark. FIG. 7-6 shows a dark screen with a centrally positioned thin rectangle, indicating the 90-minute vehicle parking time has reached a time-out state.

FIGS. 8-1-8-16 represent, for a first vehicle parking scenario, a set of 16 stacked pairs of screenshots, each pair showing the display of mobile communication device 20 (upper screenshot) and display surface 44 of E-Ticket device 30 (lower screenshot) during different points in time a vehicle driver locates, parks at, and pays for a parking area. The first scenario represents payment for 45 minutes and 18 seconds of parking in a 90-minute parking limit zone.

Figures 3, 4, 5, 6, 7, 8:
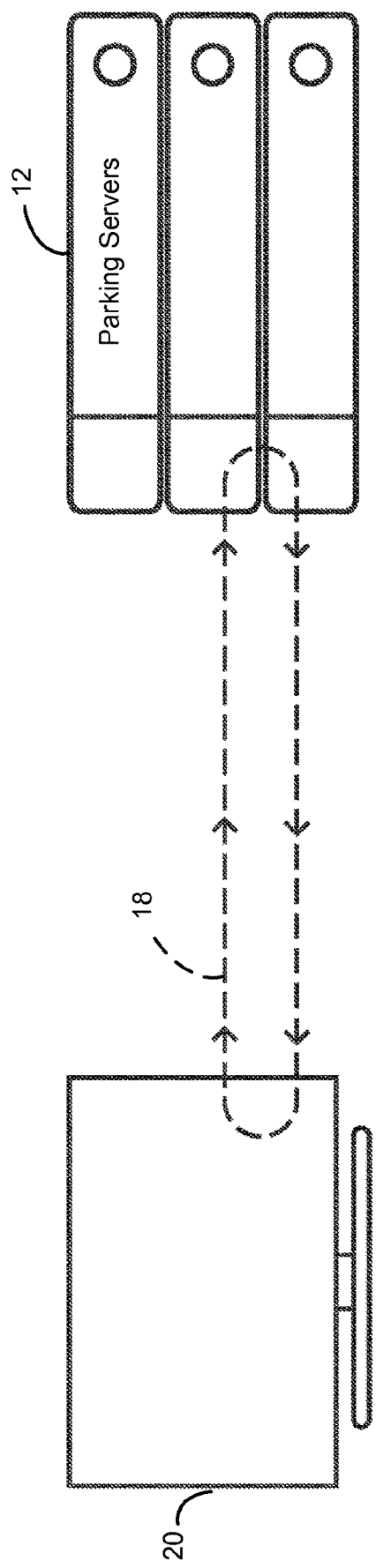

FIGS. 8-1 and 8-2 show on mobile communication device 20, respectively, a screenshot of the homepage of the App opened on the display screen and a screenshot of the homepage of the App at the start of vehicle parking at a parking area.

FIGS. 8-3 and 8-4 show on mobile communication device 20, respectively, a screenshot indicating an availability of 90-minute and 3-hour parking limit zones and a screenshot indicating the vehicle driver's selection of the 90-minute parking zone.

FIGS. 8-5 and 8-6 show on mobile communication device 20, respectively, a screenshot of a Start parking meter prompt for a maximum of 90 minutes of vehicle parking at $1.60 each hour and a screenshot indicating the vehicle driver's selecting the Start button to start the parking meter.

E-Ticket device 30 has a completely dark display surface 44 during each of the first six procedural steps represented by FIGS. 8-1-8-6.

FIG. 8-7 shows on mobile communication device 20 a screenshot indicating the operation of the parking meter one second after the start of the parking timer while mobile communication device 20 is in connectivity range with E-Ticket device 30. The Pay Now button is actuatable at this time. FIG. 8-8 shows on mobile communication device 20 a screenshot indicating that, at 10 seconds of accumulated parking time, the vehicle driver has walked a sufficient distance away from E-Ticket device 30, which is stationary in the vehicle, so that the paired connectivity between E-Ticket device 30 and mobile communication device 20 has been lost and the Pay Now button is disabled.

FIGS. 8-7 and 8-8 show on display surface 44 of E-Ticket device 30 screenshots indicating an operational parking timer at 1-second parking time and at 10-seconds parking time, respectively, within the 22.5-minute increment, as illustrated in FIG. 7-1.

Figures 8, 9, 10, 11, 12:
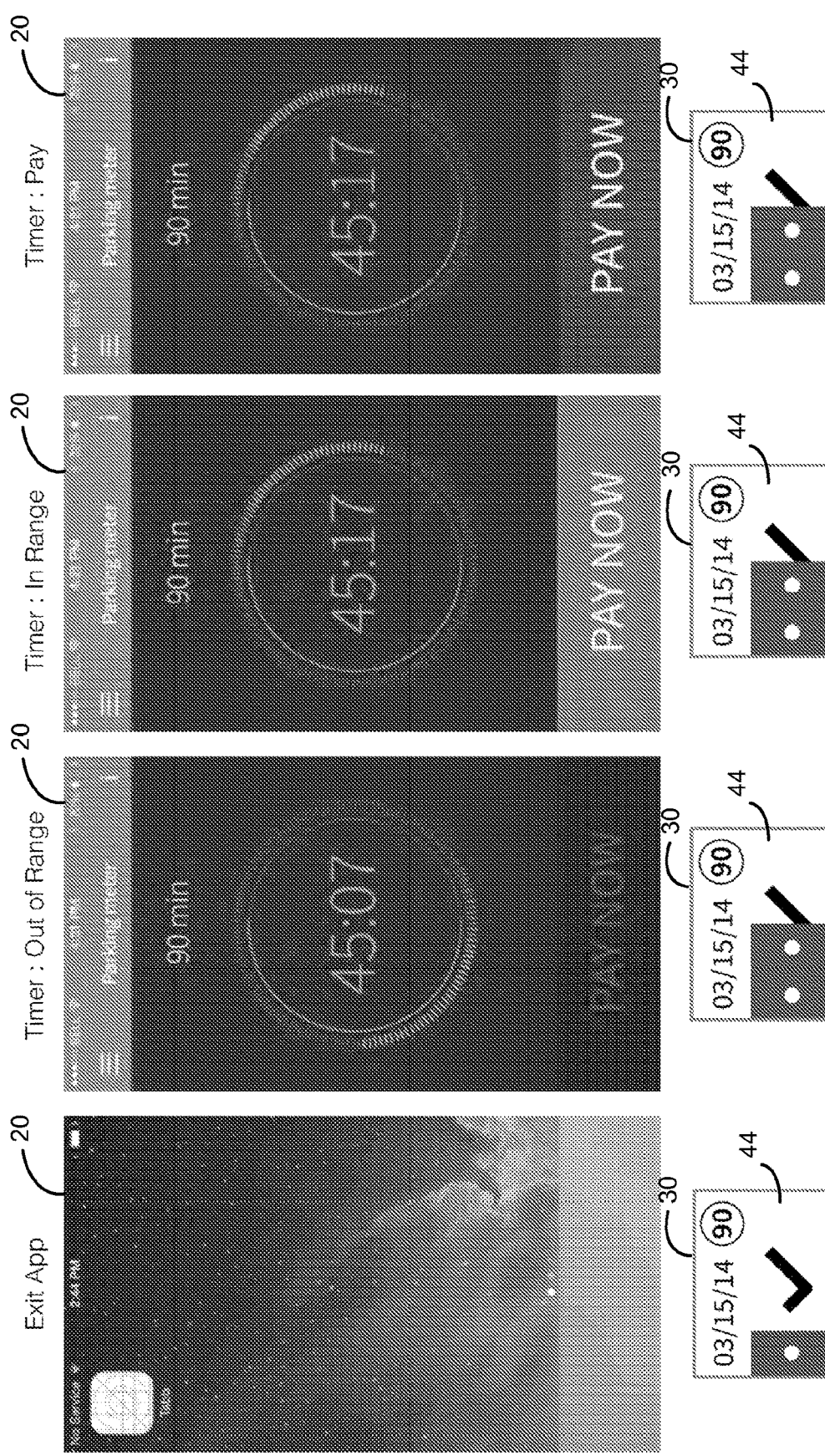
Figure 9:
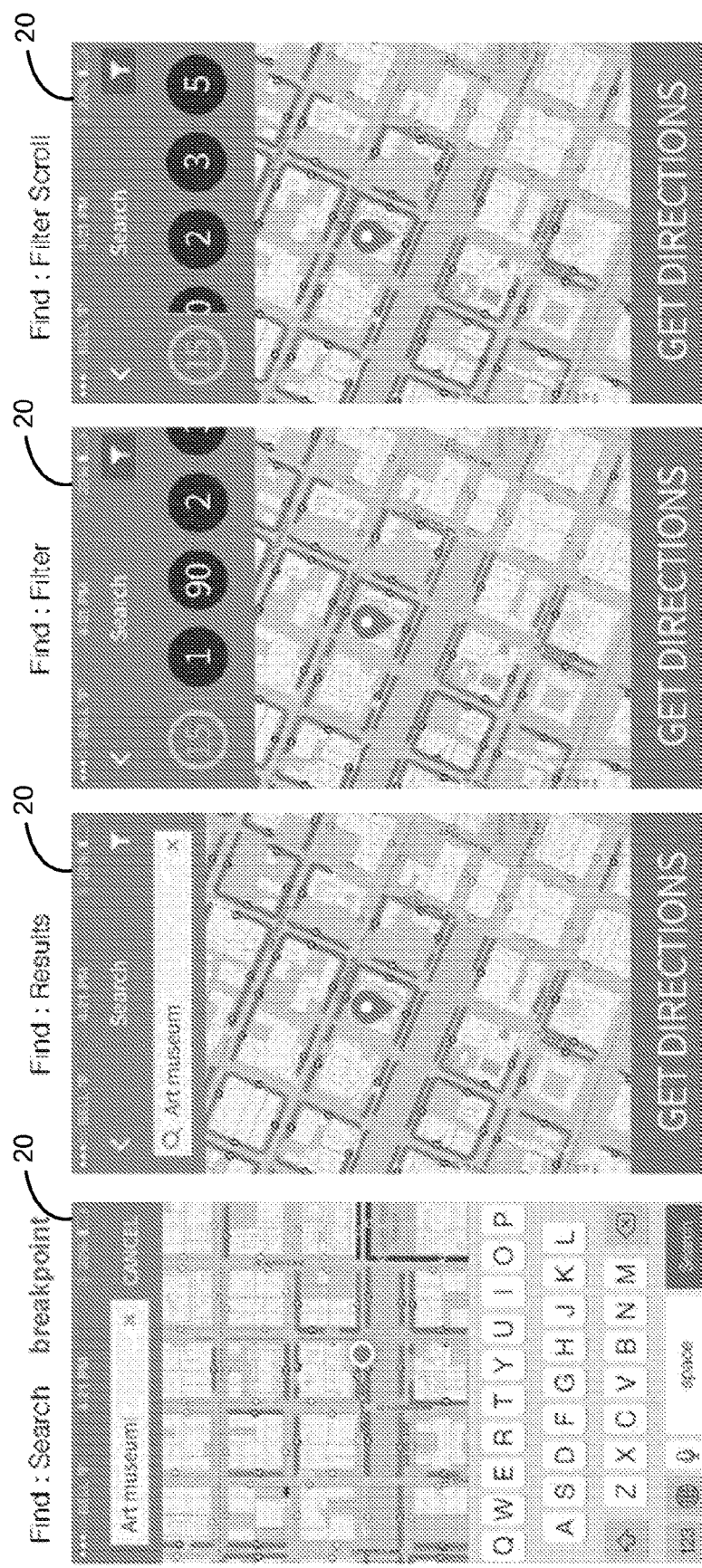
Figure 5:
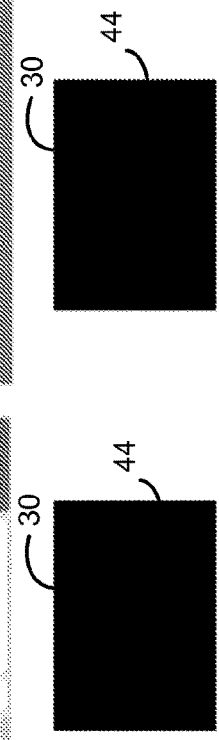
Figure 6:
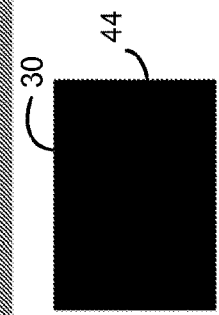
Figure 7:
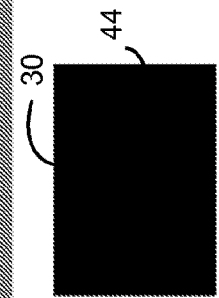
Figure 8:
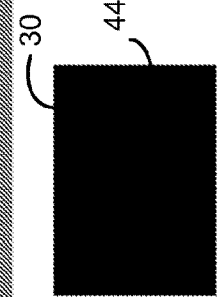
Figures 9, 10, 11, 12:
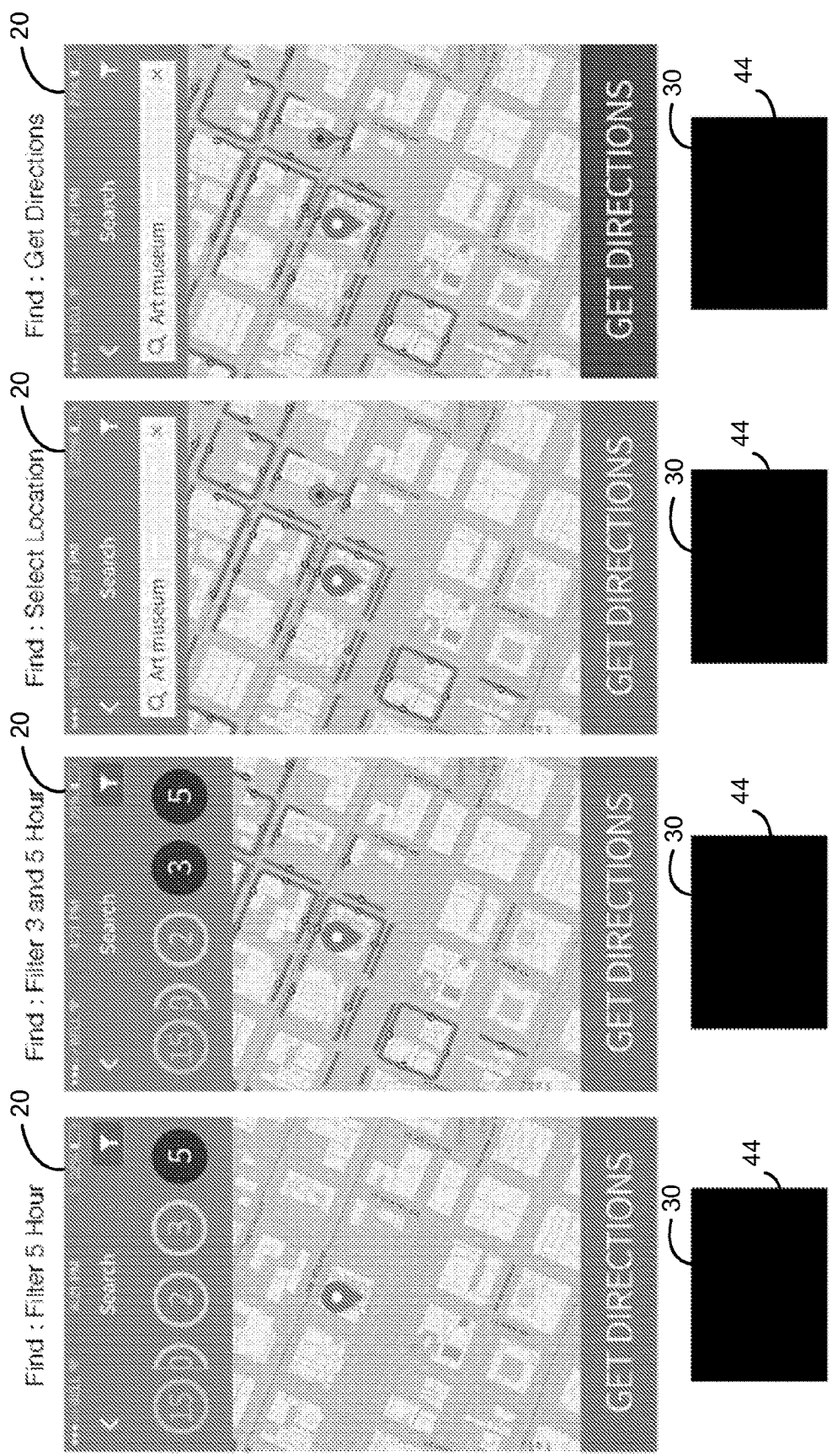
Figure 10:
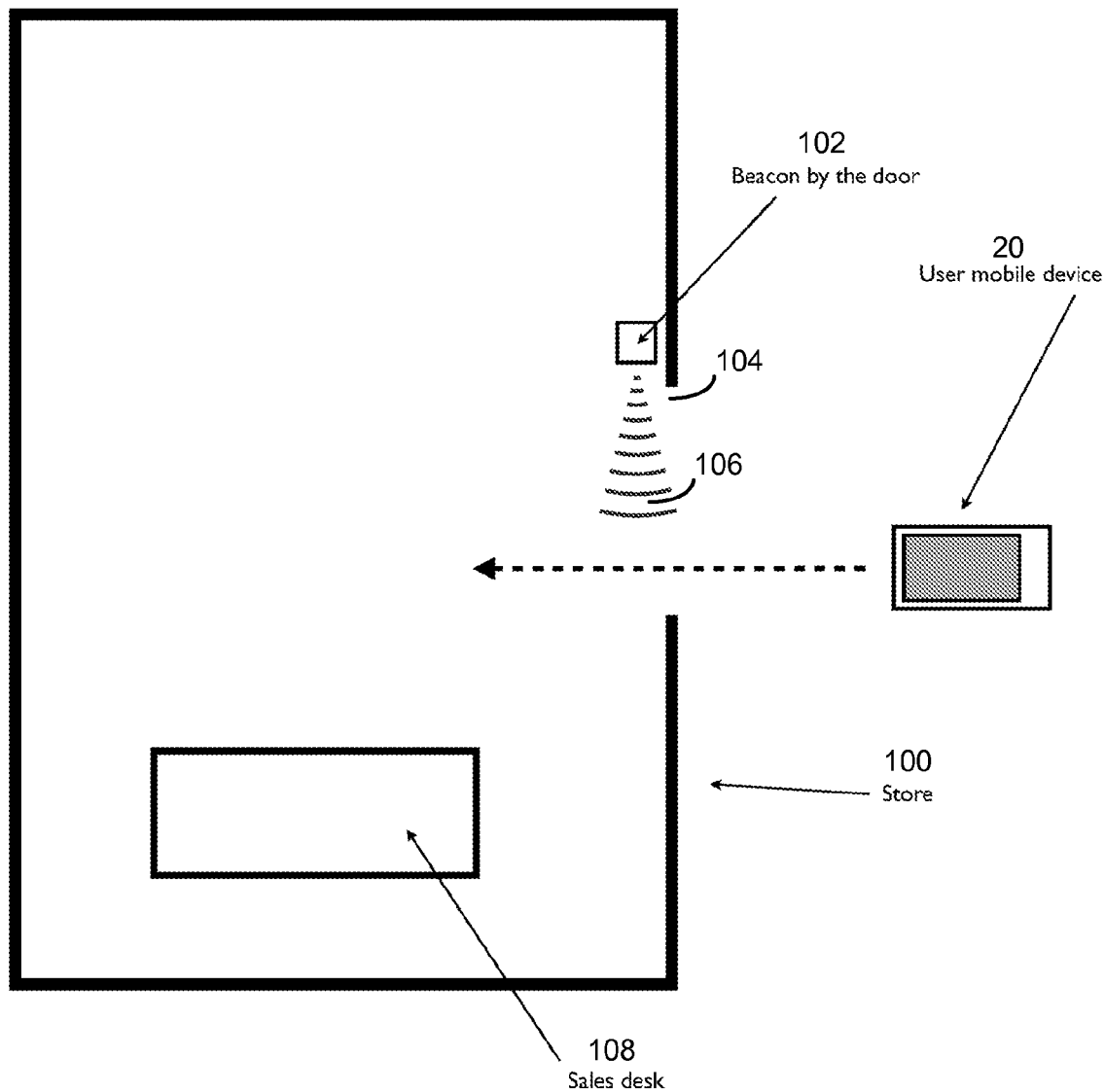
Figures 1, 11:
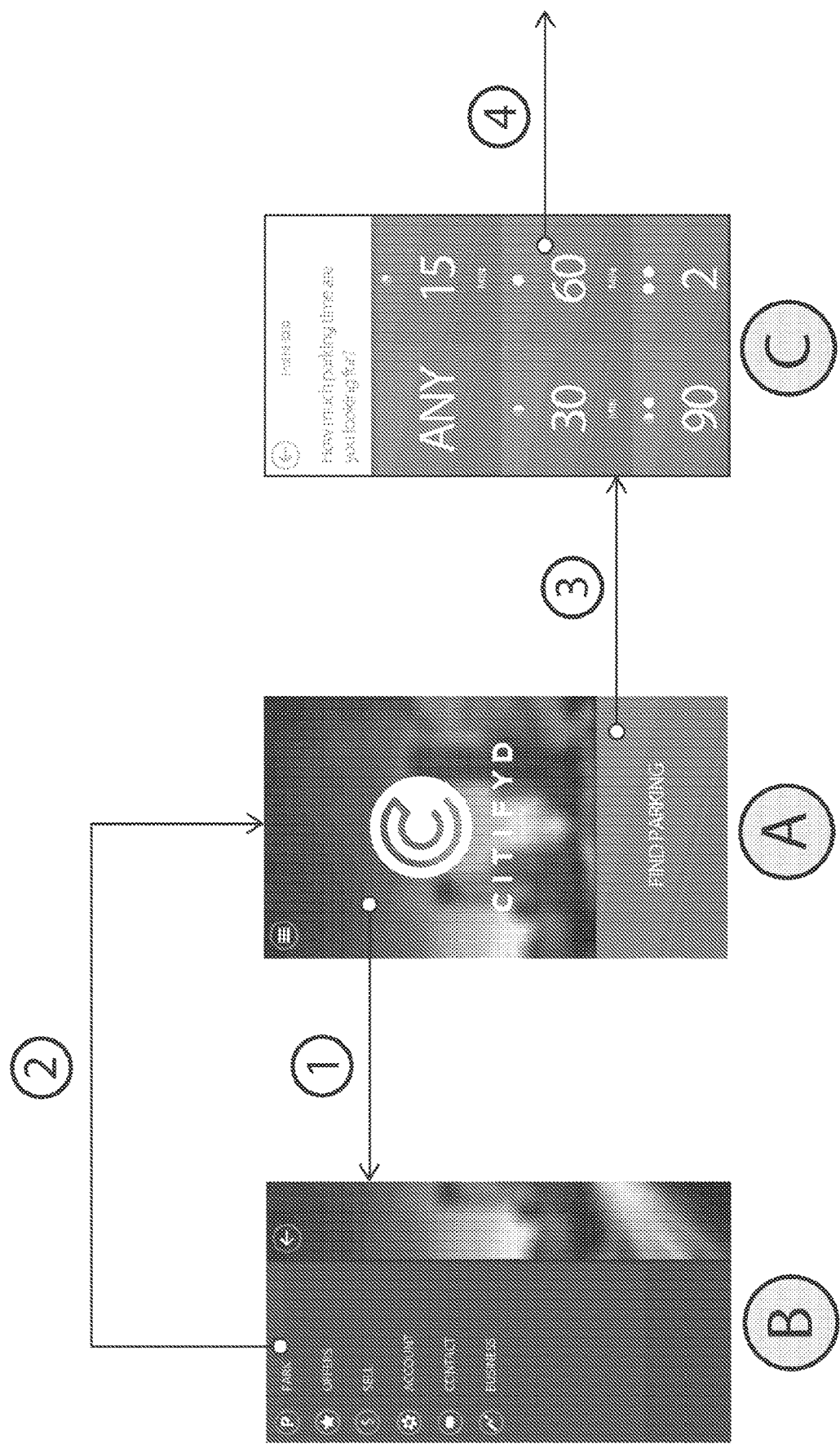
Figures 2, 11:
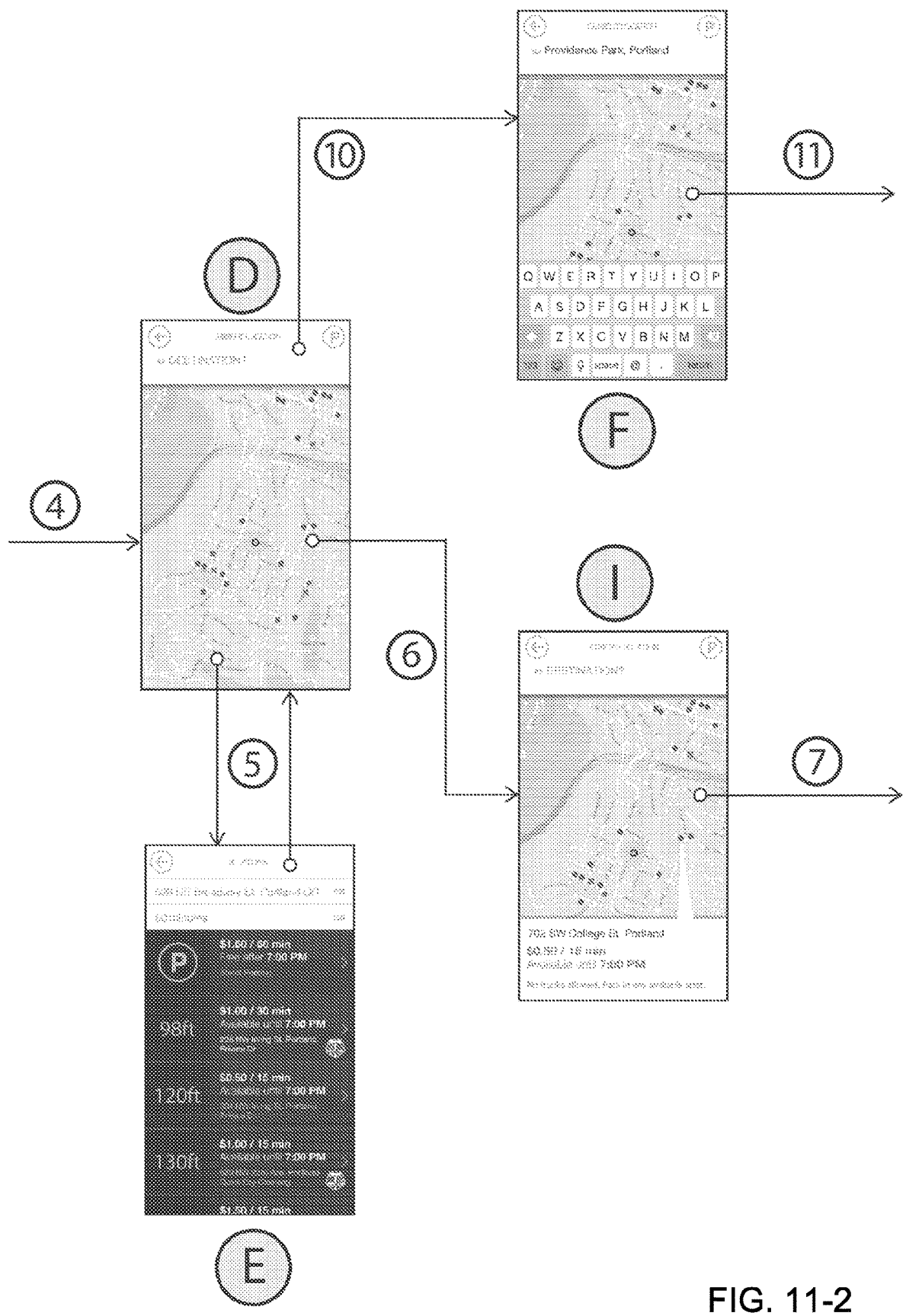
Figures 3, 11:
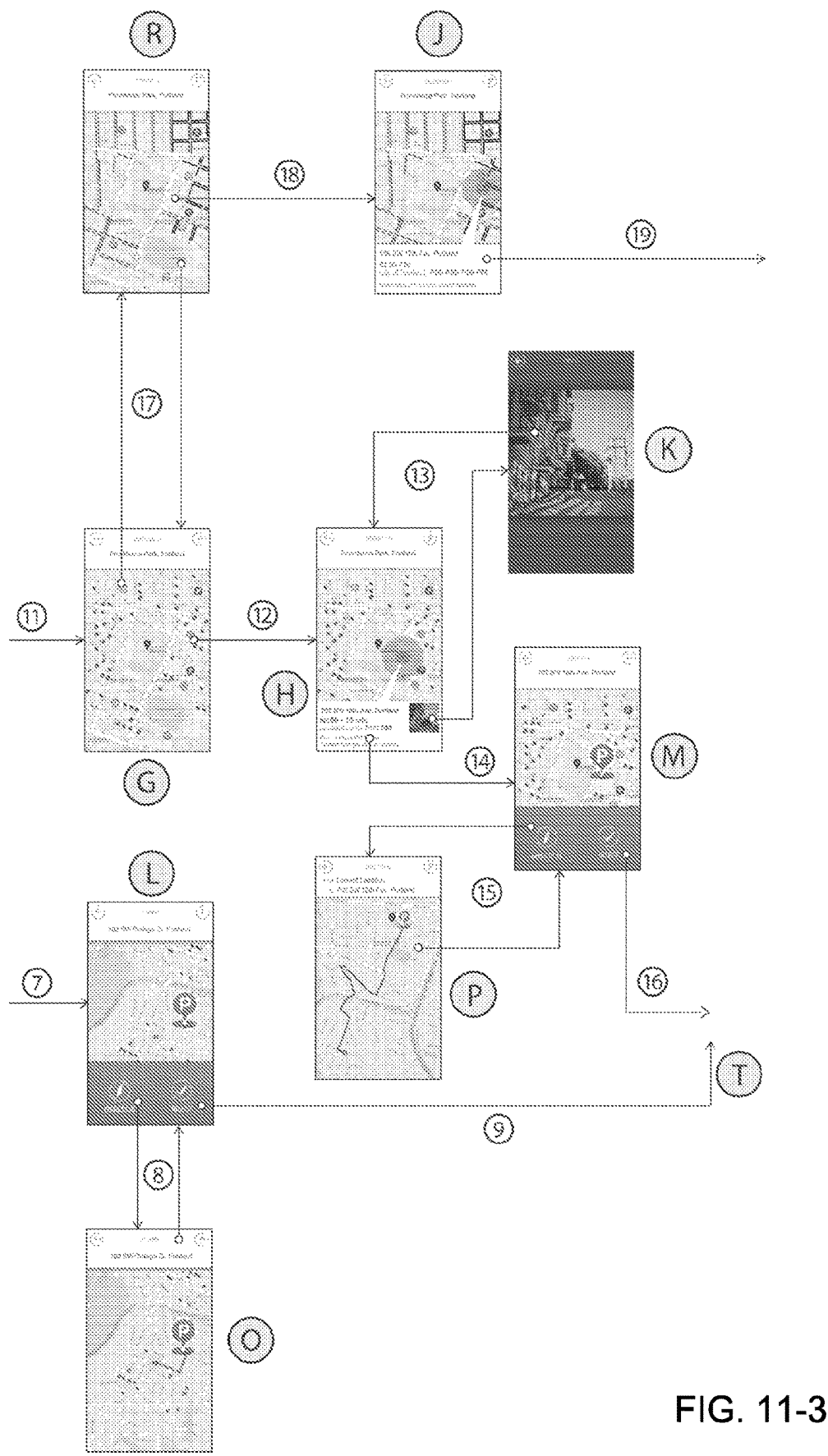
Figures 4, 11:
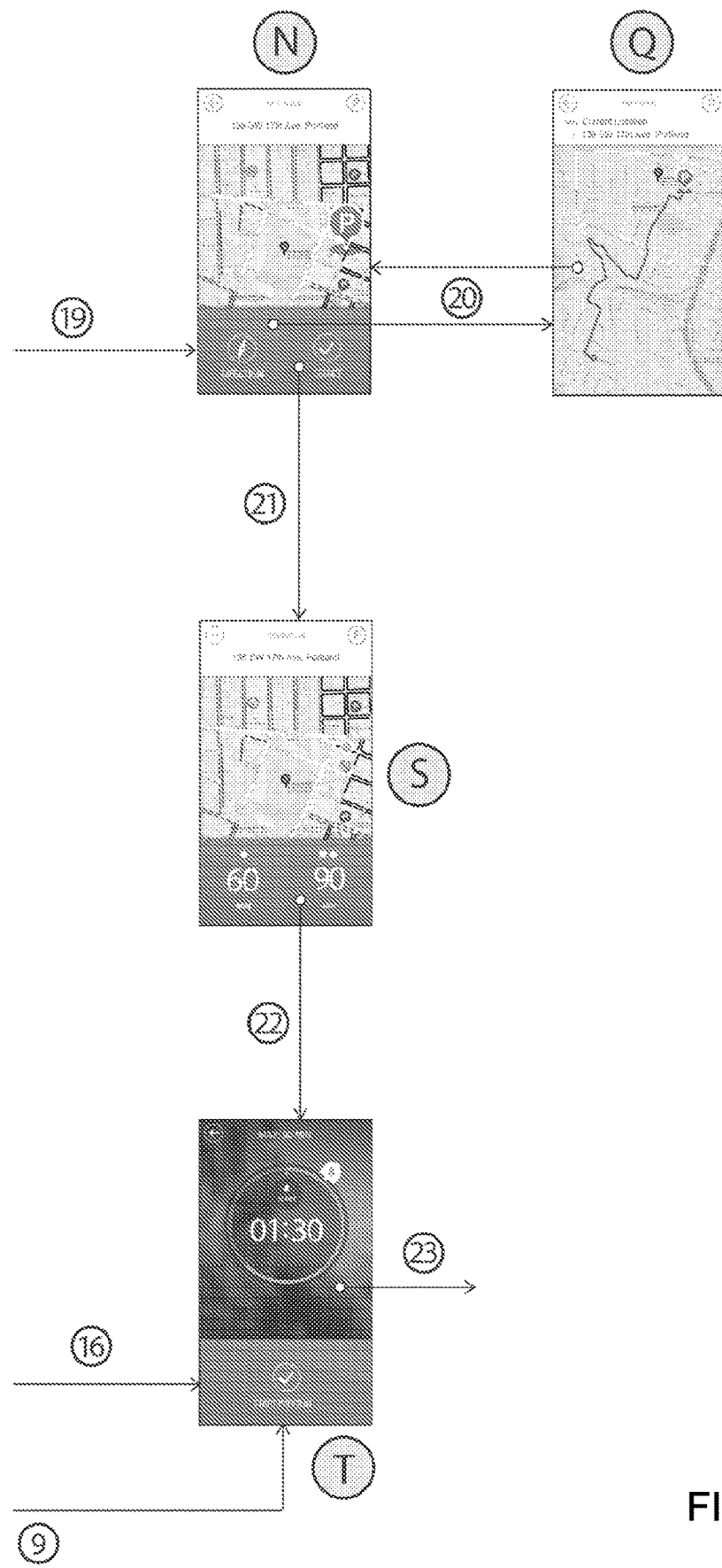
Figures 5, 11:
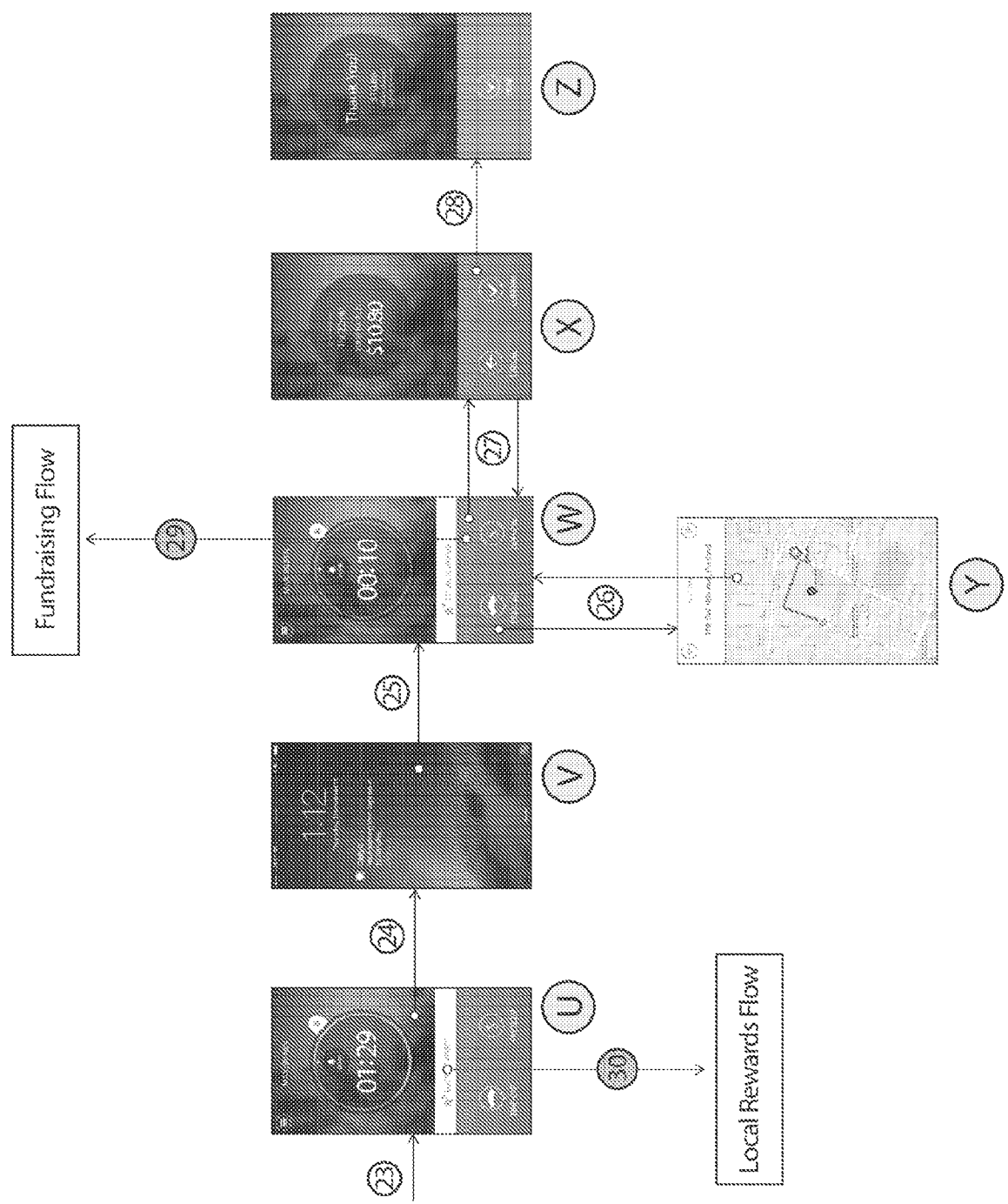
Figures 1, 12:
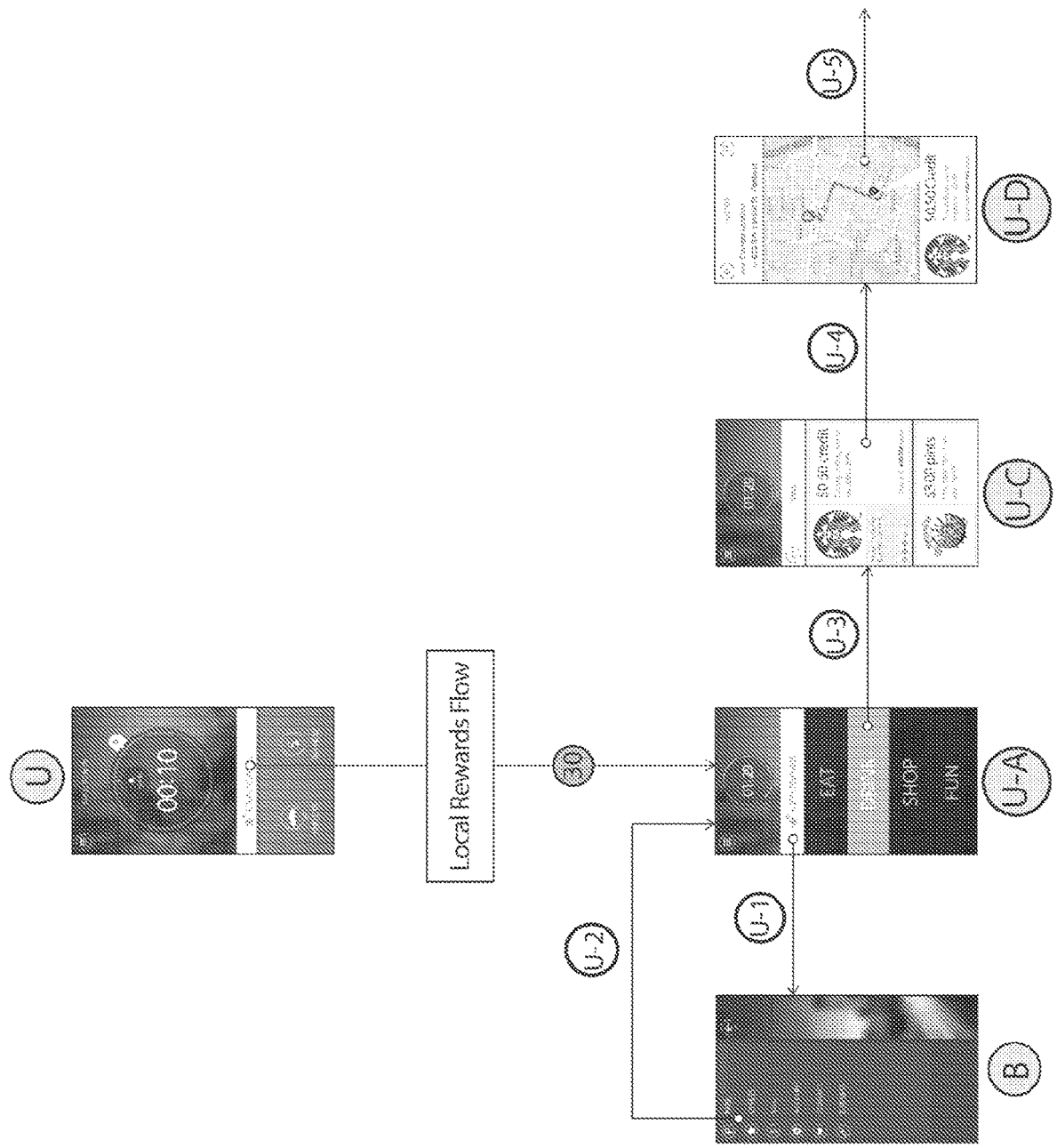
Figures 2, 12:
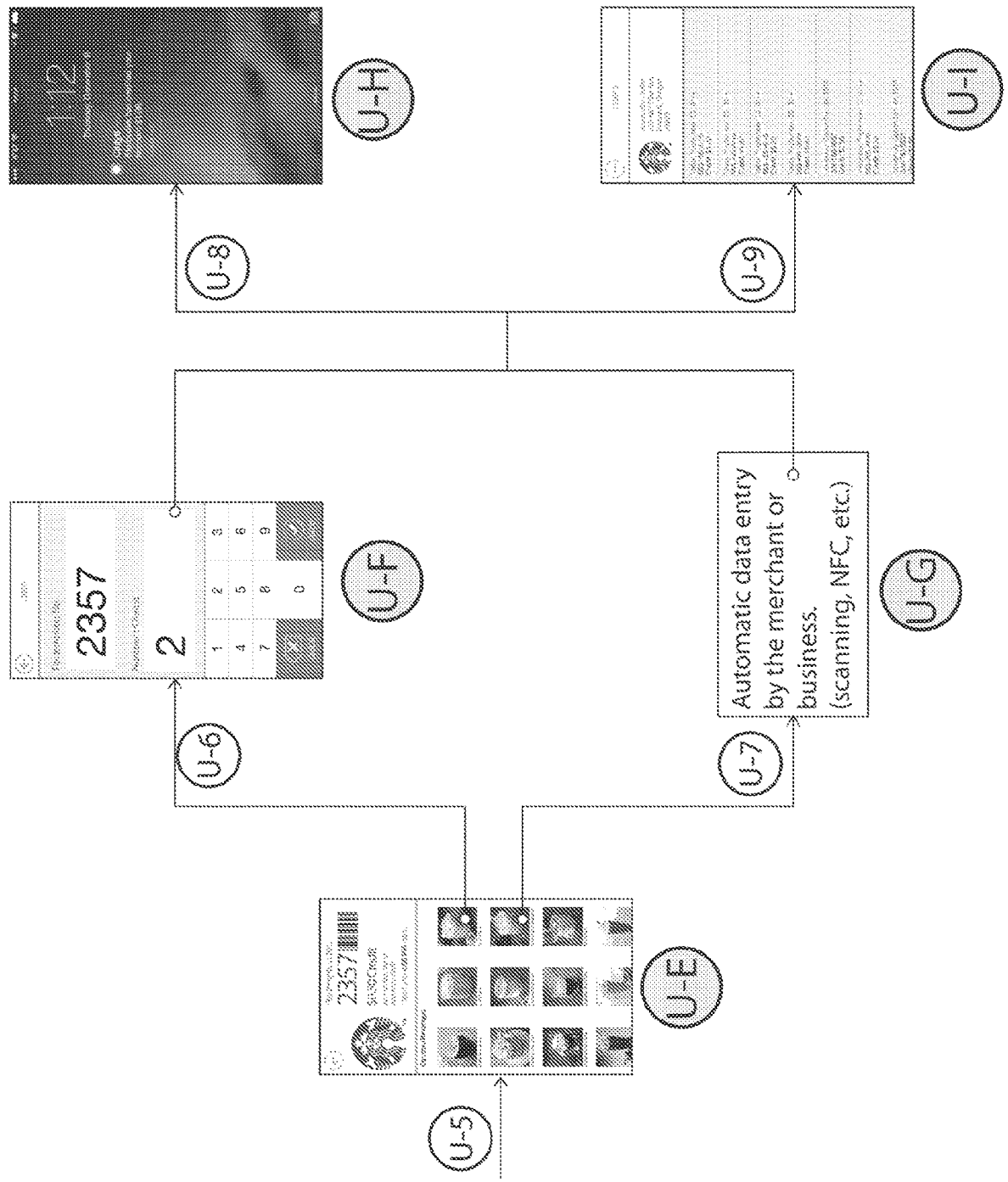

FIG. 8-9 shows on mobile communication device 20 a screenshot indicating that the vehicle driver has exited the App and on display screen 44 of E-Ticket device 30 a screenshot indicating over 22.5 minutes of accumulated parking time, as illustrated in FIG. 7-2.

FIG. 8-10 shows on mobile communication device 20 that the vehicle driver has opened the App at 45 minutes, 7 seconds of parking time but is out of paired connectivity range with E-Ticket device 30. FIG. 8-11 shows on mobile communication device 20 that the vehicle driver has returned to the parked vehicle and at 45 minutes, 17 seconds of parking time is in connectivity range with the E-Ticket device 30. FIG. 8-12 shows for mobile communication device 20, at 45 minutes, 17 seconds of parking time, the vehicle driver has selected the Pay Now button.

FIGS. 8-13 and 8-14 show on mobile communication device 20, respectively, a screenshot indicating a payment process option to confirm or cancel payment for 45 minutes, 18 seconds of parking time at a cost of $1.20 and a screenshot indicating the vehicle driver selected the Confirm button to pay the $1.20 amount displayed.

FIGS. 8-9-8-14 show display surface 14 of E-Ticket device 30 indicating over 45 minutes but under the 67.5 minutes of accumulated parking time, as illustrated in FIG. 7-3.

FIG. 8-15 shows on mobile communication device 20 a screenshot indicating processing of the $1.20 parking charge and on display screen 44 of E-Ticket device 30 a screenshot indicating a parking time-out state, as illustrated in FIG. 7-6.

FIG. 8-16 shows on mobile communication device 20 a screenshot indicating completion of the payment process and for display surface 44 of E-Ticket device 30 a screenshot of a dark screen indicating an inactive state of minimal electric power consumption.

FIGS. 9-1-9-33 represent, for a second vehicle parking scenario, a set of 33 stacked pairs of screenshots on the displays described above for FIGS. 8-1-8-16. The second scenario represents a vehicle driver searching for parking availability in the vicinity of an urban art museum; seeking directions to a parking area in a 3-hour parking limit zone; and paying for 2 hours, 55 minutes, 10 seconds of parking time.

FIGS. 9-1 and 9-2 show on mobile communication device 20, respectively, a screenshot of the homepage of the App opened on the display screen and a screenshot of the homepage of the App at the start of a vehicle driver's search for available parking in a specified city area.

FIGS. 9-3 and 9-4 show on mobile communication device 20, respectively, a screenshot of a city street map appearing in response to the vehicle driver's pressing the Find button and a screenshot of a keyboard for typing a search term into the search field.

FIGS. 9-5 and 9-6 show on mobile communication device 20, respectively, a screenshot showing "Art museum" typed in the search field and a screenshot showing as the search result the city street map with a pin indicating the location of the art museum.

FIGS. 9-7, 9-8, 9-9, and 9-10 show on mobile communication device 20, respectively, a screenshot indicating the vehicle driver's opening a parking time limit zone filter of 1-hour, 90-minute, 2-hour, 3-hour, and 5-hour zones, each represented by white numeral(s) superimposed on a dark circle; a screenshot indicating scrolling through the filter to find a desired available parking time zone; a screenshot indicating unavailability of a 5-hour zone; and a screenshot indicating availability of a 3-hour zone, which is marked on the city street map.

FIG. 9-11 shows on mobile communication device 20 the location of the vehicle driver's selected parking area, indicated by a smaller pin on the city street map.

FIGS. 9-12, 9-13, and 9-14 show on mobile communication device 20, respectively, a screenshot indicating the vehicle driver's selecting the Get Directions button for driving directions to the selected parking area, a screenshot of the driving route superimposed on a Google Maps street map in response to the request for directions, and a city street map indicating the vehicle has reached the desired parking area.

FIG. 9-15 shows on mobile communication device 20 the page of the App at the start of vehicle parking at the desired parking area.

FIGS. 9-16 and 9-17 show on mobile communication device 20, respectively, a screenshot indicating available 90-minute and 3-hour parking limit zones and a screenshot indicating the vehicle driver's selection of the 3-hour parking zone.

FIGS. 9-18 and 9-19 show on mobile communication device 20, respectively, a screenshot of a Start parking meter prompt for a 3-hour maximum of vehicle parking at $1.60 each hour and a screenshot indicating the vehicle driver's selecting the Start button to start the parking meter.

E-Ticket device 30 has a completely dark display surface during each of the first 19 process steps represented by FIGS. 9-1-9-19.

FIG. 9-20 shows on mobile communication device 20 a screenshot indicating the operation of the parking meter one second after the start of the parking timer while mobile communication device 20 is in connectivity range with E-Ticket device 30. FIG. 9-20 shows on display surface 44 of E-Ticket device 30 a screenshot indicating an operational parking timer at one second parking time within the first 45-minute increment, as illustrated (for a 90-minute zone) in FIG. 7-1.

FIG. 9-21 shows on mobile communication device 20 a screenshot indicating that the vehicle driver has exited the App and on display screen 44 of E-Ticket device 30 two side-by-side screenshots. The larger screenshot indicates over 90 minutes of accumulated parking time, as illustrated (for a 90-minute zone) in FIG. 7-3, and the smaller screenshot indicates over 90 minutes but under 135 minutes of accumulated parking time.

FIG. 9-22 shows on mobile communication device 20 a screenshot indicating an alert informing the vehicle driver that 10 minutes' parking time remains for the vehicle parked in the 3-hour zone.

FIG. 9-23 shows on mobile communication device 20 a screenshot indicating the vehicle driver responded to the alert and opened the App to a walk feature providing directions and the time it would take to walk to the parked vehicle.

FIGS. 9-24, 9-25, 9-26, and 9-27 show on mobile communication device 20, respectively, a screenshot indicating the vehicle driver selected the Get Directions button for walking directions; a screenshot indicating the walk route to the parked vehicle; a screenshot indicating the vehicle driver has remaining a 1-minute walk to the parked vehicle; and a screenshot indicating the vehicle driver has, at the 1-minute point, closed the walk feature of the App.

FIGS. 9-28, 9-29, 9-30, 9-31, 9-32, and 9-33 show the payment process steps corresponding to those of FIGS. 8-11, 8-12, 8-13, 8-14, 8-15, and 8-16 of the first vehicle parking scenario. (The accumulated parking time and parking costs are, of course, different for the two scenarios.)

Each of FIGS. 9-22-9-31 shows on display surface 44 of E-Ticket device 30 a screenshot indicating over 135 minutes but under 180 minutes of accumulated parking time. FIG. 9-32 shows on display surface 44 of E-Ticket device 30 a screenshot indicating a parking time-out state, as illustrated in FIG. 7-6.

The disclosed parking management platform forms a basis for business-to-business commerce in marketing local sale of goods and services, as demonstrated by the following example.

FIG. 1 shows wireless communication link 66 between parking servers 12 and merchant 68. Merchant 68 located in the vicinity of a vehicle parking spot can arrange with a parking service provider, such as private parking operator 76 or municipality 78, for placement of an advertisement on the vehicle driver's mobile communication device 20 for validation of parking to customers visiting the merchant's store. The advertisement sent by parking servers 12 appears on the display screen of mobile communication device 20 as the vehicle driver is in the vicinity of the parked vehicle. Merchant 68 may offer a multi-level parking validation program, in which, for example, a lower parking fee payment credit would be given to a customer visiting but not making a purchase at the store and a higher parking fee payment credit would be given to a customer purchasing an item at or exceeding a specified minimum price. Parking validation would be performed through the App.

FIG. 10 is a simplified diagram of the floor plan layout of a store 100 operated at a known location by merchant 68 who has arranged to participate in an advertising program offered by a parking service provider or its agent. The following parking validation scenario relates to attributing to merchant 68 an instance of a customer merely visiting, but not transacting a purchase at, store 100.

A beacon-emitting device 102 positioned at a store entrance 104 or forming part of a wireless local area network broadcasts a beacon signal 106 that carries store identification information ("store ID"). (A store having multiple entrances would be equipped with one beacon-emitting device 102 at each store entrance.) A customer walking through store entrance 104 and carrying mobile communication device 20 starts the following process. Mobile communication device 20 receives beacon signal 106, which wakes up the App operating on mobile communication device 20. The App responds to beacon signal 106 by sending to parking servers 12 a ping signal carrying the store ID and thereby attributing to merchant 68 an instance of a customer visit to store 100. The above-described process is analogous to mouse click event attribution to a vendor whose online advertisement is acknowledged by a website visitor's mouse click.

The following parking validation scenario relates to attributing to a merchant an instance of a customer purchasing an item or service at store 100.

A customer making a purchase approaches a sales desk 108 inside store 100. A store clerk scans across a QR code reader a store-specific QR code that can indicate the purchase price paid and thereby assign a parking validation level. The QR code information is sent by a message through wireless communication link 66 to parking servers 12 to acknowledge a parking credit payable by merchant 68 for store 100.

FIG. 1 shows the system components operating to implement the authorization and redemption processes carried out when the vehicle driver interacts with a parking attendant and a merchant.

As the vehicle approaches a parking attendant to enter a parking facility, or as the vehicle driver completes a transaction with a merchant and seeks to redeem a credit, the vehicle driver brings mobile communication device 20 in proximity (3-5 ft; 0.914-1.524 m) to the parking attendant or merchant's communication device 62, such as a smartphone or tablet computer. Using wireless communication technology, such as Bluetooth® or NFC, the vehicle driver's mobile communication device 20 transmits over a communication link $36_{62}$ a redemption or authorization code to attendant/merchant device 62.

Attendant/merchant device 62 uses the redemption or authorization code to authenticate and retrieve from backend servers 12 over wireless communication link 64 all pertinent information about the vehicle driver, transaction, and redemption. Upon authentication of the transaction and to authorize entry to a parking facility, backend servers 12 communicate with attendant/merchant device 62 over wireless communication link 64 and generate an authorization message for the attendant to allow the vehicle to enter the parking facility. In the case of redemption, again upon authentication of the transaction and the redemption code by backend servers 12, the vehicle driver's account 75 is credited for the redemption amount over wireless communication link 70 and the merchant account 68 is debited over wireless communication link 66 for that amount.

Backend servers 12 then send a notification over wireless communication link 18 to the vehicle driver's mobile communication device 20 informing the vehicle driver about the amount of credit to vehicle driver account 75.

FIG. 11, which includes a set of five drawing sheets (FIGS. 11-1, 11-2, 11-3, 11-4, and 11-5), is a flow diagram of screenshots showing information displayed on mobile communication device 20 for different interactions with system 10. On FIG. 11, as well as FIGS. 12-14, a screenshot is represented by a circle enclosing a capital letter; and links between successive screenshots are represented in time order by circles enclosing Arabic numerals.

Screen A shows the Home page. A user/vehicle driver (hereafter "vehicle driver") activates a search for parking through Home page Screen A (link 3). The vehicle driver also has an ability to activate a search for parking through a Menu page Screen B from Home Screen A (link 1).

Screen B shows the Menu page. The vehicle driver can select different aspects of the parking transaction service from Menu page Screen B. Many follow-on screens can link to Menu page Screen B and return to the follow-on screens (links 1 and 2).

Screen C shows a Parking Time Selector (Filter), which allows the vehicle driver to specify the minimum amount of time needed to park. Thus, only relevant filtered parking spaces appear on the subsequent screens (link 4).

Screen D shows a Map of Parking Spaces/Location nearby the vehicle driver. Screen D shows, based on the minimum amount of parking time selected, the location and relevant filtered parking spaces nearby the vehicle driver.

Screen E shows a Parking Spaces/Location List. The vehicle driver can toggle between the Map Screen D and Screen E to view in list form parking spaces and their locations (link 5). The list shown on Screen E is organized based on the proximity of the Parking Spaces/Locations relevant to the vehicle driver, as shown on Screen D, or to the destination, as shown on Screen G. The parking transaction service organizes the list based on the closest to the farthest, or least expensive to the most expensive, relevant filtered space/location. The vehicle driver can also select to view the list as a default screen in a setting/customization menu. In any of these formats, if they are available, the vehicle driver also can toggle for access the relevant filtered nearby on-street parking time zones, such as shown on Screen R (link 17).

Screen F shows Parking Spaces/Location Designation Selection. If the vehicle driver needs a parking space located away from the existing location of the vehicle, the vehicle driver can enter a selected destination on a map shown in Screen F by bringing about a keyboard on Map Screen F (links 10 and 11).

Screen G shows a Parking Spaces/Location Map of the Destination, By entering a selected location on Screen F, the vehicle driver causes display on a map showing the selected destination and all relevant filtered parking spaces (private areas, garage facilities, and parking lots) around it. Based on settings by the vehicle driver, this information can be shown as a Map G or as a List E. In any of these formats, if they are available, the vehicle driver can also toggle (link 17) or access, the relevant filtered nearby on-street parking time zones as shown on Screen R.

Screens H, I, and J show Parking Space/Location Information. By touching the desired parking space/location icon, the vehicle driver can obtain detailed information about the parking space/location (links 6, 12, and 18). This information includes, but is not limited to, the address, parking rate/fee, and time limit, number of available parking spaces/locations, and enforcement methods and organizations, restrictions, requirements or instructions needed to park, and any photograph of the parking space/location to help identify the desired parking space/location.

Screen K is a Parking Space/Location Photograph. By touching the photograph (or map icon) on Screens H, I or J, the vehicle driver can toggle between a larger Photograph K or a map of the desired parking space/location (link 13).

Screens L, M, and N show Parking Space/Location Selection and directions. By tapping the information box of the desired location, the App provides the vehicle driver a map that identifies the desired space/location (using an icon). The vehicle driver can now choose to get directions to the identified space/location, as indicated on Screens O, P, or Q and link 8, 20, or 15, or just start the meter shown on Screen T and links 9, 16, 21 and 22 for the identified parking space/location.

Screens O, P, and Q are Parking Space/Location Maps showing Directions. By tapping the direction button on Screens L, M or N, the vehicle driver causes the App to provide directions to the desired parking space/location (links 8, 20, and 15).

Screen R shows an On-Street Parking Time Zone Location Map. If available, the vehicle driver can toggle or access the relevant filtered on-street parking time zones around the destination (link 17).

Screen S shows selection of On-Street Parking Time Zone. In case of dose proximity of several on-street parking time zones, the App provides the vehicle driver alternative time zones within the area around the destination. The vehicle driver can select the appropriate parking time zone relating to the parking space before activating the meter, which is shown on Screen T (link 22).

Screen T shows a Parking Meter Start Selector, which allows the user to start the meter for the selected parking space. The meter can be set to show the amount of time used (counting up) or time left (counting down), or, by touching the center selection of the meter on the App, to display the amount of money spent as of that moment, on the parking time elapsed (counting up).

Screen U shows Parking Meter Status and provides the vehicle driver an opportunity to consider Local Business Offers. Once the meter has started, the vehicle driver can continuously see the status of parking time and expenditure (link 23). At the moment the meter starts, the App also allows the vehicle driver to search around the location of the parking space for relevant offers from nearby businesses and merchants (the setting menu allows the vehicle driver to set the search radius size). Link 30 points to a local rewards flow diagram show in FIG. 12 and described below.

Screen V shows a Parking Meter Expiration Alert, Based on the setting by the vehicle driver, system 10 sends a text alert to the vehicle driver's smartphone at certain time intervals (e.g., every 5 minutes) reminding the vehicle driver about the expiration of the parking space time (link 24). This alert also calculates and adds the amount of walking time to the location of the parked car to give the vehicle driver adequate time to remove the car from the parking space.

Screen W shows Parking Meter Status (Find Car) and (Pay Now). Once the vehicle driver decides to return the vehicle, the "Find Car" button shows a Map Screen Y (link 26) indicating the location and direction to the parked vehicle. The vehicle driver can pay for the time used (Pay Now button) and drive off (link 25). However, in certain instances, before payment is made, system 10 may present an opportunity to the vehicle driver to contribute money to a charity. The amount of the charitable contribution is added to the final parking payment and charged to the vehicle driver's account. The vehicle driver has the ability to cancel the charitable contribution before confirming final payment. Link 29 points to a fundraising flow diagram shown in FIG. 13 and described below.

Screen X shows Final Parking Payment. Before a parking payment is charged to the vehicle driver's account, a final payment amount and details of the parking transaction are displayed for confirmation. The vehicle driver has the ability to cancel payment and continue parking (if more time is allowed by the parking provider), cancel any charitable contribution, or confirm final payment by tapping the "Confirm" button (link 27).

Screen Y shows a Find Parked Car Map for a vehicle driver needing directions to the parking space. The vehicle user's tapping the "Find Car" button on Screen W causes display of a map showing the location of and directions to the vehicle driver's parked car. The vehicle driver can then go to Screen W to activate payment (link 26).

Screen Z shows completion of Parking Payment Transaction. Once the vehicle driver confirms a parking transaction amount, a "Thank You" message appears on Screen Z showing the final transaction amount and the details of a transaction (link 28). At this time, an email and text with all transaction details are sent to the vehicle driver's account.

FIG. 12, which includes a set of two drawing sheets (FIGS. 12-1 and 12-2), is a flow diagram showing the offers, redemption, and credit interaction associated with local rewards made available by businesses and merchants located nearby the vehicle driver's parking space, as indicated by Screen U and link 30 in FIG. 11-5.

Screen U-A shows a Desired Activity (local). On Screen U-A, the vehicle driver can select an activity from a list of activity categories to do in one or both of the vicinity of the vehicle driver's parking space and current location, and check for special offers (local rewards) within the selected activity category. The vehicle driver also has the ability to go to Menu page Screen B (link U-1), which is shown in FIG. 11-1 and reproduced in FIG. 12-1, to select different aspects of the service from Screen B.

Screen U-C shows a selection of Local Rewards and Offers. Once the vehicle driver has selected the desired activity category (link U-3), the vehicle driver can check from a list of nearby businesses the relevant information about, advertising by, and special offers from these businesses. The special offers include credits offered to the vehicle driver's parking transactions or credits as points to be used for other transactions. The relevant information about these businesses includes user ratings of them.

Screen U-D shows Directions to Selected Business/Location (Map). By tapping and selecting the desired offer, advertising, or information from the viewed list U-C (link U-4), the vehicle driver causes generation of a map with directions to the selected business. The map can also contain pictures and more information about the business or promotional offer.

Screen U-E shows presentation of a Redemption Number/Selected Business. To redeem the offer, the vehicle driver taps Screen U-D or a specified area of Screen U-D to generate a redemption code, which is one or both of a number and a barcode (link U-5). This redemption code is specific to the selected offer, the business (and its location) creating the offer, and the vehicle driver redeeming the offer. Screen U-E is also the place where the vehicle driver can select to jump/connect into the business' owned App, website, or other business-specific service.

Screens U-F and U-G show Offer Redemption/Crediting the vehicle driver. Once a transaction between the vehicle driver and the business takes place, the business can credit the vehicle driver by a) entering the redemption number into the system/App on a smart, connected device, such as a smartphone, tablet computer, or cash register, as shown on Screen U-F (link U-6), b) by scanning the generated barcode, as shown on Screen U-G (link U-7), and c) by communicating with the vehicle driver's smartphone by wireless technology (e.g., Bluetooth® or NFC) and retrieving the redemption code, at Screen U-G.

Screen U-H shows Transaction/Credit Notification to Vehicle Driver. Once one or both of a transaction has been completed and a credit has been applied to a vehicle driver's account, a text notification is sent to the vehicle driver's telephone number for confirmation, as shown on FIG. U-H (link U-8). An e-mail notification is also sent to the vehicle driver's e-mail account for further confirmation and record keeping.

Screen U-I shows Transaction/Credit Notification to Business. Once one or both of a transaction has been completed and a credit has been applied to a vehicle driver's account, a record of the transaction and credit is also applied to the list of such activities in the business' accounts, as shown on Screen U-1 (link U-9).

Figure 13:
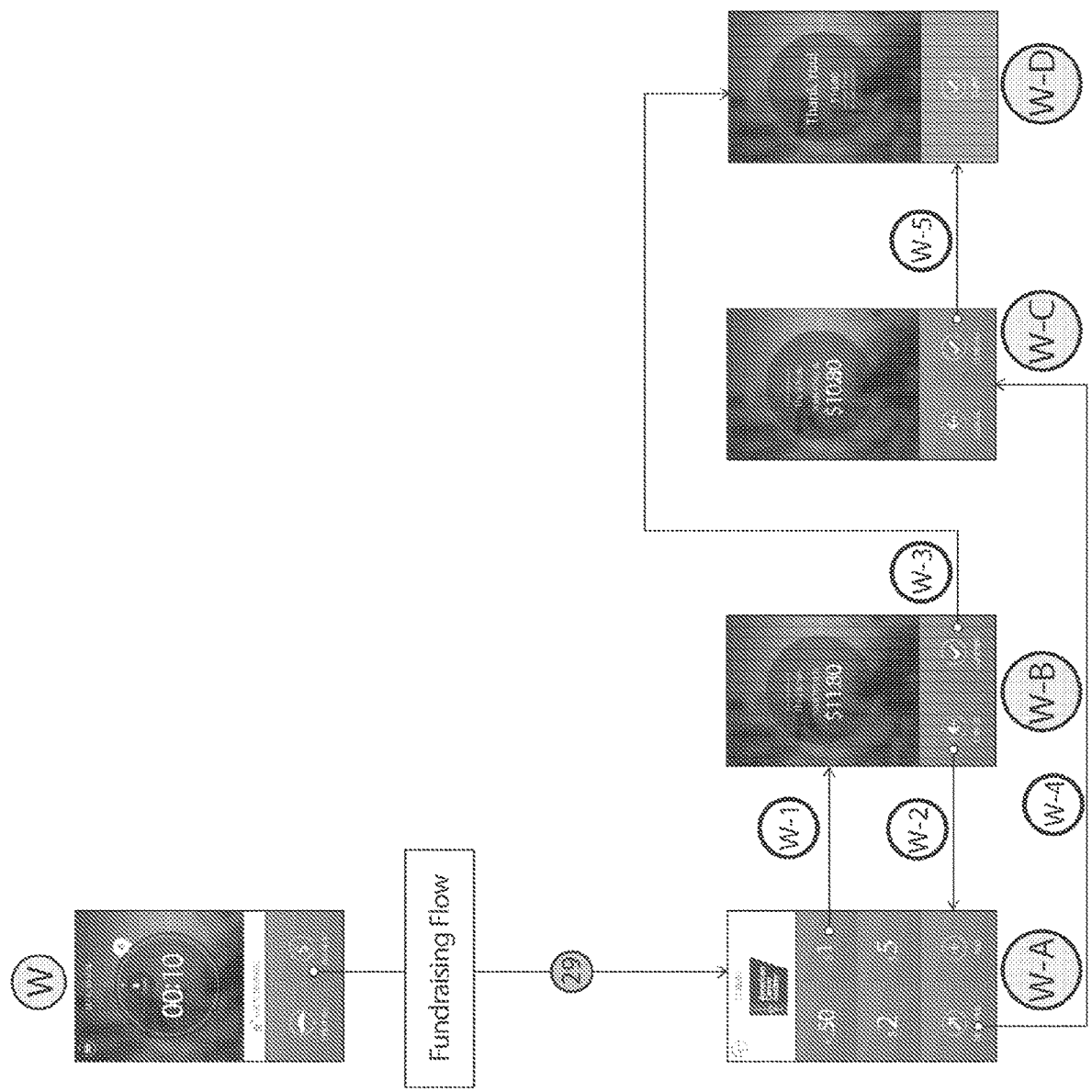

FIG. 13 is a flow diagram showing an opportunity for a vehicle driver to contribute money to a charity or nonprofit organization and pay the amount of money contributed, as indicated by Screen W and link 29 in FIG. 11-5.

Screen W-A shows an opportunity for the vehicle driver to make a Charitable/Nonprofit Contribution. On Screen W-A, the vehicle driver can select from among different contribution amounts a contribution amount that is to be credited to the charity or nonprofit organization displayed on Screen W-A. These fundraising campaigns have a limited duration and are replaced by other campaigns during the year. The vehicle driver selects the contribution amount, taps the "Add" button, and sees on Screen W-B the final parking fee plus the contribution amount (link W-1).

Screen W-B shows Final Parking and Charitable Contribution Payment. Before the final parking and charitable contribution payment is charged to the vehicle driver's account, final payment amount and details of the parking transaction are displayed on Screen W-B for confirmation. The vehicle driver has the ability to cancel this payment and continue parking (if more time is allowed by the parking provider), cancel any charitable amount (link W-2), or confirm final payment by tapping the "Confirm" button (link W-3).

Screen W-C shows the Final Parking Payment. A vehicle driver deciding to forego any charitable contribution simply taps on Screen W-A the "Next Time" button and views the final parking fee on Screen U-C (link W-4).

Screen W-D shows completion of Parking Payment Transaction. Once the vehicle driver confirms a parking transaction amount, a "Thank You" message appears on Screen W-D, showing the final transaction amount and details of the transaction (links W-3 and W-5). At this time, an e-mail and a text message providing all of the transaction details are sent to the vehicle driver's account.

Figures 1, 14:
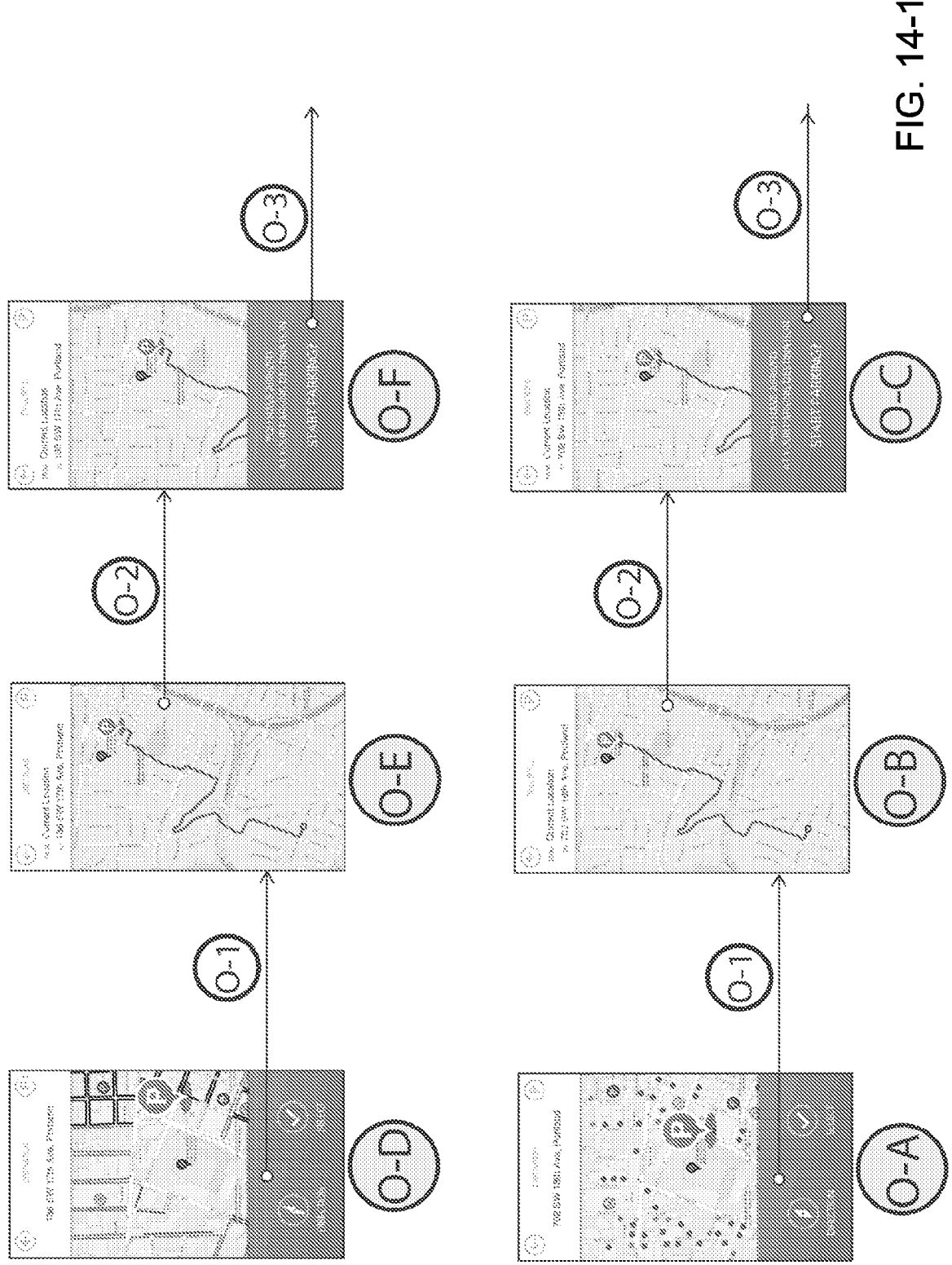
Figures 2, 14:
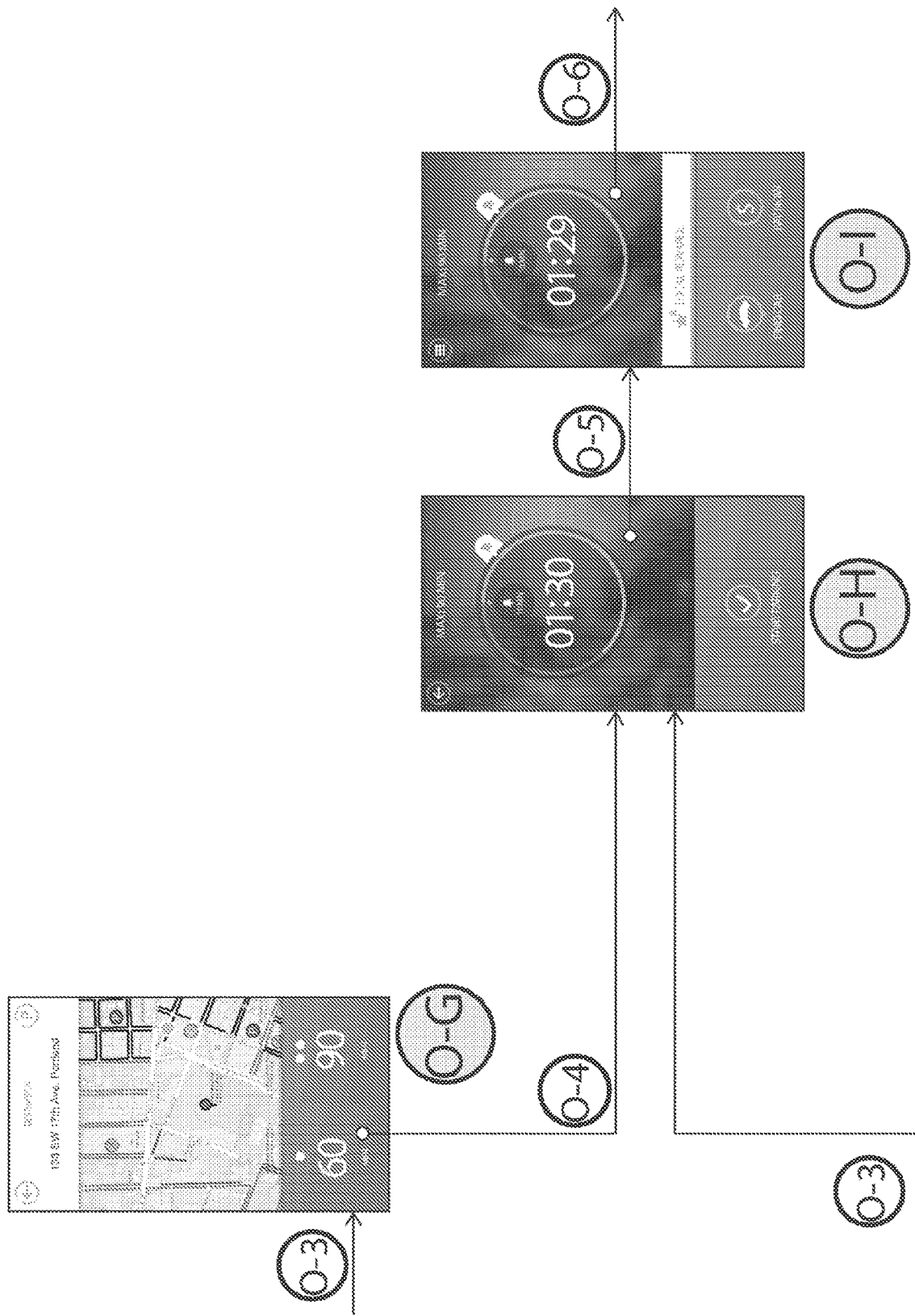

The activities described with reference to FIGS. 11, 12, and 13 at times entail the vehicle driver's seeking directions to an available parking space. FIG. 14, which includes a set of two drawing sheets (FIGS. 14-1 and 14-2), is a flow diagram of screenshot showing the operation of system 10 in the map/direction selection process that routes the vehicle driver to a parking space.

Screens O-A and O-D show Parking Space/Location Maps for, respectively, off-street and on-street zone parking. When the vehicle driver has selected the desired parking space/location in proximity to or a substantial distance from the destination, the vehicle driver may need directions to get to the selected off-street space, as shown on Screen O-A, or on-street zone, as shown on Screen O-D. In that case, the vehicle driver taps the direction button on one of Screens O-A and O-D, leaves the App of system 10, and is directed to a Google® map or Apple® map App (link O-1).

Screens O-B and O-E show Parking Space/Location Directions for, respectively, off-street and on-street zone parking. Google® and Apple® maps (or similar maps) have the ability to provide the vehicle driver visual and turn-by-turn directions that guide the vehicle driver to the destination.

Screens O-C and O-F show Return to App of system 10 for, respectively, off-street and on-street zone parking. Once the vehicle driver has reached the destination through the use of GPS, the map alerts the vehicle driver about reaching the destination. This prompts and creates a visual display/button on Screens O-C and O-F. This button, when actuated by tapping, takes the vehicle driver back to the App of system 10 to start the timer (link O-3). This feature creates a seamless transition between the two different Apps (i.e., between the App operating on system 10 and the Apps of Google® and Apple® maps), thereby eliminating the vehicle driver's need to dose and open different Apps.

Screen O-G shows On-Street Parking Time Zone Selection. If the vehicle driver is parking the vehicle in an on-street zone, a parking time zone needs to be selected. To select the appropriate time zone, and in the case of close proximity of several on-street parking time zones, the App provides the vehicle driver alternative time zones within the on-street parking area. The vehicle driver can select the appropriate parking time zone relating to the selected parking space before activating the meter, which is shown on Screen O-H (link O-4).

Screens O-H and O-I show Parking Meter Start Selector and Status. Screen O-H allows the vehicle driver to start the meter for the selected parking space (link O-5). Once the meter has started, the vehicle driver can continuously see the status of the parking time and expenditure, as shown on Screen O-I, until the vehicle driver moves the vehicle from the parking space (link O-6).

The disclosed dynamic parking management platform enables implementation of an open parking space count for either an open surface parking lot (parking lot) or a parking garage facility (garage facility). Determining an open parking space count necessitates detecting that a vehicle has entered and exited the parking lot or garage facility. Detecting that a vehicle has entered a parking lot or garage facility is determined by the dispensing of a parking ticket to the driver of the vehicle upon its entering the parking lot or garage facility. Detecting that a vehicle has exited the parking lot cannot be currently accomplished because there is no account of the vehicle driven out of the parking lot. Detecting that a vehicle has left the garage facility is accomplished by detection of opening of a barrier gate placed at the garage facility exit.

Figure 15:
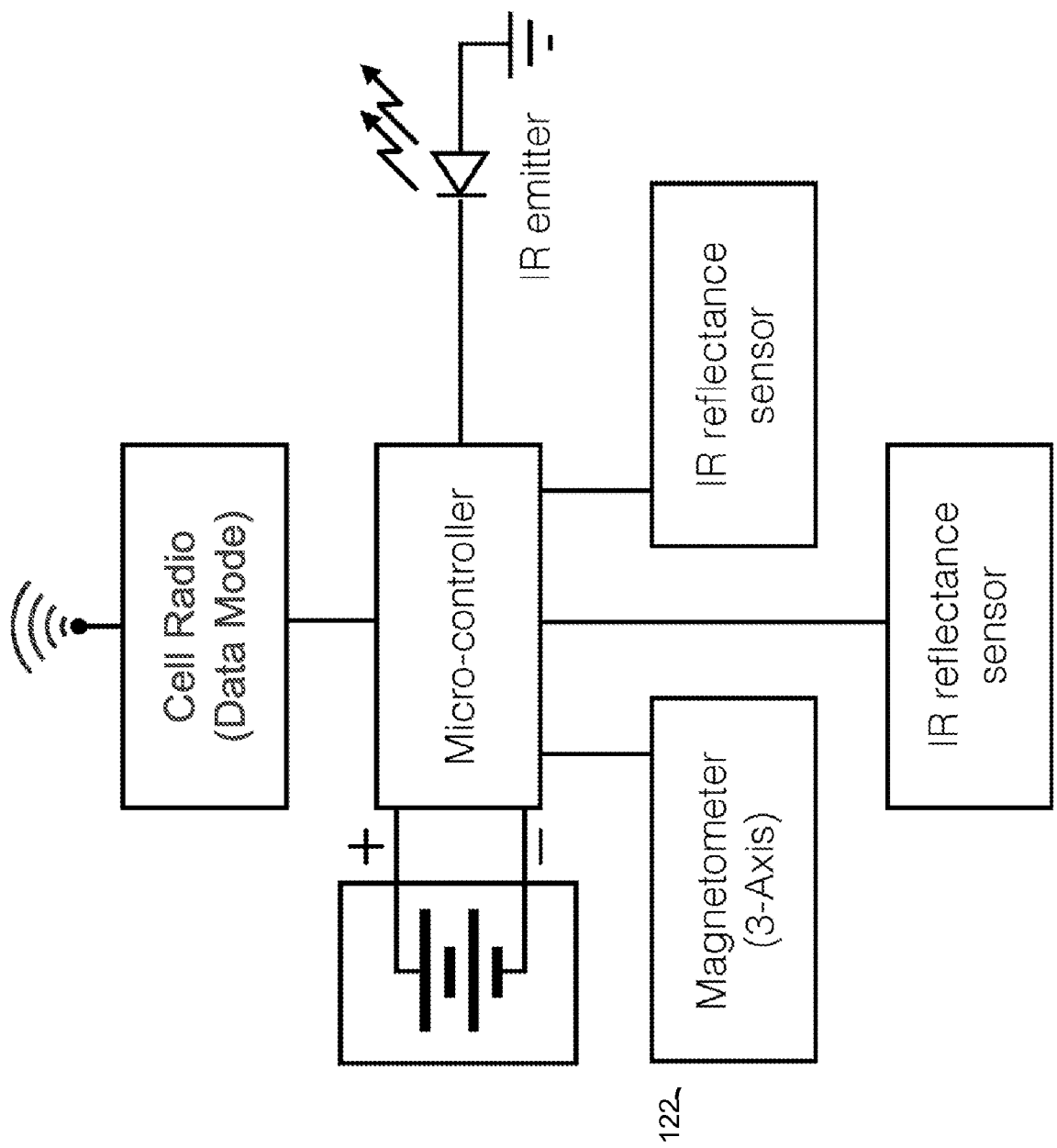

FIG. 15 is a block diagram of a vehicle detection system 120 for installation at a vehicle entrance/exit point of an open surface parking lot. With reference to FIG. 15, a magnetometer 122, a first IR reflectance sensor 124, and a second IR reflectance sensor 126 are mounted on bollard 39 positioned at the entrance/exit point of the parking lot. Magnetometer 122 is preferably an HMC5883L three-axis digital compass available from Honeywell International Inc. Magnetometer 122, which detects large masses of metal, detects the presence of a vehicle, but not the presence of a person. IR reflectance sensors 124 and 126 are each preferably a QRE1113 reflective object sensor available from Fairchild Semiconductor International, Inc.

IR reflectance sensors 124 and 126 are mounted on bollard 39 in spaced-apart relationship to each other along the direction of travel of a vehicle either entering or exiting the parking lot. IR reflectance sensors 124 and 126 are set at a height on bollard 39 to detect the luminosity of the vehicle passing by them. The outputs of magnetometer 122 and of IR reflectance sensors 124 and 126 are applied to a microcontroller 128. Microcontroller 128 is powered by a photovoltaic cell 130, which preferably is a PRT-0031PV cell available from SparkFun Electronics. Microcontroller 128 determines from the output signal of magnetometer 122 whether an object detected at bollard 39 is a vehicle, and if the detected object is a vehicle, determines from the order of occurrences of the output signals of IR reflectance sensors 124 and 126 whether the detected vehicle is entering or exiting the parking lot.

An IR emitter 132 provides to microcontroller 128 an output signal representing the ambient light (e.g., whether night or day) in the area of the parking lot. The output signal of IR emitter 132 provides environmental background light information that microcontroller 128 uses to adjust the luminosity information provided by IR reflectance sensors 124 and 126 and thereby enable detection of a vehicle irrespective of the darkness of its color.

The timing sequence of the output signals of IR reflectance sensors 124 and 126 indicates to microcontroller 128 whether a vehicle passing by them is entering or exiting the parking lot. Microcontroller 128 keeps a running count of parked vehicles and, given the total number of parking spaces representing the parking lot capacity, calculates an open parking space count. An initial or confirmation count of parked vehicles may be entered by means of an input device to controller 128 by a parking lot attendant counting periodically on-site the number of vehicles parked in the parking lot.

A cellular radio 134, preferably implemented with code division multiple access (CDMA) digital cellular technology, is coupled to microcontroller 128 and operates in a data mode to transmit over wireless communication link 46 to parking servers 12 any one or all of the open parking space count, number of vehicles parked in the parking lot at a given time, and time of entry or exit of a vehicle. Cellular radio 134 is preferably a cellular module SARA-G3500/U260/U270 available from u-blox AG.

The use of vehicle detection system 120 in the implementation of the disclosed dynamic parking management platform enables vehicle parking space inventory management of parking spaces available in parking lots and facilities having different parking ticketing systems. The parking management platform can, therefore, inform vehicle drivers where open parking spaces are available, irrespective of whether they are available on-street, in parking lots, or in parking facilities or of the type of parking ticketing system used. The use of vehicle detection system 120 enables solution of providing a maximum number of available vehicle parking spaces in a given spatial region with use of the disclosed dynamic parking management platform in combination with parking ticketing systems of different types.

System 10 is capable of using E-Ticket device 30 as a beacon to assist a user carrying mobile communication device 20 to find a vehicle the user parked in a parking lot or garage facility. E-Ticket device 30 placed in the parked vehicle emits a beacon signal carrying an identification code that is recognizable by mobile communication device 20 carried by the user. Mobile communication device 20 is capable of measuring signal strength of a received signal. The beacon signal emitted by E-Ticket device 30 operates as a homing signal, which is acquired by mobile communication device 20 measuring changes in signal strength of the beacon signal to assist the user to locate the parked vehicle.

The foregoing parking validation scenarios demonstrate that use by merchant 68 of the parking management platform to control parking validation empowers merchant 68 to interact with potential customers in the vicinity of the store and thereby create flash sale opportunities. Moreover, the advertising model enables a parking service provider such as parking operator 76 or municipality 78 to operate as an advertising source, selling advertising for a fee based on attribution for the number of visits or purchases by a customer of the store operated by merchant 68.

The use of vehicle parking encourages customer interaction with a merchant in at least two ways. The first way is that the driver of the parked vehicle is in the vicinity of the store location and thereby increases the likelihood that the vehicle driver will visit the store. This is in contrast to the less likely consumer demand that predictive commerce analysis expects from newspaper discount coupons, about which the potential customer becomes aware at a location a long distance from the store location. The second way is that a vehicle parked at a nearby area to the store effectively functions as an anchor for the vehicle driver, as compared to a pedestrian passing by the store location. A person walking down a street has comparatively little incentive or mobility impediment to stop and enter any given store along the walking route.

The disclosed parking management platform also enables event-based parking such as, for example, reservation-based parking. A vehicle driver would be able to reserve and make prepayment for a parking area for a specified time on a specified date. Private individuals could also establish a private operator's account on backend servers 12 to make available private home driveway parking at specified times on certain days at a specified cost. Such an arrangement represents one way in which the disclosed parking management platform enables sale of a parking service that makes productive the otherwise unused capacity of an asset.

Use of the disclosed parking management platform over time can enable formulation of estimates of parking area availability based on historical experience. A large number of vehicle drivers using system 10 over time would establish trend lines of vehicles parked at certain times of day at specific regions of a locality.

The following lists summarize the benefits afforded by system 10 to a municipality and to a vehicle driver.
Benefits to Municipality:
Reduced Costs:
  No new infrastructure
  No new devices for the parking enforcement officers
  No maintenance cost (as well as reducing the maintenance cost of existing infrastructure)
  No collection cost (as well as reducing the collection time and cost of existing infrastructure)
  No printing of tickets and permits
Increased Revenue:
  Grace period fees
  Dynamic parking fees
  Increased throughput and performance of parking enforcement officers
  Instant collection of violation charges.
Benefits to Drivers:
Convenience:
  Easy to use (no numbers to input, two steps to activate)
  In-car transaction
  Speed of transaction (no numbers to input, two steps to activate)
  Parking rate indicator
  Limitless parking where permissible (no need to add time)
  Security (in car transaction)
  Records (financial)
  Vehicle Location indicator
  Expiration time reminder
  Vehicle agnostic
  Location agnostic
  Automatic deactivation
  Parking permits
Financial
  Pay for what is used
  Expiration time reminder
  Grace period
  Records (financial)
  Security (theft)

It will be apparent to skilled persons that many changes may be made to the details of the above-described embodiments without departing from the underlying principles of the disclosure. The scope of the invention should, therefore, be determined only with reference to the following claims.

The invention claimed is:

1. A dynamic vehicle parking management platform, comprising:
  an electronic ticket device including a controller performing a timer function, the electronic ticket device configured for placement in a vehicle occupying a parking space controlled by a parking provider that stores on a parking server parking account information and transaction information of a parking provider account and a user parking account of a user of the vehicle, thereby to associate the electronic ticket device and vehicle parking related transactions with the user parking account, the electronic ticket device itself being incapable of direct communication with the parking server;
  a wireless connection protocol device operatively connected to the parking server to send parking account information signals by wireless transmission to and receive data signals by wireless transmission from a wireless-connection enabled mobile communication device associated with the user;
  a short-range wireless connection protocol device operatively connected to the electronic ticket device to exchange identification information with, and thereby enable secure pairing connectivity to, the mobile communication device and to receive timer command signals by wireless transmission from the mobile communication device, the enabled secure pairing connectivity of the electronic ticket device to the mobile communication device established on the parking server for exclusive communication between the electronic ticket device and the mobile communication device, and the secure pairing connectivity implemented by a lock and key combination in which the exchange of identification information enables communication over a short-range wireless communication link between the electronic ticket device and the mobile communication device when they are operating within a connectivity range of the short-range wireless communication link and disables communication over the short-range wireless communication link between the electronic ticket device and the mobile communication device when they are separated from each other by a distance that is outside the connectivity range of the short-range wireless communication link and thereby prevents the mobile communication device from forming with the parking server a connection to carry out a parking related transaction associated with the user parking account, and the timer command signals including start timer and stop timer commands;

the controller included in the electronic ticket device is configured to:
   when the electronic ticket device and mobile communication device are in the secure pairing connectivity, actuate the electronic ticket device to indicate a parking transaction in response to the mobile communication device initiating a vehicle parking transaction;
   receive from the mobile communication device the start timer command to start the timer function and thereby track vehicle parking time, and the stop timer command to stop the timer function, the electronic ticket device being unable to respond to the start timer and stop timer commands after loss of the secure pairing connectivity as a result of the implementation of the lock and key combination;
   count a parking time elapsed between the start timer and stop timer commands;
   make available for display an indication corresponding to the elapsed parking time count; and the mobile communication device is configured to:
   after actuation of the electronic ticket device to indicate a parking transaction, after receipt by the electronic ticket device of the start timer command, and upon loss of the secure pairing connectivity of the electronic ticket device to the mobile communication device, disable a payment command actuator and allow the timer function to track the vehicle parking time during inactivity of the secure pairing connectivity.

2. The parking management platform of claim 1, in which the electronic ticket device further includes a display surface on which is presented for viewing, by an observer, information indicating initiation of the vehicle parking transaction and representing the elapsed parking time made available.

3. The parking management platform of claim 1, in which the controller included in the electronic ticket device is further configured to provide a current amount of parking time accumulated after the start timer command, and in which the electronic ticket device further includes a display surface on which is presented for viewing, by an observer, information representing the current amount of parking time accumulated after the start timer command.

4. The parking management platform of claim 3, in which the mobile communication device transmits a signal indicating a maximum vehicle parking time associated with the parking space and a remaining available amount of parking time, if any, for presentation on the display surface.

5. The parking management platform of claim 1, in which:
   the parking provider has a wireless-connection enabled parking provider account and a user of the vehicle has a wireless-connection enabled user parking account;
   the wireless connection protocol device operatively connected to the parking server further sends parking account information by wireless transmission to and receives data signals by wireless transmission from the parking provider account and the user parking account; and
   the parking server, after production of the stop timer command, calculates a parking fee charge for the elapsed parking time and transmits to the parking provider account and the user parking account the parking fee charge for the vehicle parking transaction by a user of the vehicle occupying the parking space.

6. The parking management platform of claim 1, in which the mobile communication device is a smartphone.

7. The parking management platform of claim 1, in which the electronic ticket device is configured for placement as a separate item in the vehicle.

8. The parking management platform of claim 1, in which the electronic ticket device is configured for placement as an item installed in the vehicle.

9. The parking management platform of claim 1, in which:
   a communication signal interface is operatively connected to the mobile communication device to establish a wireless signal communication link with a navigation system providing information about movement of the mobile communication device; and
   the mobile communication device is configured to, after parking of a vehicle, after undergoing loss of the secure pairing connectivity with no occurrence of receipt by the electronic ticket of a start timer command, and after the detection by the navigation system of movement of the mobile communication device, receive from the parking server the start timer command and thereby start a parking transaction.

10. The parking management platform of claim 1, in which:
   a communication signal interface is operatively connected to the mobile communication device to establish a wireless signal communication link with a navigation system providing information about movement of the mobile communication device; and
   the mobile communication device is configured to, after actuation of the electronic ticket device to indicate a parking transaction and receipt by the electronic ticket device of the start timer command, provide to the parking server the stop timer command when the secure pairing connectivity is active and the navigation system detects movement of the mobile communication device.

11. The parking management platform of claim 1, further comprising a wireless-connection enabled barrier gate transceiver operatively connected to a barrier gate to control entry of a vehicle to, or exit of a vehicle from, a parking area, the electronic ticket device or mobile communication device emitting a beacon signal to establish a wireless communication link between the electronic ticket device or mobile communication device and the gate transceiver and to cause the barrier gate to open and thereby allow the vehicle to enter or exit the parking area, the wireless communication link being established when the electronic ticket device and the mobile communication device are in secure pairing connectivity and in connectivity range with the barrier gate to prevent inadvertent opening of the barrier gate by a user carrying the mobile communication device without the electronic ticket device in proximity to the barrier gate transceiver.

12. The parking management platform of claim 1, further comprising a wireless-connection enabled barrier gate transceiver operatively connected to a barrier gate to control entry of a vehicle to, or exit of a vehicle from, a parking area, the electronic ticket device emitting a beacon signal to establish a wireless communication link between the electronic ticket device and the gate transceiver and to cause the barrier gate to open and thereby allow the vehicle to enter or exit the parking area, the beacon signal corresponding to a signal transmitted from the mobile communication device in paired connection with the electronic ticket device functioning as a signal repeater for the mobile communication device.

13. The parking management platform of claim 1, in which transaction information is processed on the parking server, and further comprising a short-range wireless connection protocol device operatively connected to a portable communication device to receive vehicle account identification information by wireless transmission from the electronic ticket device, the portable communication device being wireless-connection enabled to send by wireless transmission to the parking server, and to receive by wireless transmission from the parking server, user parking account information and transaction information of a user parking account associated with the vehicle occupying a parking space, and the portable communication device receiving from the electronic ticket device user account identification information when the portable communication device and the electronic ticket device are positioned within a connectivity range of the short-range wireless communication link, transmitting to the parking server the user account identification information, and receiving from the parking server information indicating whether the presence of the vehicle occupying the parking space and associated with the user parking account identification information received from the portable communication device represents an authorized transaction.

14. The parking management platform of claim 13, in which the electronic ticket device transmits to the portable communication device information representing the elapsed time made available.

15. The parking management platform of claim 14, in which the portable communication device includes a display surface on which the elapsed time is presented for viewing by an observer.

16. The parking management platform of claim 1, in which the electronic ticket device further includes a display surface on which is presented for viewing, by an observer, initiation of a parking transaction and vehicle parking information, and in which the wireless connection protocol device operatively connected to the parking server sends parking account information by wireless transmission to and receives vehicle parking transaction information by wireless transmission from the mobile communication device, the mobile communication device having memory stores in which the vehicle parking transaction information is recorded in association with time stamp information to enable delayed transmission of the vehicle parking transaction information in an event of a loss of wireless transmission connectivity between the mobile communication device and the parking server.

17. The parking management platform of claim 1, in which the electronic ticket device placed in the vehicle emits a beacon signal carrying an identification code recognizable by the mobile communication device carried by a user, the mobile communication device being capable of measuring signal strength of a received signal, and the beacon signal functioning as a homing signal when acquired by the mobile communication device measuring changes in signal strength of the beacon signal to assist the user to locate the vehicle occupying a parking space.

18. The parking management platform of claim 1, in which a user of the vehicle has a wireless-connection enabled user parking account, and further comprising a wireless connection protocol device operatively connected to a merchant mobile communication device to receive a parking transaction related redemption code transmitted from the mobile communication device to transmit information relating to the redemption code by wireless transmission to and receive confirmation relating to the redemption code by wireless transmission from the parking server to determine whether to authorize a redemption of a reward for the parking related transaction.

19. The parking management platform of claim 1, further comprising a vehicle detection system including a magnetometer and light reflectance sensors that cooperate to determine when the vehicle enters or exits a parking lot having the parking space controlled by a parking provider.

* * * * *